United States Patent
Walley et al.

(10) Patent No.: US 8,412,142 B2
(45) Date of Patent: Apr. 2, 2013

(54) MULTIPLE FREQUENCY BAND INFORMATION SIGNAL UNIVERSAL FRONT END WITH ADJUSTABLE ADC(S)

(75) Inventors: John Walley, Ladera Ranch, CA (US);
David Rosmann, Irvine, CA (US);
Brima B. Ibrahim, Aliso Viejo, CA (US); Arya Reza Behzad, Poway, CA (US); Jeyhan Karaoguz, Irvine, CA (US); Vinko Erceg, Cardiff by the Sea, CA (US)

(73) Assignee: Broadcom Corporation, Irvine, CA (US)

( * ) Notice: Subject to any disclaimer, the term of this patent is extended or adjusted under 35 U.S.C. 154(b) by 847 days.

(21) Appl. No.: 12/550,555

(22) Filed: Aug. 31, 2009

(65) Prior Publication Data
US 2010/0261438 A1 Oct. 14, 2010

Related U.S. Application Data

(60) Provisional application No. 61/167,945, filed on Apr. 9, 2009.

(51) Int. Cl.
*H04B 1/26* (2006.01)
(52) U.S. Cl. .......................... 455/323; 455/334; 375/324

(58) Field of Classification Search .................. 455/161, 455/168.1, 188.1, 190.1, 313, 323, 334, 339–341; 375/324
See application file for complete search history.

(56) References Cited

U.S. PATENT DOCUMENTS

| 7,702,049 B2 * | 4/2010 | Tsui et al. ...................... 375/347 |
| 2008/0057884 A1 * | 3/2008 | Wei et al. ...................... 455/130 |

* cited by examiner

*Primary Examiner* — Nhan Le
(74) *Attorney, Agent, or Firm* — Garlick & Markison; Bruce E. Garlick

(57) ABSTRACT

A wireless device includes processing circuitry, a receiver section, a transmitter section, and an antenna. The processing circuitry determines a set of information signals of a RF Multiple Frequency Bands Multiple Standards (MFBMS) signal. The receiver section down-converts a portion of the RF MFBMS signal by one or more respective shift frequencies to produce a corresponding baseband/low Intermediate Frequency (BB/IF) information signal from which the processing circuitry extracts data. The transmitter section converts a respective BB/IF information signal received from the processing circuitry by a respective shift frequency to produce a corresponding RF information signal and a combiner that combines the RF information signals to form a RF MFBMS signal. The receiver section and the transmitter section include ADCs and/or DACs, respectively, that are adjustable based upon characteristics of the RF MFBMS signal, the BB/IF MFBMS signal, and/or based upon signals carried therein, e.g., modulation type, SNR requirements, etc.

21 Claims, 39 Drawing Sheets

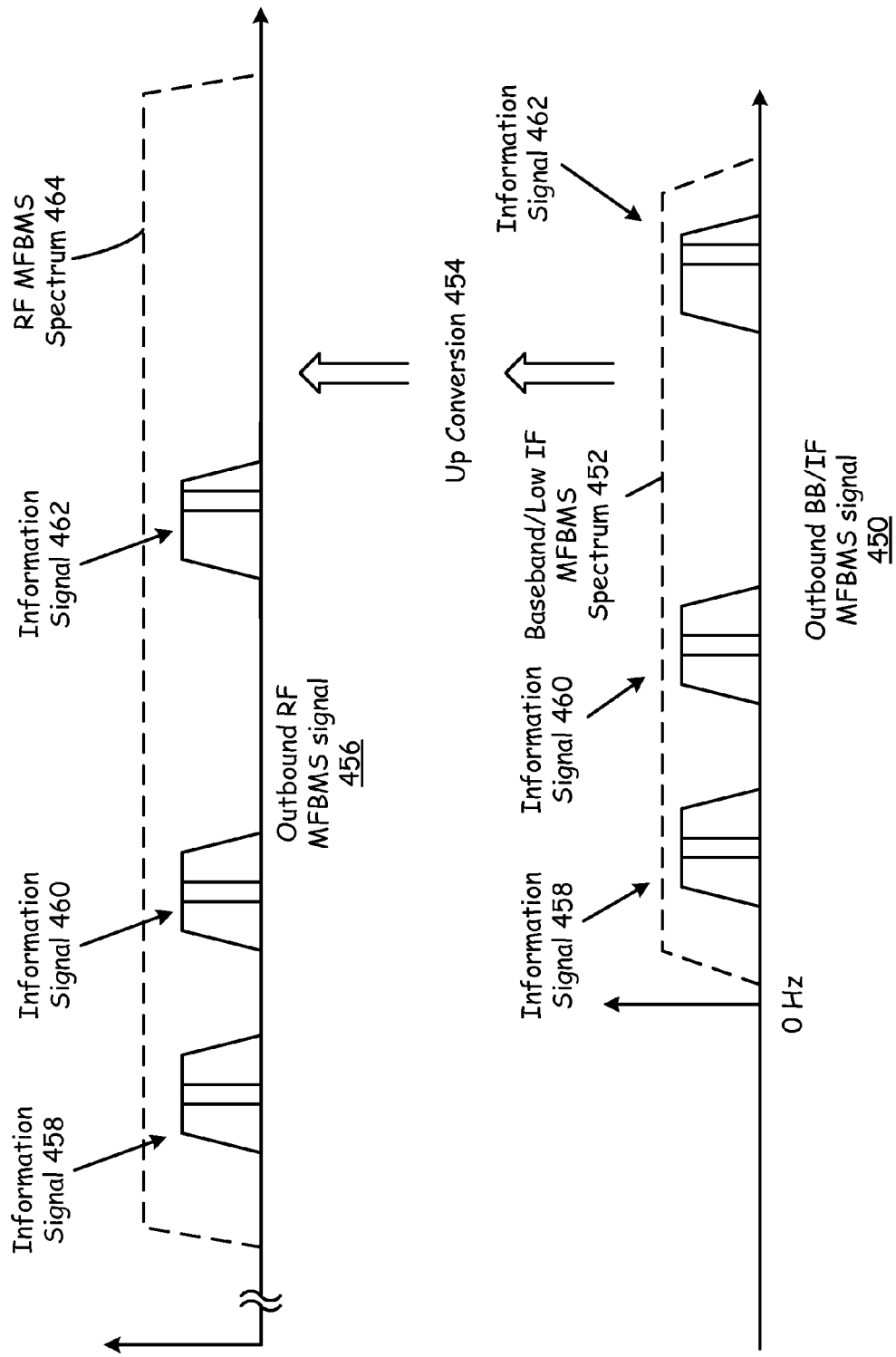

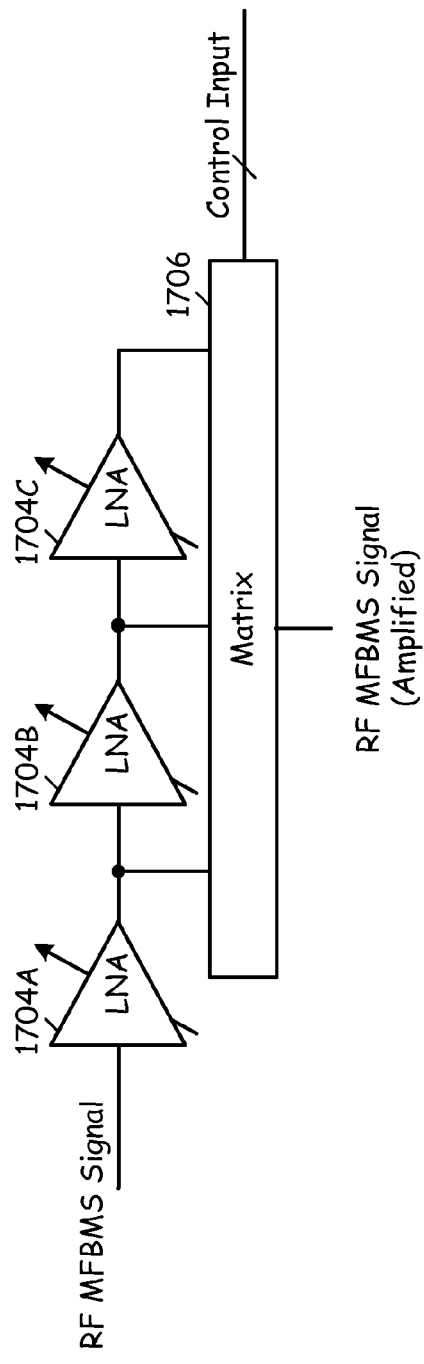
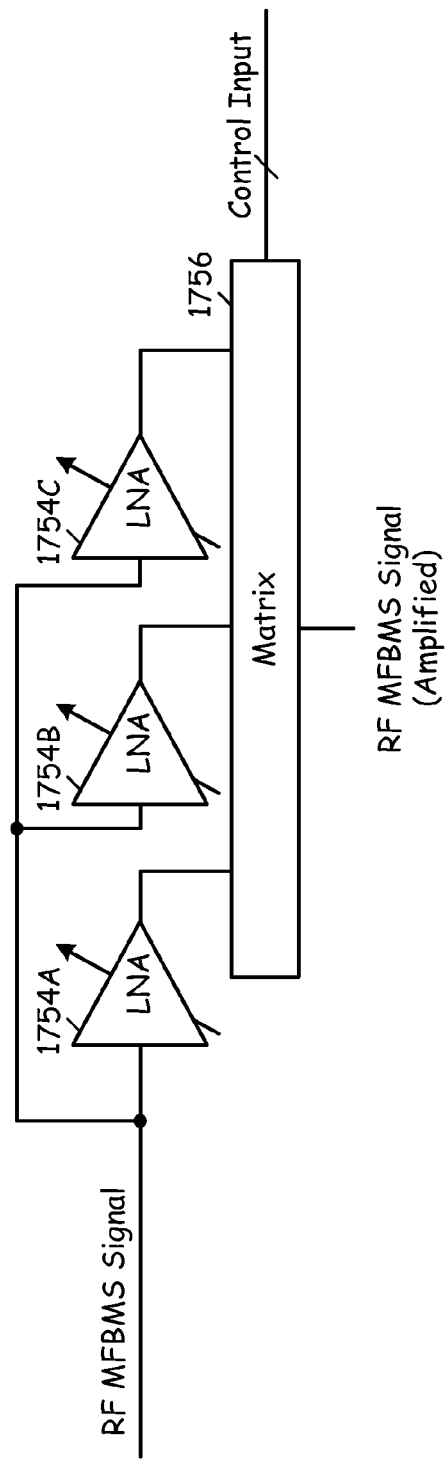
FIG. 17A
FIG. 17B

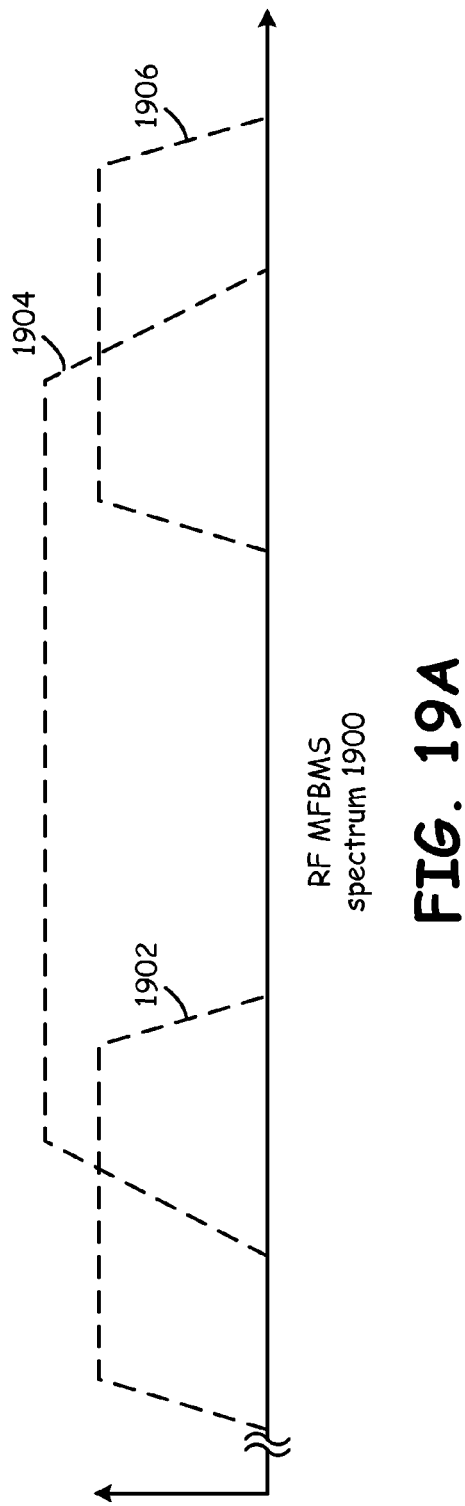
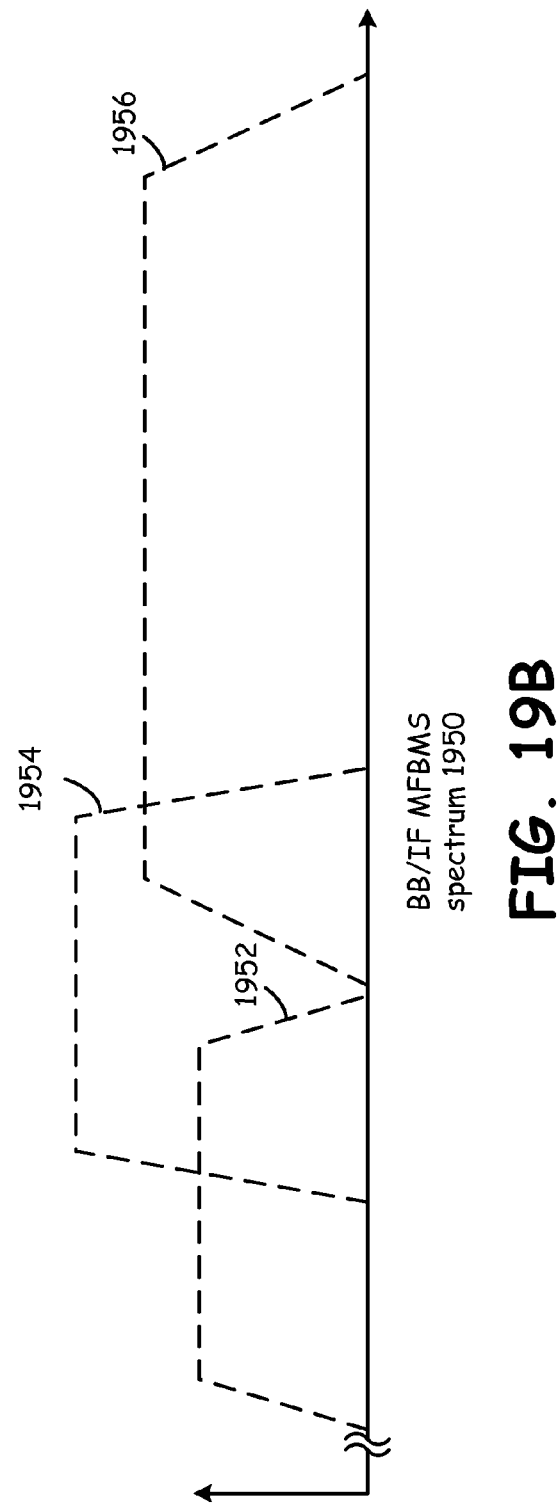

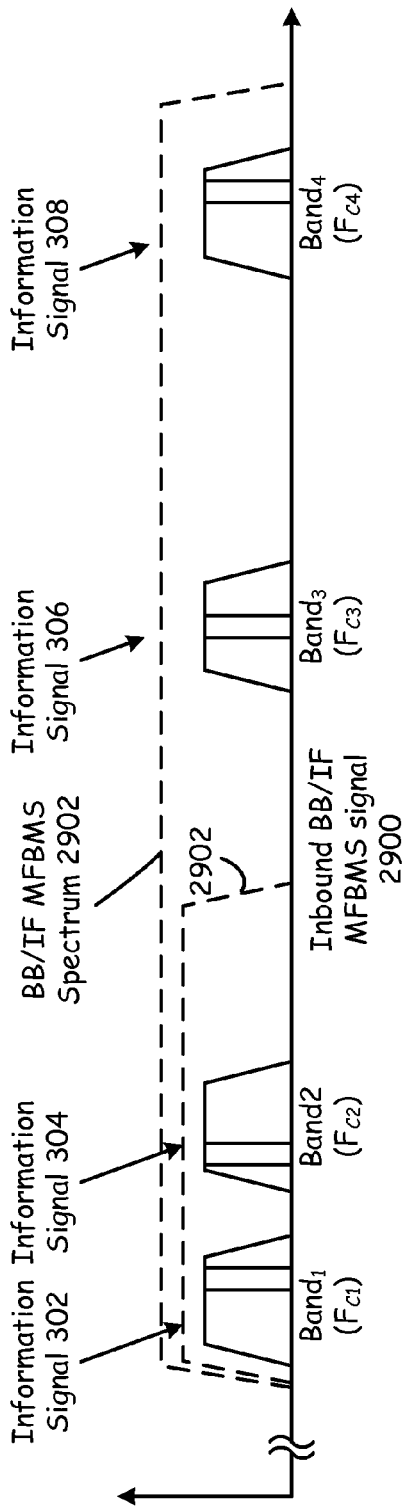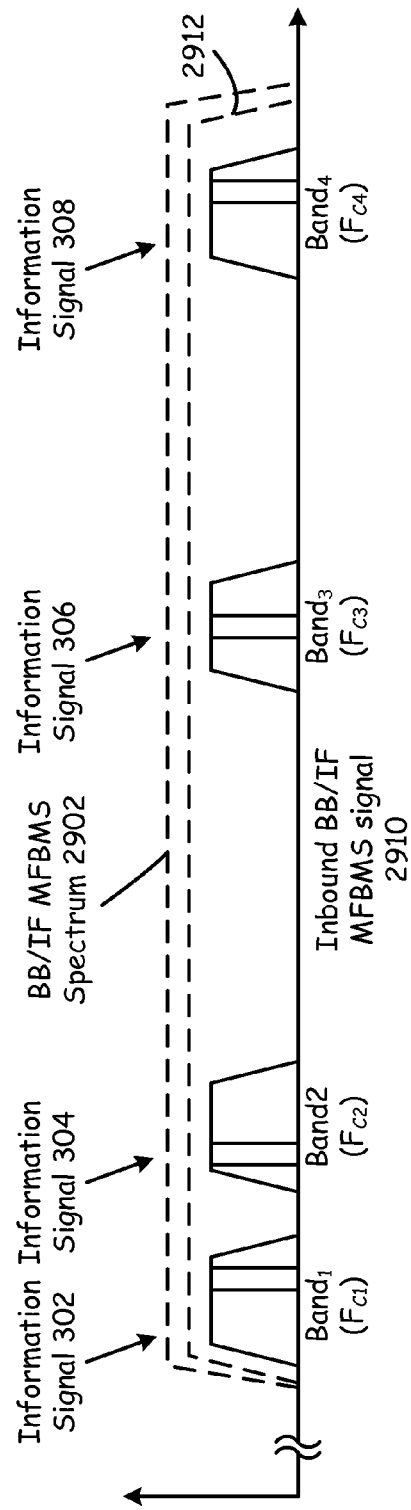

MULTIPLE FREQUENCY BAND INFORMATION SIGNAL UNIVERSAL FRONT END WITH ADJUSTABLE ADC(S)

CROSS-REFERENCE TO PRIORITY APPLICATION

The present application claims priority to U.S. Provisional Application No. 61/167,945, filed Apr. 9, 2009, which is incorporated herein in its entirety for all purposes.

BACKGROUND

1. Technical Field

The present invention relates generally to wide band wireless signal operations; and more particular to wideband radio frequency operations.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, wireless wide area networks (e.g., WiMAX), advanced mobile phone services (AMPS), digital AMPS, global system for mobile communications (GSM), North American code division multiple access (CDMA), Wideband CDMA, local multi-point distribution systems (LMDS), multi-channel-multi-point distribution systems (MMDS), radio frequency identification (RFID), Enhanced Data rates for GSM Evolution (EDGE), General Packet Radio Service (GPRS), and many others.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Many wireless transceivers are able to support multiple communication standards, which may be in the same frequency band or in different frequency bands. For example, a wireless transceiver may support Bluetooth communications for a personal area network and IEEE 802.11 communications for a Wireless Local Area Network (WLAN). In this example, the IEEE 802.11 communications and the Bluetooth communications may be within the same frequency band (e.g., 2.4 GHz for IEEE 802.11b, g, etc.). Alternatively, the IEEE 802.11 communications may be in a different frequency band (e.g., 5 GHz) than the Bluetooth communications (e.g., 2.4 GHz). For Bluetooth communications and IEEE 802.11b, (g), etc. communications there are interactive protocols that appear to the user as simultaneous implementation, but is actually a shared serial implementation. As such, while a wireless transceiver supports multiple types of standardized communications, it can only support one type of standardized communication at a time.

A transceiver that supports multiple standards includes multiple RF front-ends (e.g., on the receiver side, separate LNA, channel filter, and IF stages for each standard and, on the transmitter side, separate IF stages, power amplifiers, and channels filters for each standard). As such, multiple standard transceivers include multiple separate RF front-ends; one for each standard in a different frequency band, channel utilization scheme (e.g., time division multiple access, frequency division multiple access, code division multiple access, orthogonal frequency division multiplexing, etc.), and/or data modulation scheme (e.g., phase shift keying, frequency shift keying, amplitude shift keying, combinations and/or variations thereof). Such multiple transceivers are fixed in that they can only support standards to which they were designed. The transceiver may also include separate baseband processing modules for each communication standard supported. Thus, as a new standard is released, new hardware may be needed for a wireless communication device to support the newly released standard.

Therefore, a need exists for a transceiver that is capable of at least partially overcoming one or more of the above mentioned multiple standard limitations.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 4D is a diagram illustrating power spectral densities of a RF MFBMS signal and a BB/IF MFBMS signal constructed and operated on according to one or more embodiments of the present invention;

FIG. 17A is a block diagram illustrating an adjustable Low Noise Amplifier (LNA) constructed according to one or more embodiments of the present invention;

FIG. 17B is a block diagram illustrating another adjustable LNA constructed according to one or more embodiments of the present invention;

FIGS. 19A and 19B are frequency response curves showing the various frequency responses of frequency adjustable analog signal path components constructed according to embodiments of the present invention;

FIGS. 29A and 29B are power spectral representations illustrating inbound BB/IF MFBMS signals and frequency responses of ADCs operating thereupon according to one or more embodiments of the present invention.

DETAILED DESCRIPTION OF THE DRAWINGS

Figure 1:
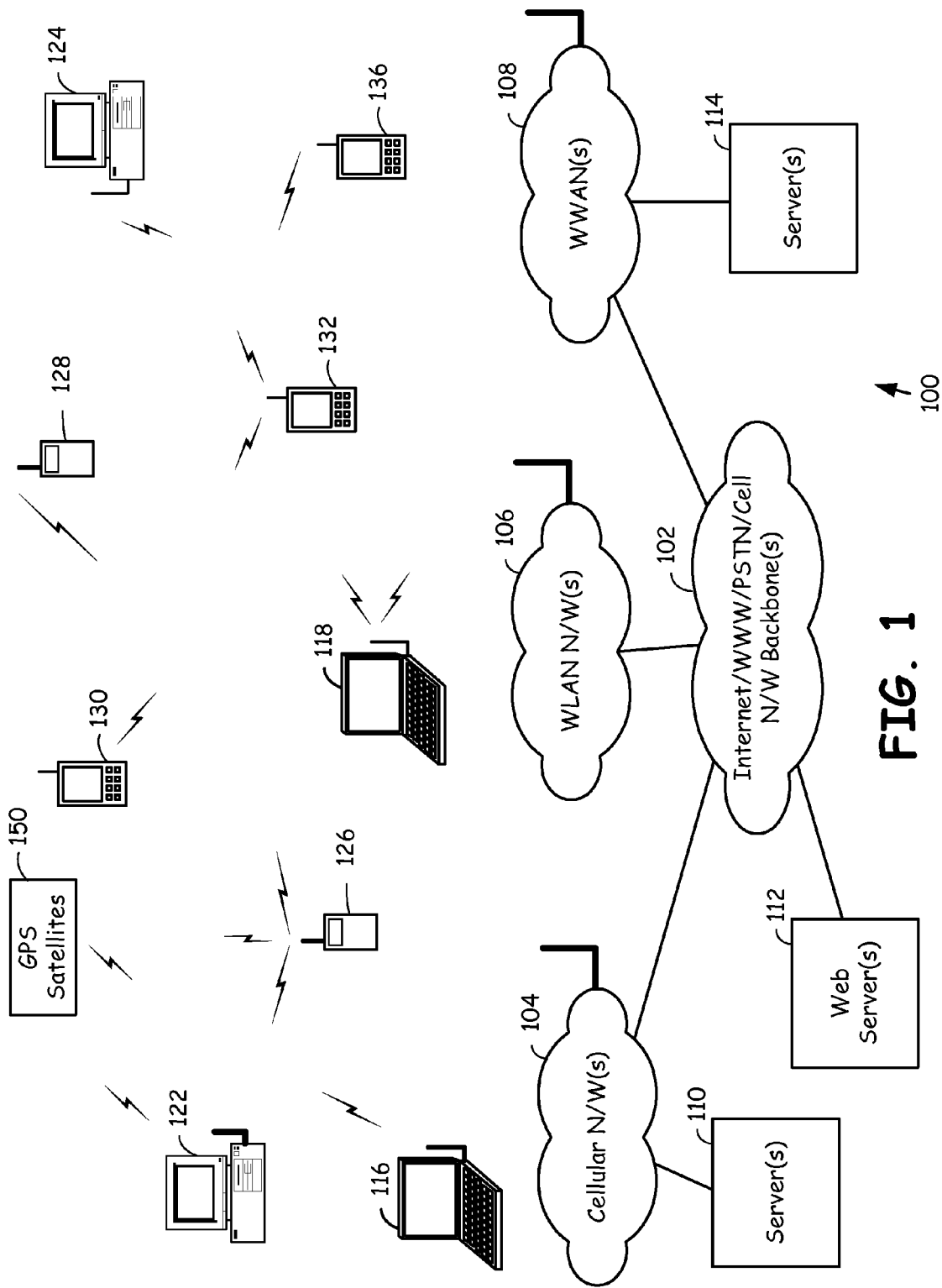
FIG. 1 is a system diagram illustrating a wireless communication system constructed and operating according to one or more embodiments of the present invention.

FIG. 1 is a system diagram illustrating a wireless communication system constructed and operating according to one or more embodiments of the present invention. The wireless communication system 100 of FIG. 1 includes a communication infrastructure and a plurality of wireless devices. The communication infrastructure includes one or more cellular networks 104, one or more wireless local area networks (WLANs) 106, and one or more wireless wide area networks (WWANs) 108. The cellular networks 104, WLANs 106, WWANs 108 all typically couple to one or more backbone networks. The backbone networks 102 may include the Internet, the Worldwide Web, one or more public switched telephone network backbones, one or more cellular network backbones, one or more private network backbones and/or other types of backbones that support communications with the various wireless network infrastructures 104, 106, and 108. Server computers may couple to these various network infrastructures. For example, server computer 110 couples to cellular network 104, web server 112 couples to the Internet/WWW/PSTN/Cell network 102, and server 114 couples to WWAN network 108. Other devices may couple to these networks as well in various other constructs.

Each of the cellular networks 104, WLANs 106, and WWANs 108 support wireless communications with wireless devices in various wireless spectra and according to various communication protocol standards. For example, the cellular network 104 may support wireless communications with wireless devices within the 800 MHz band and the 1900 MHz band, and/or other Radio Frequency (RF) bands that are allocated for cellular network communications. The cellular network 104 may support GSM, EDGE, GPRS, 3G, CDMA, TDMA, and/or various other standardized communications. Of course, these are examples only and should not be considered to limit the spectra or operations used by such cellular networks. The WLANs 106 typically operate within the Industrial, Scientific, and Medical (ISM) bands that include the 2.4 GHz and 5.8 GHz bands. The ISM bands include other frequencies as well that support other types of wireless communications, such bands including the 6.78 MHz, 13.56 MHz, 27.12 MHz, 40.68 MHz, 433.92 MHz, 915 MHz, 24.125 GHz, 61.25 GHz, 122.5 GHz, and 245 GHz bands. The WWANs networks 108 may operate within differing RF spectra based upon that which is allocated at any particular locale. Device to device communications may be serviced in one of these frequency bands as well.

The wireless network infrastructures 104, 106, and 108 support communications to and from wireless devices 116, 118, 122, 124, 126, 128, 130, 132, and/or 136. Various types of wireless devices are illustrated. These wireless devices include laptop computers 116 and 118, desktop computers 122 and 124, cellular telephones 126 and 128, portable beta terminals 130, 132, and 136. Of course, differing types of devices may be considered wireless devices within the context of the scope of the present invention. For example, automobiles themselves having cellular interfaces would be considered wireless devices according to the present invention. Further, any device having a wireless communications interface either bi-directional or unidirectional, may be considered a wireless device according to the present invention, in various other types of wireless devices. For example, wireless devices may include Global Positioning System (GPS) receiving capability to receive positioning signals from multiple GPS satellites 150.

The wireless devices 116-136 may support peer-to-peer communications as well, such peer-to-peer communications not requiring the support of a wireless network infrastructure. For example, these devices may communicate with each other in a 60 GHz spectrum, may use a peer-to-peer communications within a WLAN spectrum, for example, or may use other types of peer-to-peer communications. For example, within the ISM spectra, wireless devices may communicate according to Bluetooth protocol or any of the various available WLAN protocols supported by IEEE802.11x, for example.

Various aspects of the present invention will be described further herein with reference to FIGS. 2-16B. According to these aspects, one or more of the wireless devices includes a wide band RF receiver, RF transmitter, and/or RF transceiver. The RF receiver/transmitter/transceiver does not require multiple differing transceivers to support communications within differing frequency bands and/or according to different communication standards. While prior wireless devices that supported communications with cellular network infrastructure 104 and wireless network infrastructure 106 required separate RF transceivers, devices constructed and operating according to embodiments of the present invention do not. According to embodiments of the present invention, a single RF transceiver may be used to support communications within differing RF spectra and according to differing communication standard protocols. As will be described further with reference to FIG. 2, a signal that encompasses multiple frequency bands and multiple communication standards is referred to as a multiple frequency band multiple standards (MFBMS) signal. According to the present invention, the wireless devices include an RF transmitter and/or RF receiver that support communications using such MFBMS signals.

Figure 2:
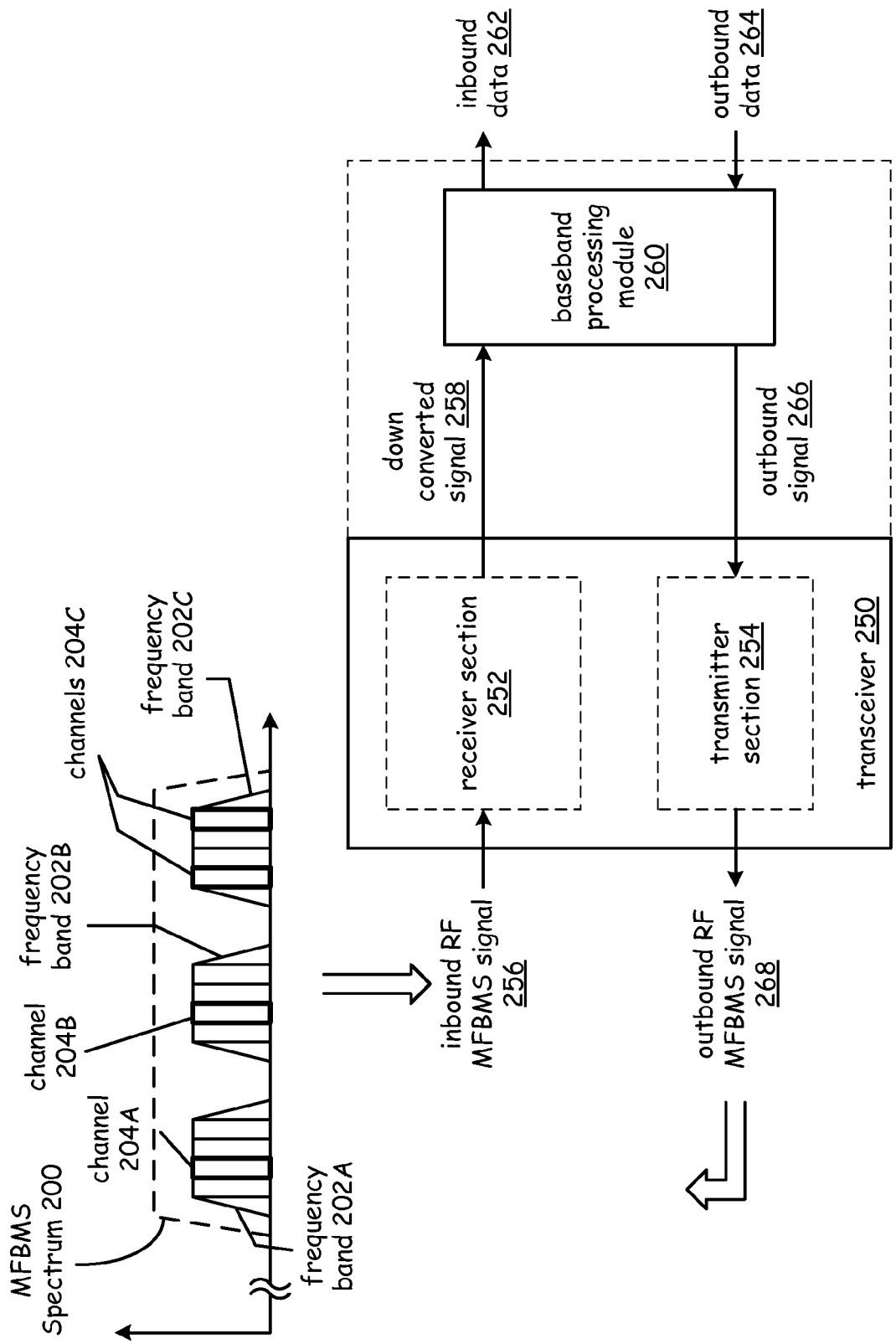
FIG. 2 is a illustrating the power spectral density of a Radio Frequency (RF) Multiple Frequency Bands Multiple Standard (MFBMS) signal and components of a wireless device that operates thereupon according to one or more embodiments of the present invention.

FIG. 2 is a combination block and signal diagram illustrating the structure of a RF MFBMS signal and components of a wireless device that operates thereupon according to one or more embodiments of the present invention. A RF MFBMS signal resides within an MFBMS spectrum 200. The MFBMS signal includes information signals within a plurality of frequency bands 202A, 202B, and 202C. Each of the information signals resides within one or more channels 204A, 204B, and 204C of corresponding frequency bands 202A, 202B, and 202C, respectively. As is shown, each frequency band 202A may include a plurality of channels. For example, frequency band 202A includes channel 204A, frequency band 202B includes channel 204B, and frequency band 202C includes channel 204C. The inbound RF MFBMS signal 256 in the example of FIG. 2 includes three differing frequency bands 202A, 202B, and 202C. However, with other embodiments of the present invention, one or more of the frequency bands 202A, 202B, and 202C may include a single wideband channel. Such wideband channel aspect may be applied to any of the information signal bands described further herein. In one particular example, these frequency bands may include cellular communication frequency bands, WLAN frequency bands, wireless personal area network (WPAN) frequency bands, global positioning system (GPS) frequency bands, 60 gigahertz/millimeter wave frequency bands, and other frequency bands.

Components of a wireless device illustrated in FIG. 2 include a transceiver 250 and baseband processing module 260. Transceiver 250 includes receiver section 252 and transmitter section 254. The receiver section 252 receives the inbound RF MFBMS signal 256 and produces a down converted signal 258 to baseband processing module 260. The down converted signal 258 may be a Baseband/Intermediate Frequency (BB/IF) MFBMS signal. The baseband processing module 260 operates upon the down converted signal 258 to produce inbound data 262. Such inbound data 262 may simply include data that has been extracted from one or more information signals carried within the inbound RF MFBMS signal 256.

Likewise, the baseband processing module 260 receives outbound data 264 and operates on the outbound data to produce an outbound signal 266, which may be an outbound BB/IF MFBMS signal. The outbound BB/IF MFBMS signal 266 is received by transmitter section 254 and converted to produce an outbound RF MFBMS signal 268. The RF MFBMS signal 268 is transmitted via an antenna.

Figure 3:
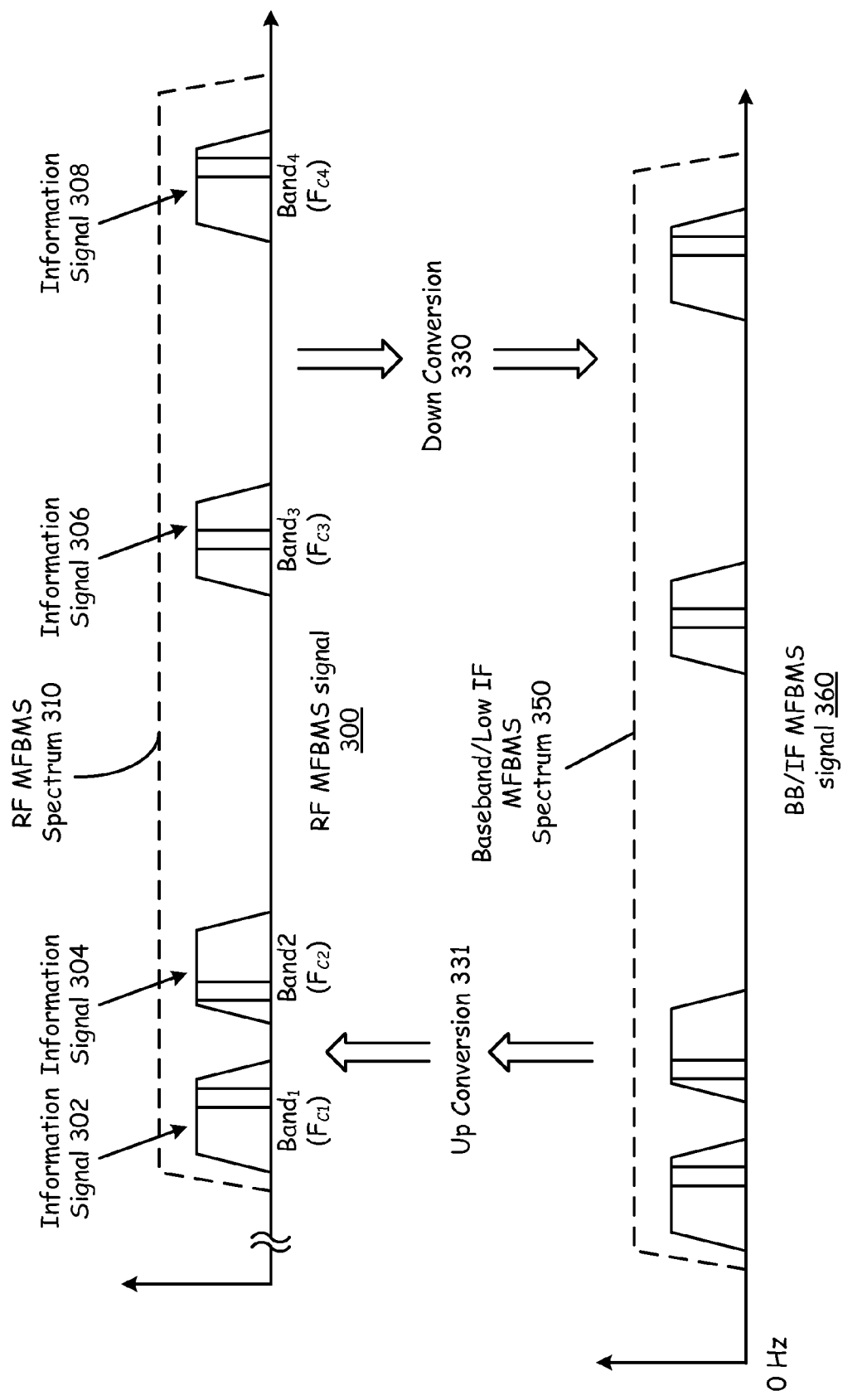
FIG. 3 is a diagram illustrating power spectral densities of a RF MFBMS signal and a Baseband/Intermediate frequency (BB/IF) MFBMS signal constructed and operated on according to one or more embodiments of the present invention.

FIG. 3 is a diagram illustrating power spectral densities of a RF MFBMS signal and a BB/IF MFBMS signal constructed and operated on according to one or more embodiments of the present invention. Operations that produce or operate upon the RF MFBMS and BB/IF MFBMS signals of FIG. 3 may be performed by any of the various wireless devices illustrated in FIG. 1, in corresponding receiver sections and/or transmitter sections. As is shown, an RF MFBMS signal 300 resides within an RF MFBMS spectrum 310. The BB/IF MFBMS signal 360 resides within a BB/IF MFBMS spectrum 350. The RF MFBMS signal 300 and/or the BB/IF MFBMS signal 360 may either be an inbound or outbound MFBMS signal. Up conversion operations 331 and down conversion operations 330 according to the present invention are used to form and operate upon the RF MFBMS signal 300, respectively. Down conversion operations 330 produce the BB/IF MFBMS signal 360 from the incoming RF MFBMS signal 300. Up conversion operations 331 produce the RF MFBMS signal 300 from the BB/MFBMS signal 360.

The RF MFBMS signal 300 includes information signals 302, 304, 306, and 308 that reside within a plurality of corresponding frequency bands. The information signal frequency bands are centered at $F_{C1}$, $F_{C2}$, $F_{C3}$, and $F_{C4}$ and have respective information signal bandwidths. These bandwidths may be dedicated, frequency division multiplexed, time division multiplexed, code division multiplexed, or combinationally multiplexed. The width of these respective frequency bands depends upon their spectral allocation, typically defined by a country or region, e.g., United States, North America, South America, Europe, etc. Each of these frequency bands may be divided into channels. However, some of these frequency bands may be wide-band allocated and not further sub-divided.

Each of these information signals 302, 304, 306, and 308 was/is formed according to a corresponding communication protocol and corresponds to a particular type of communication system. For example, band 1 may be a cellular band, band 2 may be a WLAN band, band 3 may be another cellular band, and band 4 may be a 60 GHz/MMW band. In differing embodiments, these bands may be GPS band(s) and/or WWAN bands, among other bands. An information signal band may carry bi-directional communications that may be incoming or outgoing. When the information signals are unidirectional, such as with Global Positioning System (GPS) signals, the GPS band will be present only in an incoming RF MFBMS signal but not in an outgoing RF MFBMS signal.

With the MFBMS signals of FIG. 3, all information signals residing within the RF MFBMS spectrum 310 are down converted to produce corresponding information signals within the BB/IF MFBMS spectrum 350. Likewise, all information signals residing within the BB/IF spectrum 350 are up converted to produce corresponding information signals within the RF MFBMS spectrum 310. Thus, as illustrated in FIG. 3, each of the information signals of the RF MFBMS signal 300 have corresponding information signals in the BB/IF MFBMS signal 360, which carry identical information in a same signal format but at different frequencies. Generally, FIG. 3 illustrates a simple down conversion of a wide band signal and a simple up conversion of a wideband signal. In other embodiments, as will be described further herein, not all information signals of the RF MFBMS signal have corresponding information signals in the BB/IF MFBMS signal.

Figure 4A:
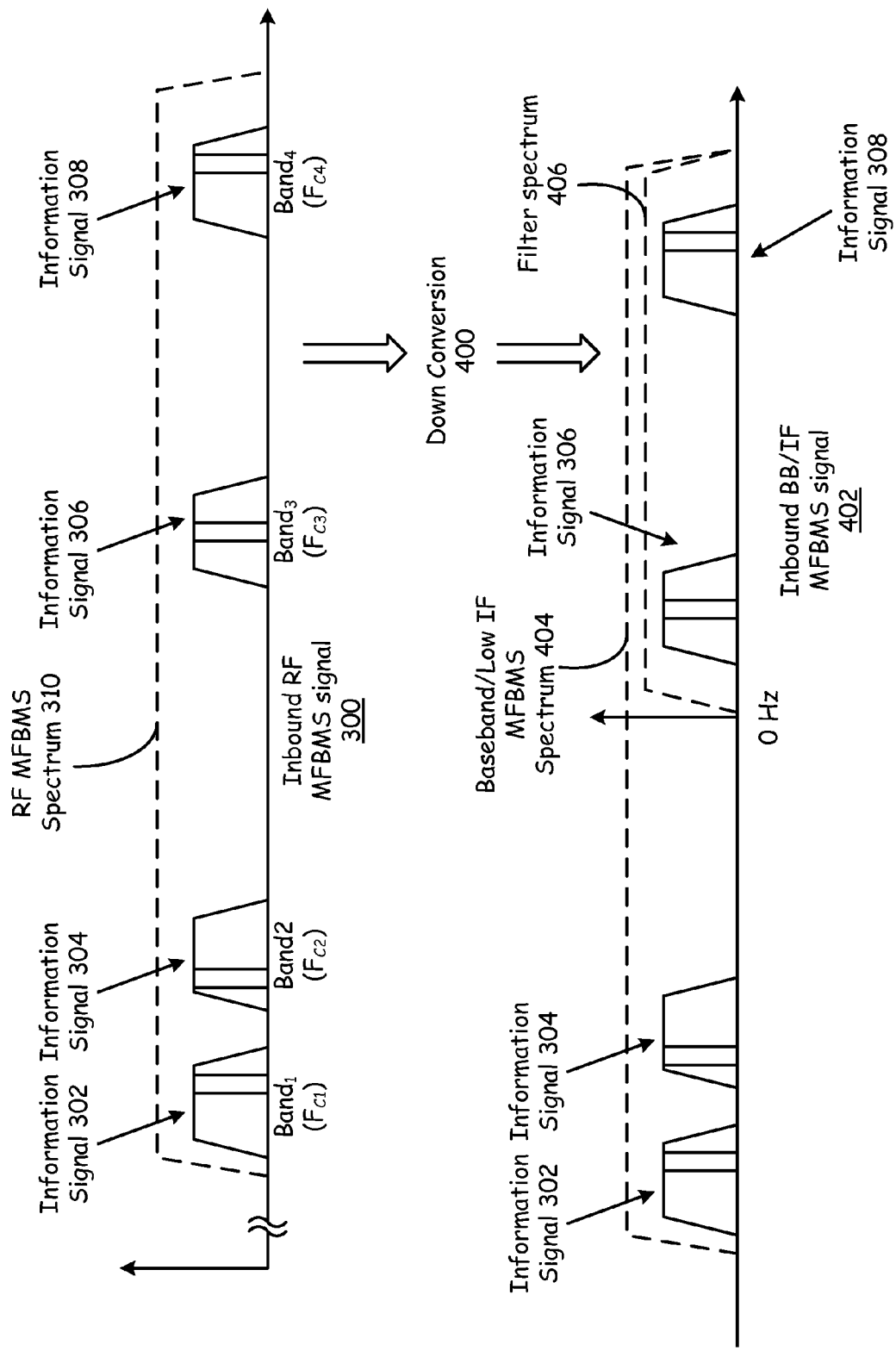
FIG. 4A is a diagram illustrating power spectral densities of a RF MFBMS signal and a BB/IF MFBMS signal constructed and operated on according to one or more embodiments of the present invention.

FIG. 4A is a diagram illustrating power spectral densities of a RF MFBMS signal and a BB/IF MFBMS signal constructed and operated on according to one or more embodiments of the present invention. As compared to FIG. 3, down conversion operations 400 of FIG. 4A produce a differing BB/IF MFBMS signal 402 from the RF MFBMS signal 300 as compared to the BB/IF MFBMS signal 360 of FIG. 3. With the example of FIG. 4A, information signals 302, 304, 306, and 308 resides within the RF MFBMS spectrum 310. Each of these information signals 302, 304, 306, and 308 has a corresponding component in the BB/IF MFBMS signal 402. However, as compared to the spectral position of the information signals 302, 304, 306, and 308 of the BB/IF MFBMS signal 360 of FIG. 3, the information signals 302, 304, 306, and 308 of the BB/IF MFBMS signal 402 of FIG. 4A reside at differing spectral positions. Such is the case because the down conversion operations 400 of FIG. 4A use a differing shift frequency than do the down conversion operations 330 of FIG. 3. In such case, a frequency shift signal used by one or more mixing components of a wireless device performing the down conversion operations 400 differs between the embodiments of FIG. 3 and FIG. 4A.

Thus, within the BB/IF MFBMS spectrum 404 of FIG. 4A, information signals 302 and 304 reside left of 0 Hz frequency while information signals 306 and 308 reside right of 0 Hz frequency. Within a wireless device performing the down conversion operations 400 of FIG. 4A, the wireless device may implement band pass (high pass) filtering using filter spectrum 406 to remove information signal 302 and 304 components less than 0 Hz while leaving information signal 306 and 308 components. Such filtering may be done using analog filter(s) and/or digital filter(s). Digital filtering using the filter spectrum 406 may be done by the baseband processing module. After such filtering operations, only information signals 306 and 308 have corresponding components within the BB/IF MFBMS signal 402. The baseband processing module then operates upon the BB/IF MFBMS signal 402 to extract data there from. According to the present invention, the baseband processing module may extract data from both/either information signals 306 and 308.

Figure 4B:
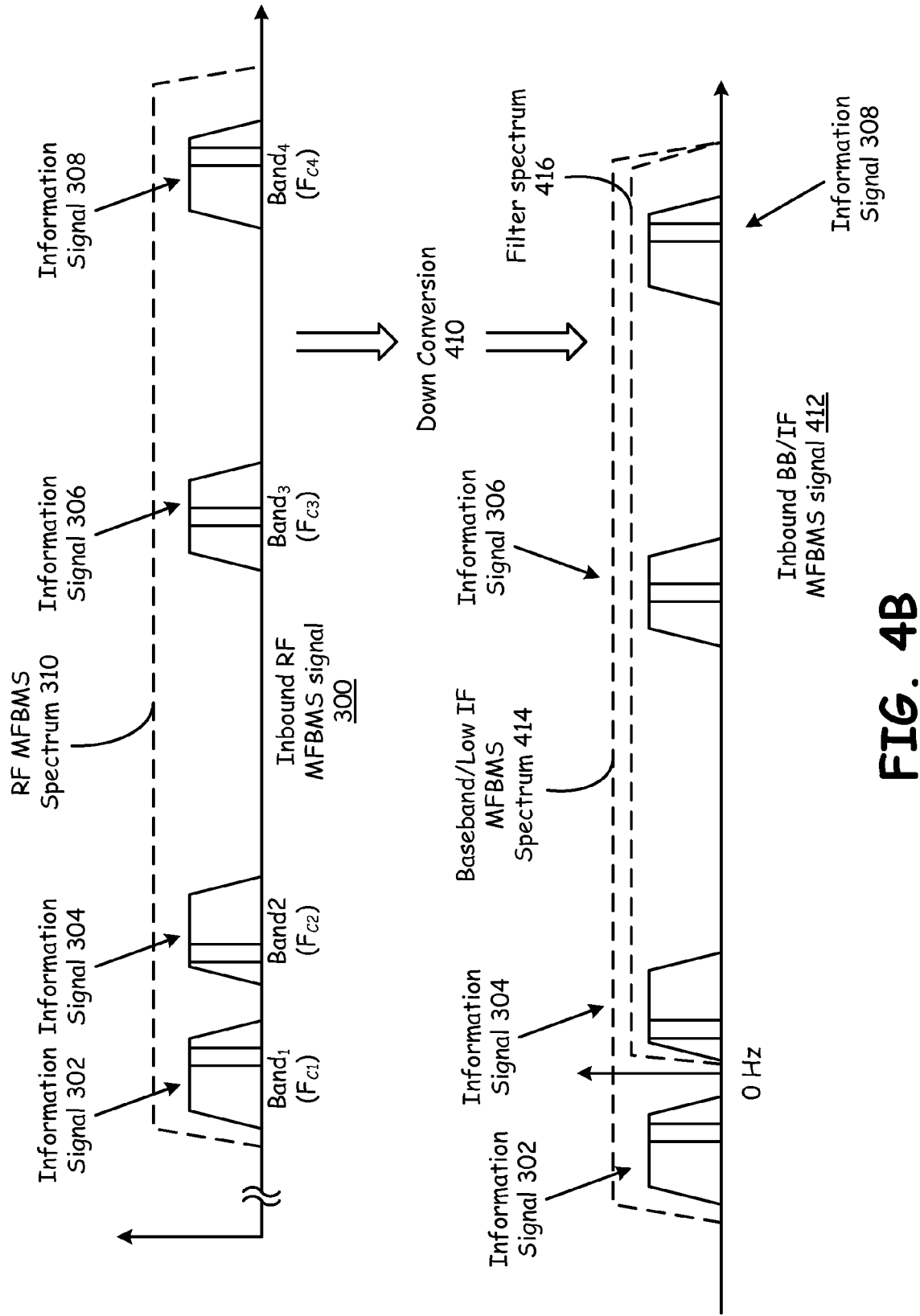
FIG. 4B is a diagram illustrating power spectral densities of a RF MFBMS signal and a BB/IF MFBMS signal constructed and operated on according to one or more embodiments of the present invention.

FIG. 4B is a diagram illustrating power spectral densities of a RF MFBMS signal and a BB/IF MFBMS signal constructed and operated on according to one or more embodiments of the present invention. The power spectral densities of the BB/IF MFBMS signal 412 of FIG. 4B differ from those of FIGS. 3 and 4A while the power spectral density of the RF MFBMS signal 300 of FIG. 4B is same/similar to that of FIGS. 3 and 4A.

Down conversion operations 410 convert the RF MFBMS signal 300 to the BB/IF MFBMS signal 412. The down conversion operations 410 are performed using a shift frequency that causes the information signals 302, 304, 306, and 308 to reside at particular locations within the baseband BB/IF MFBMS spectrum 414 with respect to 0 Hz. As contrasted to the down conversion operations 330 of FIG. 3 and to the down conversion operations 400 of FIG. 4A, the down conversion operations 410 of FIG. 4B use a differing shift frequency. With the down conversion shift frequency used with FIG. 4B, information signal 304, information signal 306, and information signal 308 have corresponding signal components at frequencies greater than 0 Hz within the BB/IF MFBMS signal 412 while information signal 302 has components below 0 Hz within the BB/IF MFBMS signal 412. Applying a filter operation using filter spectrum 416, e.g. hi pass filter, information signal 302 component of BB/IF MFBMS signal 452 is removed. After this filtering operation only information signals 304, 306, and 308 reside within the BB/IF MFBMS signal 412 and are available for data extraction there from by the baseband processing module.

Figure 4C:
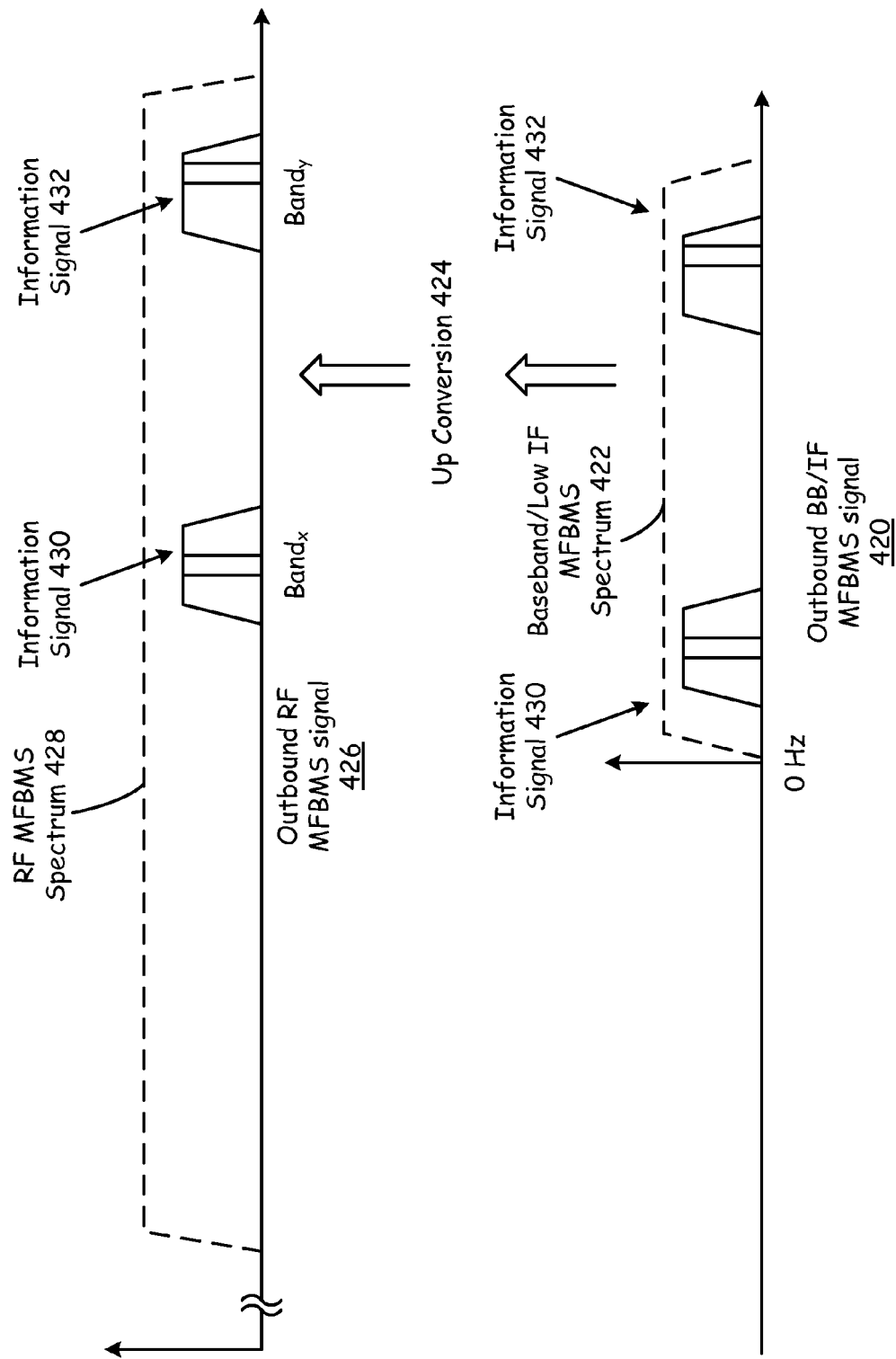
FIG. 4C is a diagram illustrating power spectral densities of a RF MFBMS signal and a BB/IF MFBMS signal constructed and operated on according to one or more embodiments of the present invention.

FIG. 4C is a diagram illustrating power spectral densities of a RF MFBMS signal and a BB/IF MFBMS signal constructed and operated on according to one or more embodiments of the present invention. The power spectral densities of the BB/IF MFBMS signal 420 and the RF MFBMS signal 426 of FIG. 4C differ from those of FIGS. 3, 4A, and 4B.

Present in a BB/IF MFBMS signal 420 are information signals 430 and 432 residing within respective information signal bands of a BB/IF MFBMS spectrum 422. Up conversion operations 424 convert the BB/IF MFBMS signal 420 to the RF MFBMS signal 426. The up conversion operations 424 are performed using a shift frequency that causes the information signals 430 and 432 to reside at particular frequency bands/center frequencies within the RF MFBMS spectrum 428. As contrasted to the up conversion operations 331 of FIG. 3, the up conversion operations 424 of FIG. 4C use a differing shift frequency. The shift frequency chosen for the up conversion operations 424 of FIG. 4C is based upon the spectral position of information signals 430 and 432 within the BB/IF MFBMS signal 420 and the desired spectral positions of the information signals 430 and 432 within the RF MFBMS signal 426. Note that the RF MFBMS spectrum 428 is empty except for the position of the information signals 430 and 432. Such is the case because the corresponding wireless device only outputs communication signals at these spectral positions, $Band_x$ and $Band_y$.

FIG. 4D is a diagram illustrating power spectral densities of a RF MFBMS signal and a BB/IF MFBMS signal constructed and operated on according to one or more embodiments of the present invention. The power spectral densities of the BB/IF MFBMS signal 450 and the RF MFBMS signal 456 of FIG. 4D differ from those of FIGS. 3, 4A, 4B, and 4C.

Present in a BB/IF MFBMS signal 450 of a BB/IF MFBMS spectrum 452 are information signals 458, 460, and 462 at respective positions. Up conversion operations 454 convert the BB/IF MFBMS signal 450 to the RF MFBMS signal 456. The up conversion operations 454 are performed using a shift frequency that causes the information signals 458, 460, and 462 to reside at particular frequency bands/center frequencies within the RF MFBMS spectrum 464. As contrasted to the up conversion operations 331 of FIG. 3 and the up conversion operations 424 of FIG. 4C, the up conversion operations 454 of FIG. 4D use a differing shift frequency. The shift frequency chosen for the up conversion operations 454 of FIG. 4D is based upon the spectral position of information signals 458, 460, and 462 within the BB/IF MFBMS signal 450 and the desired spectral positions of the information signals 458, 460, and 462 within the RF MFBMS signal 456. Note that the RF MFBMS signal 456 within the RF MFBMS spectrum 464 is empty except for the position of the information signals 458, 460, 462, and 464. Such is the case because the corresponding wireless device only outputs these information signals.

Figure 5:
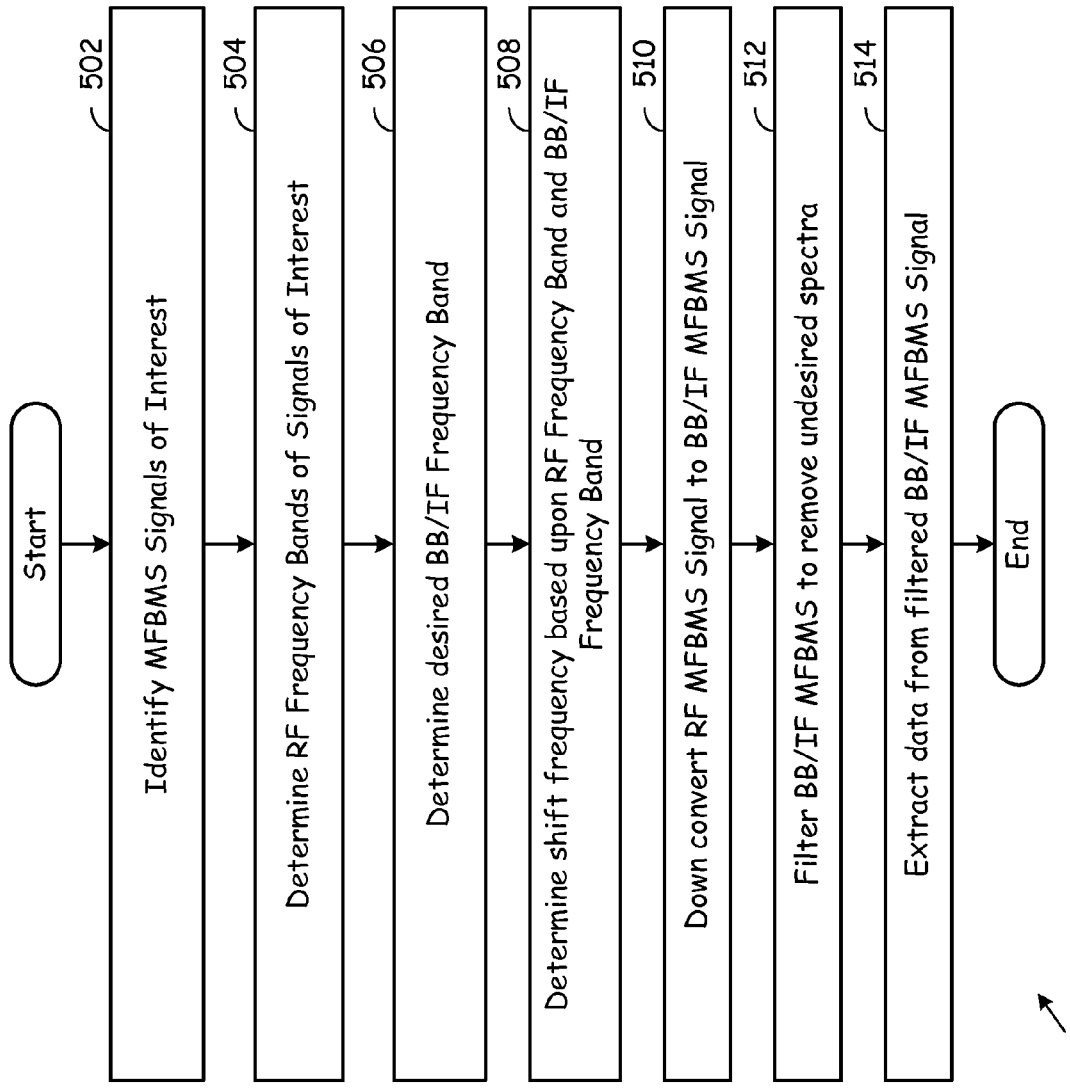
FIG. 5 is a flow chart illustrating receive operations according to one or more embodiments of the present invention.

FIG. 5 is a flow chart illustrating operations according to one or more embodiments of the present invention. The operations 500 of FIG. 5 commence with a wireless device determining a set of information signals for receipt (Step 502). The set of information signals for receipt are carried by an RF MFBMS signal that includes a plurality of information signal residing within corresponding information signal frequency bands. Referring again to FIG. 3, information signals 302, 304, 306, and 308 form the RF MFBMS signal 300. With the operation of Step 502, the wireless device may identify all of these information signals for receipt or only a portion of these information signals for receipt. The information signals may carry an inbound portion of a bi-directional communication, a GPS signal, a broadcast signal, or another type of signal. As was previously described, Referring again to FIG. 5, after Step 502 is completed, the wireless device determines the RF frequency bands of the signals of interest within the RF MFBMS signal 300. For example, referring to FIG. 3, the wireless device may determine that it is interested in information signals 306 and 308. In another operation, the wireless device may determine that it is interested in only information signals 302 and 304. In still another operation, the wireless device may determine that it is interested in information signals 302, 304, and 306.

Next, referring again to FIG. 5, the wireless device determines the desired BB/IF frequency band(s) for positioning of the information signals for data extraction operations (Step 506). For example, referring to FIG. 4A, the wireless device determines that it will extract data from information signals 306 and 308. The wireless device then decides that it would like to have the information signals 306 and 308 reside at corresponding positions within the BB/IF MFBMS spectrum 404. Likewise, with reference to FIG. 4B, the wireless device determines that it is interested in information signals 304, 306, and 308 and determines the positions for these information signals within the BB/IF MFBMS spectrum 404. A differing determination would be made for the example of FIG. 3. The wireless device makes this determination at Step 506 of FIG. 5.

Based upon the RF frequency bands of the signals of interest for receipt and the desired BB/IF MFBMS frequency bands, the wireless device then determines a shift frequency (Step 508). With the examples of FIGS. 3, 4A, and 4B, various BB/IF MFBMS signals 360, 402, and 412 are illustrated. These BB/IF MFBMS signals 360, 402, and 412 require differing shift frequencies for respective down conversion operations 330, 400, and 410 to cause the information signals to reside within desired spectra. The wireless device, at Step 508, determines the shift frequency that will result in the information signals being down converted from the RF MFBMS spectrum to reside at desired positions in the BB/IF MFBMS spectrum.

Operation 500 continues with the wireless device down converting the RF MFBMS signal to produce the BB/IF MFBMS signal using the shift frequency determined at Step 508 (Step 510). Then, the wireless device filters the BB/IF MFBMS signal to remove undesired spectra (Step 512). Examples of such filtering operations are illustrated in FIGS. 4A and 4B using filter spectrums 406 and 416, respectively.

Finally, the wireless device extracts data from the desired information signals of the filtered BB/IF MFBMS signal (Step 514).

With the operations 500 of FIG. 5, an RF receiver section of the wireless device performs differing operations for differing sets of information signals for receipt within the RF MFBMS signal. For example, for a first set of information signals of the RF MFBMS signals for receipt, the RF receiver section down converts the RF MFBMS signal by a first shift frequency to produce the BB/IF MFBMS signal. Further, for a second set of information signals of the RF MFBMS signal for receipt, the RF receiver section down converts the RF MFBMS signal by a second shift frequency to produce the BB/IF MFBMS signal, wherein the second shift frequency differs from the first shift frequency. The baseband processing module 260 of FIG. 2 for example, processes the BB/IF MFBMS signal to extract data there from.

The illustrated example of the operations 500 of FIG. 5 may be extended for a third set of information signals of the RF MFBMS signal. In such case, for a third set of information signals that differs from the first and second sets of information signals, the wireless device determines a third shift frequency that differs from both the first and second shift frequencies. The RF receiver section then down converts the RF MFBMS signal to produce the BB/IF MFBMS signal that has a third frequency spectra as compared to the differing first and second frequency spectras. Referring to all of FIGS. 3, 4A, and 4B, the three differing frequency shift examples are shown. For example, with the operations of FIG. 3, a first shift frequency produces a first BB/IF MFBMS signal 360, with the second shift frequency of FIG. 4A, down conversion operations 400 produce BB/IF MFBMS signal 402, and with the third shift frequency of FIG. 4B, down conversion operations 410 produce a BB/IF MFBMS signal 412 that differs from both the spectras of FIGS. 3 and 4A. As was shown in FIGS. 4A and 4B, high pass filter operations using filter spectrums 406 and 416, respectively, remove at least one information signal frequency band from the BB/IF MFBMS spectrums.

With various operations according to FIG. 5, the first information signal frequency band of the RF MFBMS signal may include a WLAN signal, a WPAN signal, a cellular signal, GPS signal, a MMW signal, a WWAN signal, and/or another type of information signal. These various information signals may be bidirectional communication signals or may be uni-directional communication signals such as GPS communication signals. Thus, according to the present invention, the wireless device receives information signals in multiple frequency bands and down converts them using a single down conversion operation to produce the BB/IF MFBMS signal. The down conversion operations use a shift frequency that is based upon not only the positions of the information signals within the RF MFBMS spectrum but also the desired positions of the information signals within the BB/IF MFBMS signal. Further, the down conversion shift frequency will also be determined by whether or not the wireless device can move some information signals below 0 Hz in the BB/IF MFBMS spectrum so that they can be easily filtered prior to data extraction operations.

Figure 6:
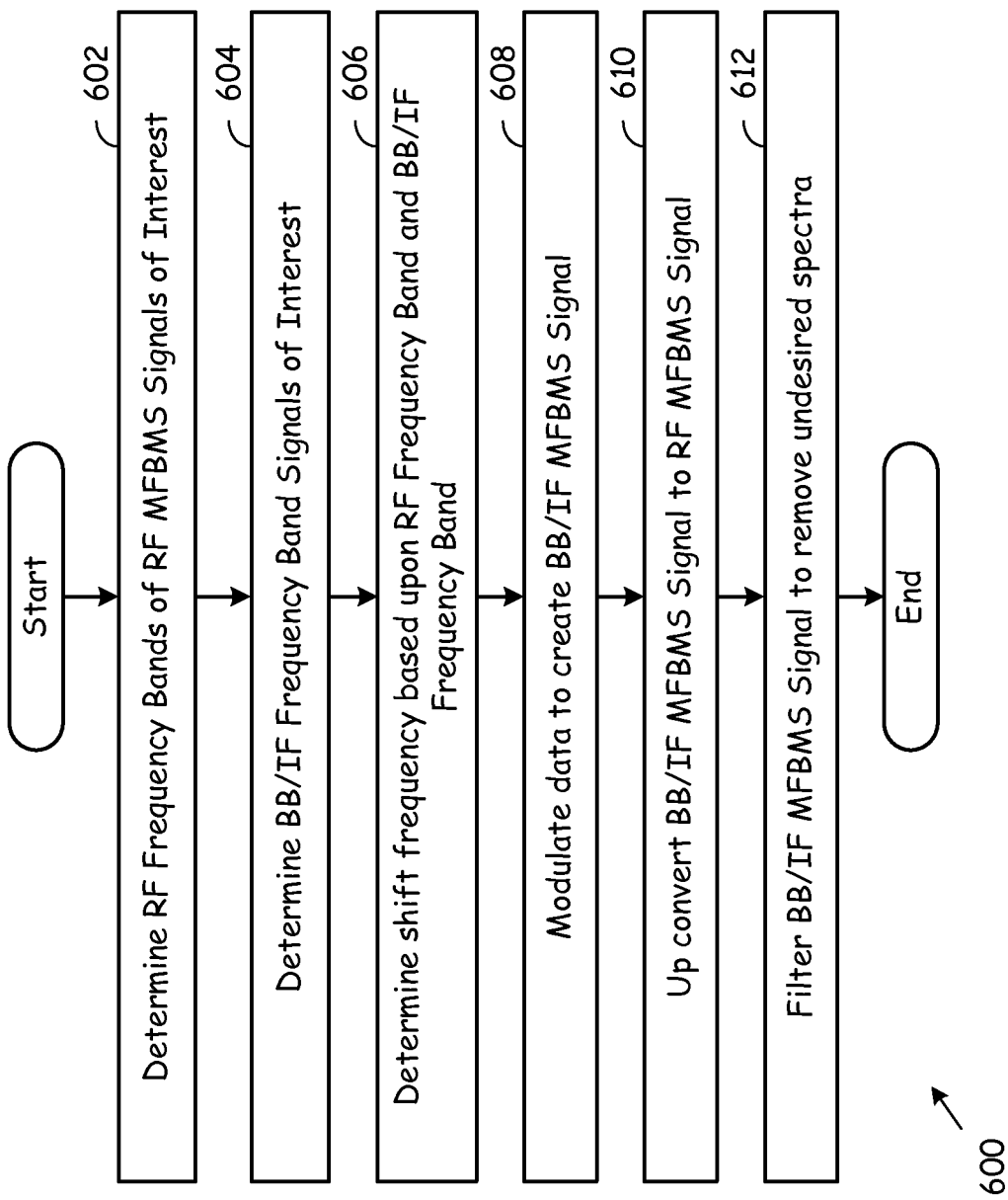
FIG. 6 is a flow chart illustrating transmit operations according to one or more other embodiments of the present invention.

FIG. 6 is a flow chart illustrating operations according to one or more other embodiments of the present invention. Transmit operations 600 of a wireless device are illustrated in FIG. 6. The transmit operations 600 include the wireless device first determining RF frequency bands of RF MFBMS signals of interest (Step 602). The wireless device then determines the location of signals of interest that will be created within the BB/IF frequency band (Step 604). For example, in some operations, the wireless device, in particular a baseband processing module, positions information signals in first spectral positions within a BB/IF MFBMS signal, see e.g., FIG. 4C, while in a second operation the wireless device positions the information signals in second spectral positions within the BB/IF signal, see e.g., FIG. 4D.

Then, the wireless device determines a shift frequency based upon the RF frequency bands and BB/IF frequency bands of the signals of interest (Step 606). The baseband processor then modulates the data to create the BB/IF MFBMS signal (Step 608). The wireless device, particularly an RF transmitter section of the wireless device, up converts the BB/IF MFBMS signal to produce the RF MFBMS signal (Step 610). The wireless device may then filter the BB/IF MFBMS signals to remove undesired spectra (Step 612).

With particular reference to FIG. 4C, a baseband processing module of a wireless device produces information signals 430 and 432 in particular corresponding locations within BB/IF MFBMS signal 420. The wireless device then determines at what frequencies the information signals 430 and 432 are to reside within the RF MFBMS signal 426. Then, based upon these frequencies, the wireless device determines a corresponding shift frequency and then performs up conversion operations 424 to produce the RF MFBMS signal 426.

With particular reference to FIG. 4D, a baseband processing module of a wireless device produces information signals 458, 460, and 462 in particular corresponding locations within BB/IF MFBMS signal 450. The wireless device then determines at what frequencies the information signals 458, 460, and 462 are to reside within the RF MFBMS signal 456. Then, based upon these frequencies, the wireless device determines a corresponding shift frequency and then performs up conversion operations 454 to produce the RF MFBMS signal 456. Note that the operations producing the signals of FIG. 4C differ from the operations producing the signals of FIG. 4D with differing shift frequencies used. Parallels between the operations of FIGS. 6 and 7 may be drawn with regard to differing shift frequencies used at differing times based upon the information signals desired for transmission.

Figure 7:
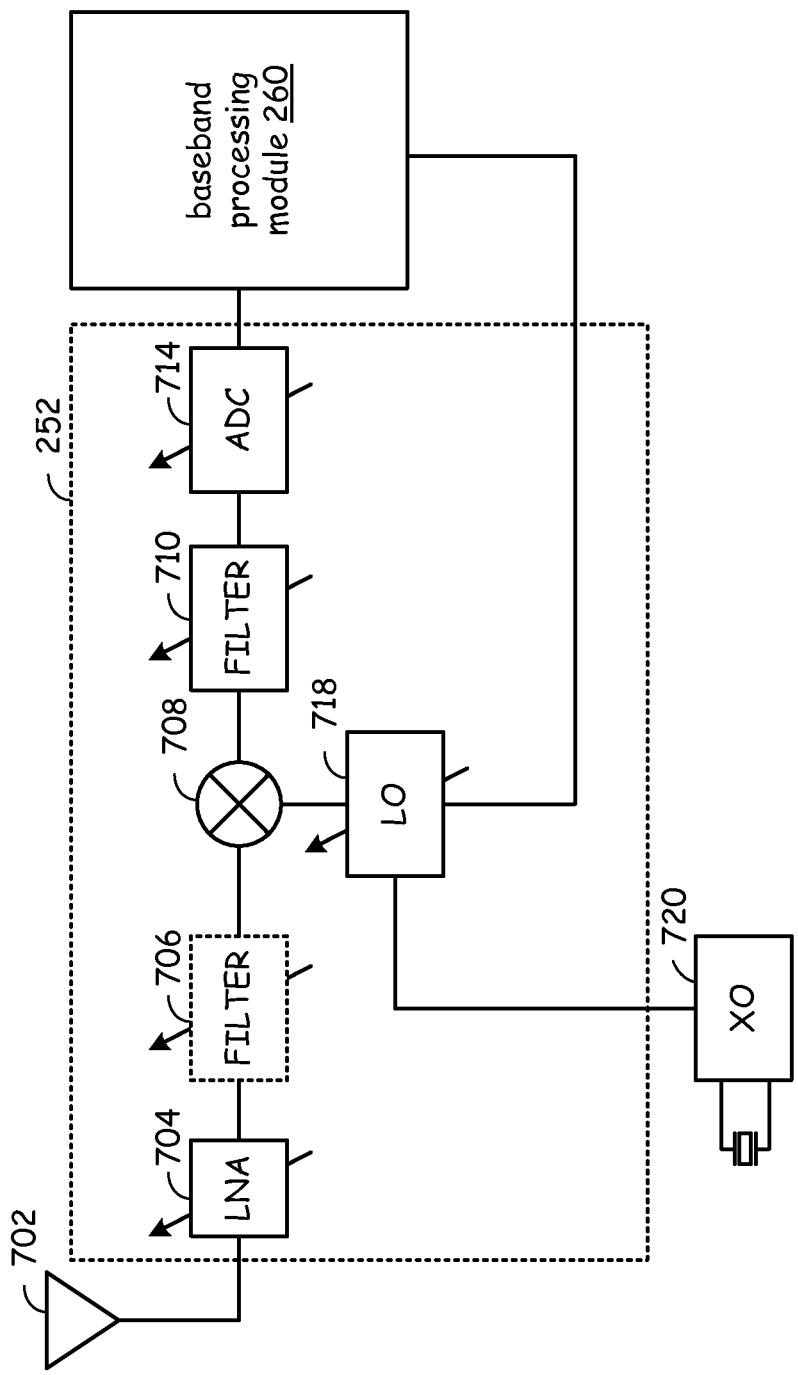
FIG. 7 is a block diagram illustrating the structure of a receiver portion of a wireless device constructed according to one or more embodiments of the present invention.

FIG. 7 is a block diagram illustrating the structure of a receiver portion of a wireless device constructed according to one or more embodiments of the present invention. The components illustrated are those of a RF receiver section 252 of a wireless device. The RF receiver section 252 components are operable to support the operations previously described with reference to FIGS. 3, 4A, 4B, and 5. The receiver section 252 receives an incoming RF MFBMS signal via antenna 702. The receiver section 252 includes low noise amplifier (LNA) 704, optional filter 706, mixer 708, filter 710, analog-to-digital converter (ADC) 714, and local oscillator (LO) 718. The baseband processing module 260 receives the BB/IF MFBMS signal from receiver section 252.

With the embodiment of FIG. 7, baseband processing module 260 provides input to LO 718 that causes the LO to produce a particular shift frequency. At differing times, the wireless device, particularly the baseband processing module 260, causes the LO to produce differing shift frequencies. In performing these operations, baseband processing module 260 executes some of the operations of FIG. 5. LNA 704, filter 706, mixer 706, filter 710, and ADC 714 may be tunable to have differing frequency transfer characteristics based upon the frequency of the signals of interest and the shift frequency. LO 718 receives an oscillation from crystal oscillator 720 and generates the shift frequency based there upon.

The various components of the receiver section 252 may be adjustable based upon either/both characteristics of the RF MFBMS signal and the BB/IF signal. In such case, the processing circuitry 260 first determines the set of information signals for receipt. The set of information signals are carried by the RF MFBMS signal within the plurality of information signal frequency bands. The processing circuitry 260 determines the shift frequency based upon the determination of the set of information signals for receipt and desired BB/IF frequencies of the down converted signal. The antenna 702 receives the RF MFBMS signal. The receiver section 252 includes down conversion circuitry 708 that down converts the RF MFBMS signals by the shift frequency to produce the BB/IF MFBMS signal.

The receiver section 252 further includes at least one adjustable analog signal path component operable to adjust at least one of the RF MFBMS signal and the BB/IF MFBMS signal. The at least one adjustable signal path component may include the LNA 704. In such embodiment, the adjustable LNA 704 is adjustable based upon a frequency band of interest of the RF MFBMS signal and/or other characteristics of the RF MFBMS signal, e.g., modulation type, SNR requirements, etc. Thus, the LNA 704 may be gain adjustable as well. The adjustable analog signal path component may also or alternatively be an analog filter 706 that operates upon the RF MFBMS signal. The analog filter 706 is frequency and/or gain adjustable based upon a frequency band of interest of the RF MFBMS signal. Generally, the adjustable filter 706 is a band pass signal that operates upon a particular frequency band of interest of the RF MFBMS signal. As was previously described and as will be subsequently described, the bandwidth and gain of the adjustable filter 706 will be established to correspond to one or more information signal bands of interest of the RF MFBMS signal. The at least one adjustable analog signal path component may also or alternatively be an analog filter 710 that operates upon the BB/IF MFBMS signal. The analog filter 710 is frequency adjustable based upon a frequency band of the corresponding BB/IF MFBMS signal. Particularly, the filter 710 may be a band pass filter, a low pass filter, or a high pass filter whose band characteristics and gain are adjusted based upon input from the baseband processing module 260 for the corresponding BB/IF MFBMS signal. Moreover, the down conversion circuitry 708 may also be bandwidth adjustable based upon one or more of the RF MFBMS signal characteristics and/or the BB/IF MFBMS signal characteristics. In some operations, the down conversion circuitry will down convert all of the RF/MFBMS signals for subsequent use. However, in other embodiments, only a particular band of interest of the RF MFBMS signal is of interest as BB/IF MFBMS signal. In such case, band characteristics and gain characteristics other down conversion circuitry 708 are adjusted such that only portions of interest of the signal are focused on with such operation. Moreover, local oscillator 718 may also be adjusted based upon the particular frequency or other characteristics of the RF MFBMS signal and/or the BB/IF MFBMS signal operated upon by the receiver section 252.

Referring still to FIG. 7, the ADC 714 is operable to digitize the BB/IF MFBMS signal produced by filter 710. According to another aspect of the present invention, the ADC 714 is tunable by the processing circuitry 260 based upon spectral characteristics to BB/IF MFBMS signal. Particular manners in which the ADC 714 may be tuned will be described further herein with reference to FIG. 14A and the reader is referenced thereto. Stated simply however, the baseband processing module 260 alters one or more of the sample rate, bandwidth, dynamic range, and/or signal to noise ratio of the ADC 714 based upon the spectral characteristics of the BB/IF MFBMS signal. By altering these characteristics of the ADC 714, the power consumption of the ADC 714 may be reduced when full resolution/full performance of the ADC 714 is not required. Such reduction in power consumption of ADC 714 is particularly important for battery powered wireless devices such as those contemplated according to the present invention.

Figure 8:
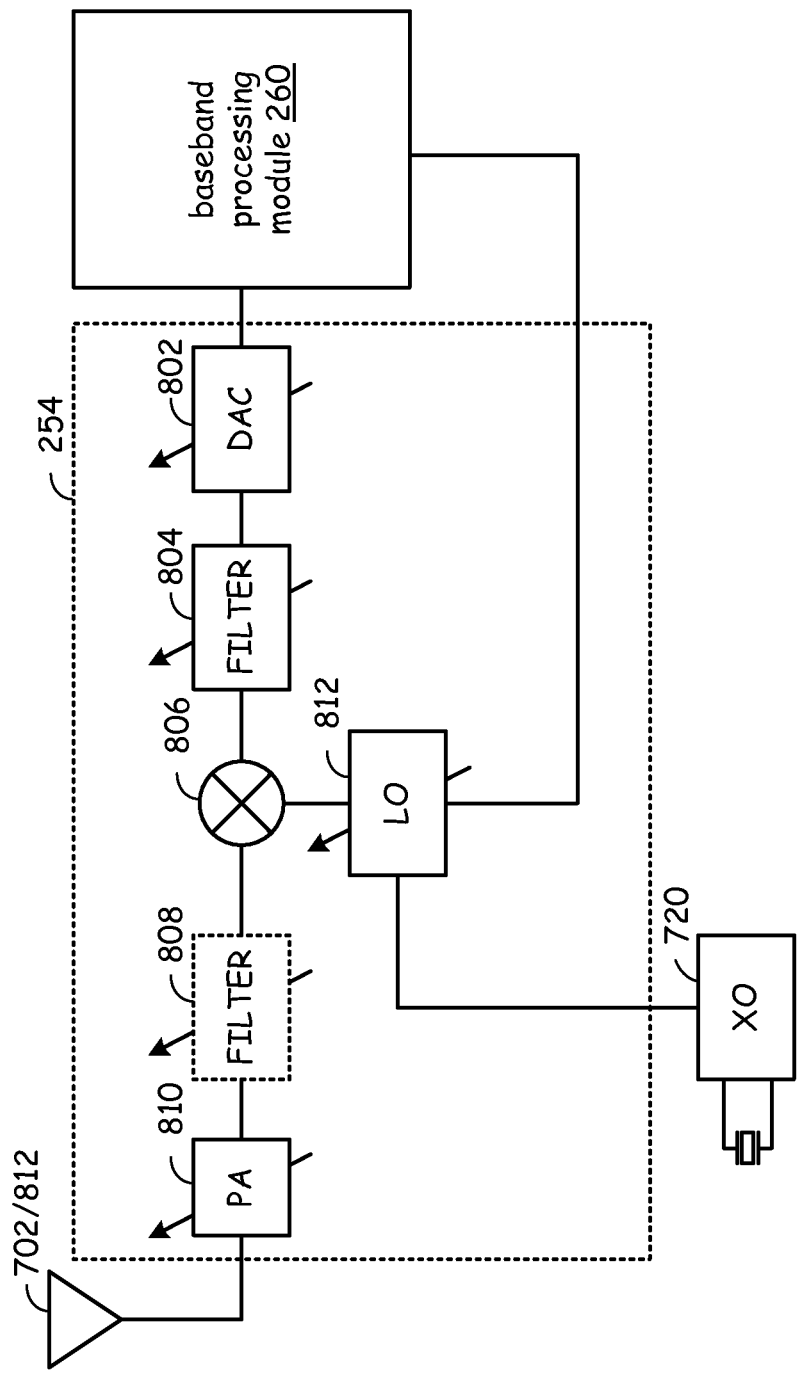
FIG. 8 is a block diagram illustrating the structure of a transmitter portion of a wireless device constructed according to one or more embodiments of the present invention.

FIG. 8 is a block diagram illustrating the structure of a transmitter portion of a wireless device constructed according to one or more embodiments of the present invention. The transmitter section 254 couples to baseband processing module 260 and to antenna 702/812. The transmitter section and receiver section of a wireless device may share a single antenna or may use differing antennas. Further, in differing embodiments, the wireless device may include multiple antennas that are coupled to the transmitter section and receiver section via antenna coupling.

The baseband processing module 260 produces a BB/IF MFBMS signal to transmitter section 254. The transmitter section 254 includes a digital-to-analog controller (DAC) 802, filter 804, mixer 806, filter 808, and power amplifier (PA) 810. The output of PA 810 (RF MFBMS signal) is provided to antenna 702/812 for transmission. The LO 812 produces a shift frequency based upon inputs from baseband processing module 260 and a crystal oscillation signal received from crystal oscillator 720.

In its operation, the transmitter section 254 up converts the BB/IF MFBMS signal to the RF MFBMS signal based upon a shift frequency as determined by input received from baseband processing module 260. The PA 810, filter 808, mixer 806, filter 804, and/or DAC 802 may be frequency tunable with the tuning based upon the frequency band of the BB/IF MFBMS signal and the frequency spectra of the RF MFBMS signal. LO 812 is also tunable to produce differing shift frequencies over time. In some embodiments, the receiver section 252 and the transmitter section 254 may share an LO.

Each of the analog signal path components of the transmitter section may be frequency adjustable. The processing circuitry may determine at least one setting to be applied to each of the frequency adjustable analog signal path components 810, 808, 806, and 804. In such case, the processing circuitry 260 will determine the settings for the adjustable analog signal path components based upon the BB/IF information signal and the RF MFBMS signal.

The adjustable analog signal path component may include a frequency adjustable PA 810 whose frequency response is adjusted based upon a frequency band of interest of the RF MFBMS signal. Further, the at least one adjustable analog signal path component may be an analog filter 808 that operates upon the RF MFBMS signal and that is frequency band adjustable based upon frequency content of the RF MFBMS signal, e.g., based upon at least one frequency band of interest of the RF MFBMS signal.

The adjustable analog signal path component may be an adjustable analog filter 804 that operates upon the BB/IF MFBMS signal. In such case, the analog filter 804 is frequency adjustable based upon a frequency band of the corresponding BB/IF MFBMS signal. Finally, the up conversion circuitry 806 may be bandwidth adjusted by the baseband processing module 260 based upon the characteristics of one or more of the BB/IF MFBMS signal and the RF/IF MFBMS signal.

Figure 9:
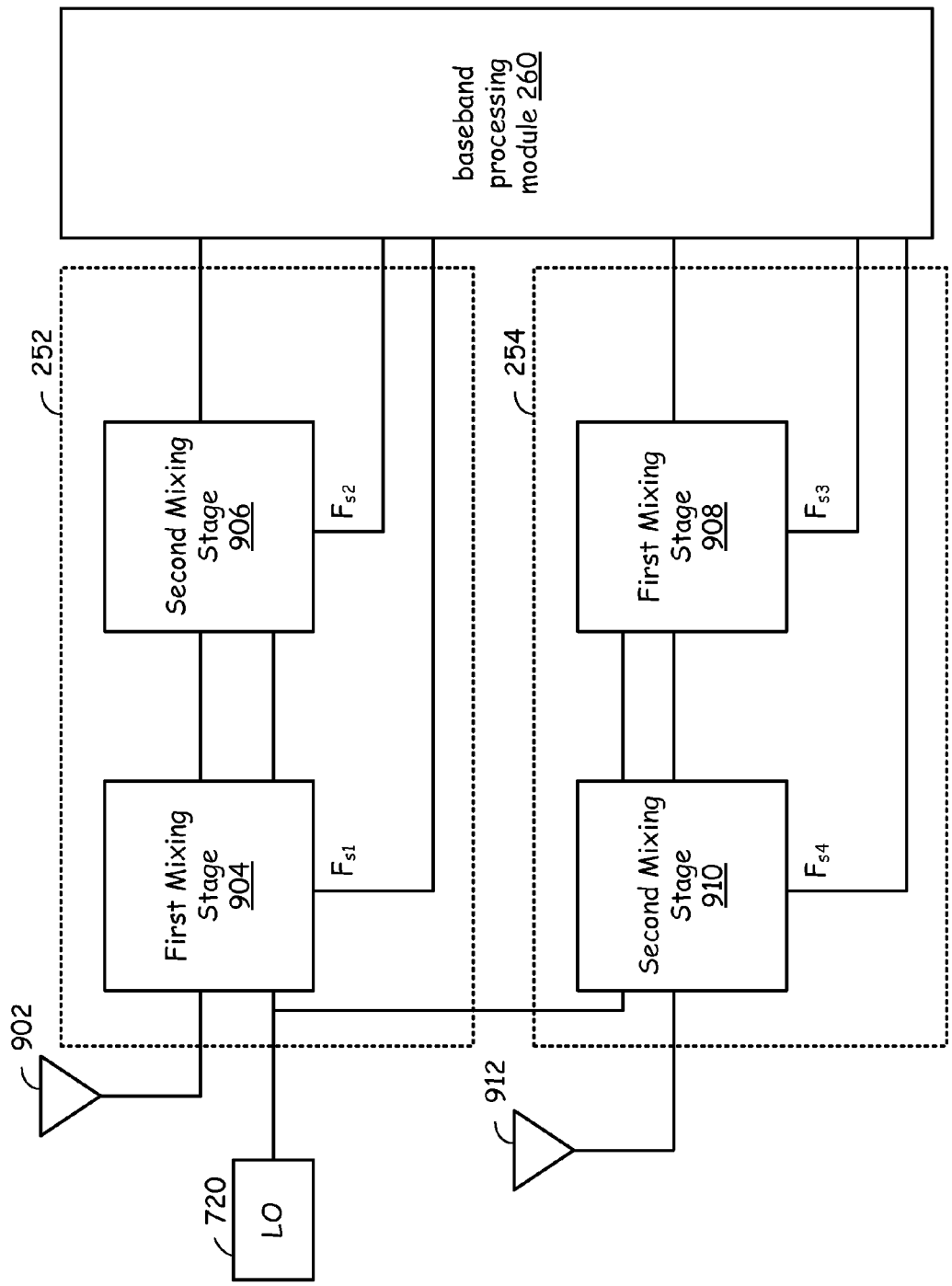
FIG. 9 is a block diagram illustrating receiver and transmitter portions of a wireless device constructed according to another embodiment of the present invention utilizing a super heterodyne architecture.

FIG. 9 is a block diagram illustrating receiver and transmitter portions of a wireless device constructed according to another embodiment of the present invention utilizing a super heterodyne architecture. With the structure of FIG. 9, up conversion operations from BB/IF to RF and down conversion operations from RF to BB/IF are performed in multiple stages. The structure of FIG. 9 may be employed with any of the operations of the present invention.

The receiver section 252 includes first mixing stage 904 and second mixing stage 906. The first mixing stage 904 receives a crystal oscillation from local oscillator 720, the RF MFBMS signal from antenna 902, and one or more shift frequency control inputs from the baseband processing module 260. The first mixing stage 904 performs a first down conversion operation based upon input signal $F_{s1}$. The output of first mixing stage 904 is received by second mixing stage 906 that performs a second down conversion operation based upon the shift frequency $F_{s2}$. The output of the second mixing stage 906 is the BB/IF MFBMS signal that is received by baseband processing module 260. Baseband processing module 260 extracts data from information signals contained within the BB/IF MFBMS signal.

On the transmit side, transmitter section 254 receives BB/IF MFBMS signal from baseband processing module 260. The first mixing stage 908 up converts by a third shift frequency $F_{s3}$ the BB/IF MFBMS signal. The up converted signal produced by the first mixing stage 908 is received by second mixing stage 910 that performs a second up conversion operation on the signal and produces an RF MFBMS signal. The RF MFBMS signal is output to antenna 912 with the embodiment of FIG. 9. However as was previously described, differing embodiments of wireless device constructed according to the present invention may include multiple antennas and/or may include the receiver section 252 and transmitter section 254 sharing one or more antennas.

Figure 10:
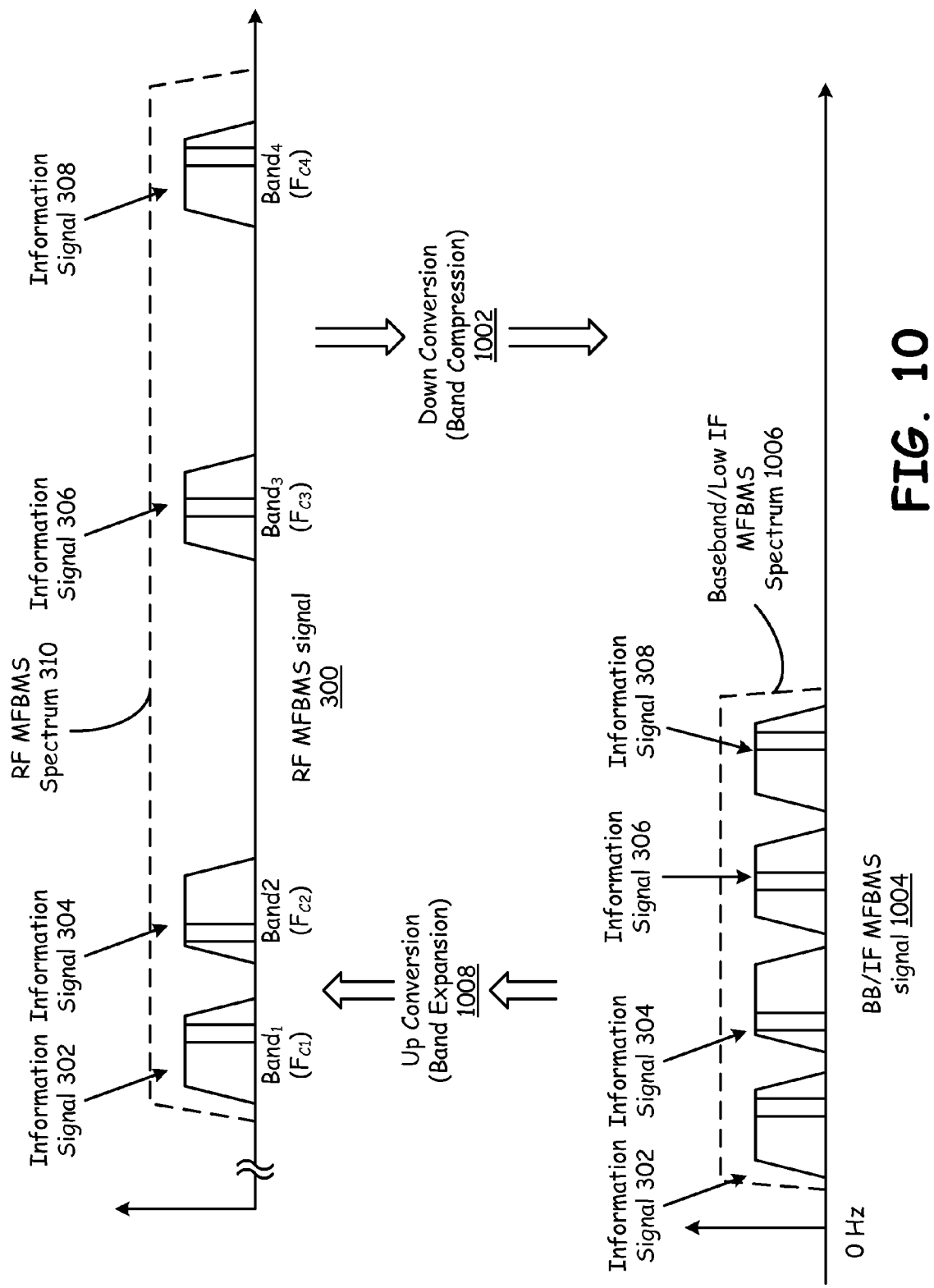
FIG. 10 is a diagram illustrating power spectral densities of a RF MFBMS signal and a BB/IF MFBMS signal constructed and operated on according to one or more embodiments of the present invention.

FIG. 10 is a diagram illustrating power spectral densities of a RF MFBMS signal and a BB/IF MFBMS signal constructed and operated on according to one or more embodiments of the present invention. In particular, power spectral densities of a RF MFBMS signal 300 and a BB/IF MFBMS signal 1004 are shown. The RF MFBMS signal 300 includes information signals 302, 304, 306, and 308 within RF MFBMS spectrum 310. Each of these information signals 302, 304, 306, and 308 resides within corresponding information signal bands centered at corresponding center frequencies.

While the RF MFBMS signal 300 of FIG. 10 is similar to that which is illustrated in FIGS. 3, 4A, and 4B, the corresponding BB/IF MFBMS 1004 is not. As contrasted to the power spectral densities of the BB/IF MFBMS signals of FIGS. 3, 4A, and 4B, the down conversion operations 1002 of FIG. 10 result in band compression such that the information signals 302, 304, 306, and 308 of the BB/IF MFBMS signal 1004 have a differing frequency band separation than do the corresponding information signals of FIGS. 3, 4A, and 4B. The information signals 302, 304, 306, and 308 of the RF MFBMS signal 300 have a first frequency band separation. The information signals 302, 304, 306, and 308 of the BB/IF MFBMS signal 1004 have a second frequency band separation that differs from the first frequency band separation. The down conversion operations 1002 are performed such that band compression results.

Likewise, the up conversion operations 1008 of the BB/IF MFBMS signal 1004 to the RF MFBMS signal 300 perform band expansion, resulting in alteration of frequency separation of the information signals within corresponding spectra. Thus, the up conversion operations of FIG. 10 differ from those of FIGS. 3, 4B, and 4C. Operations that cause such frequency band compression and frequency band expansion will be described further herein with reference to FIGS. 12 and 13, respectively. Structures that are operable to create and operate upon these signals will be described further herein with reference to FIGS. 14A, 14B, 15A, 15B, 16A, and 16B.

Figure 11A:
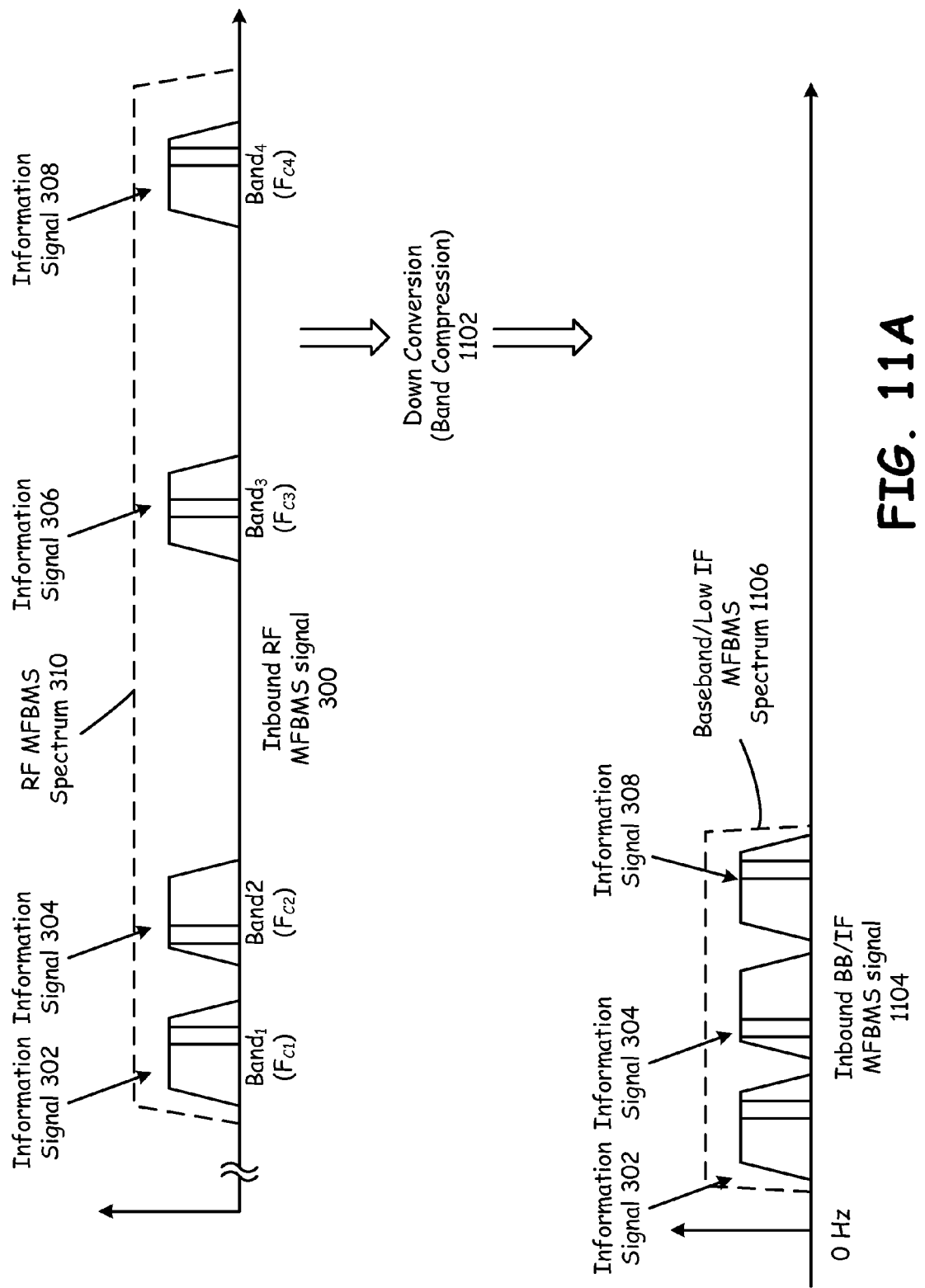
FIG. 11A is a diagram illustrating power spectral densities of a RF MFBMS signal and a BB/IF MFBMS signal constructed and operated on according to one or more embodiments of the present invention.

FIG. 11A is a diagram illustrating power spectral densities of a RF MFBMS signal and a BB/IF MFBMS signal constructed and operated on according to one or more embodiments of the present invention. With the operations of FIG. 11A, inbound RF MFBMS signal 300 is down converted by down conversion operations 1102 to perform band conversion, band compression, and band deletion such that not all information signals 302, 304, 306, and 308 signals are present in the inbound BB/IF MFBMS signal 1104. With the example of FIG. 11A, only information signals 302, 304 and 308 are present in the inbound BB/IF MFBMS signal 1104. Further, as is shown, information signals 302, 304, and 308 in the inbound BB/IF MFBMS signal 1104 reside within a BB/IF MFBMS spectrum 1106 that differs from the BB/IF MFBMS spectrum 1106 of FIG. 10. Further, the band separation of information signals 302, 304, and 308 of the RF MFBMS signal 300 differs from the band separation of the BB/IF MFBMS signal 1104.

Figure 11B:
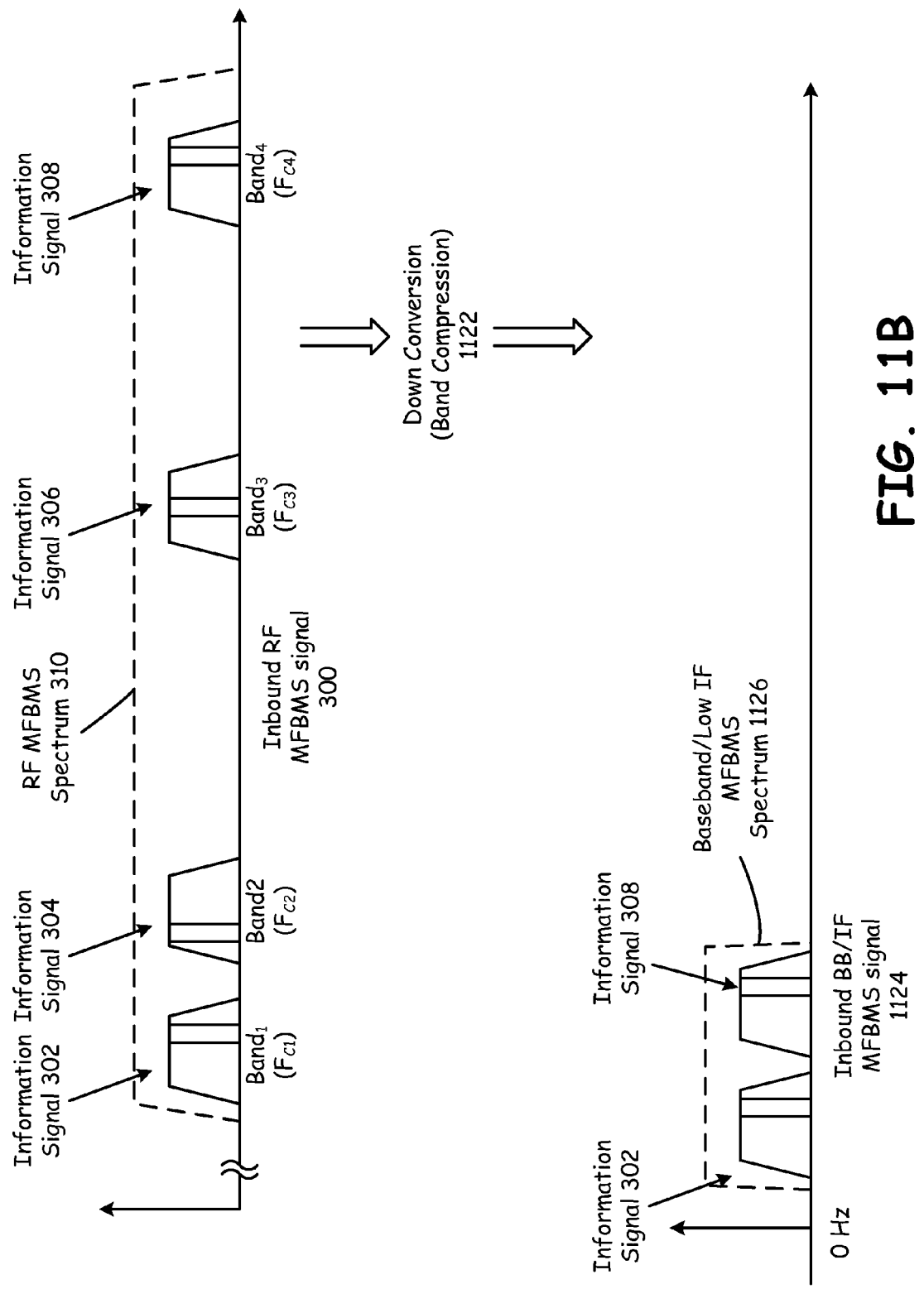
FIG. 11B is a diagram illustrating power spectral densities of a RF MFBMS signal and a BB/IF MFBMS signal constructed and operated on according to one or more embodiments of the present invention.

FIG. 11B is a diagram illustrating power spectral densities of a RF MFBMS signal and a BB/IF MFBMS signal constructed and operated on according to one or more embodiments of the present invention. With the operations of FIG. 11B, inbound RF MFBMS signal 300 is down converted by down conversion operations 1122 to perform band conversion, band compression, and band deletion such that not all information signals 302, 304, 306, and 308 signals are present in the inbound BB/IF MFBMS signal 1104. With the example of FIG. 11B, only information signals 302 and 308 are present in the inbound BB/IF MFBMS signal 1124. Further, as is shown, information signals 302 and 308 in the inbound BB/IF MFBMS signal 1124 reside within a baseband/low IF MFBMS spectrum 1126 that differs from the BB/IF MFBMS spectrum 1006 of FIG. 10 and the BB/IF MFBMS spectrum 1106 of FIG. 11A.

Figure 11C:
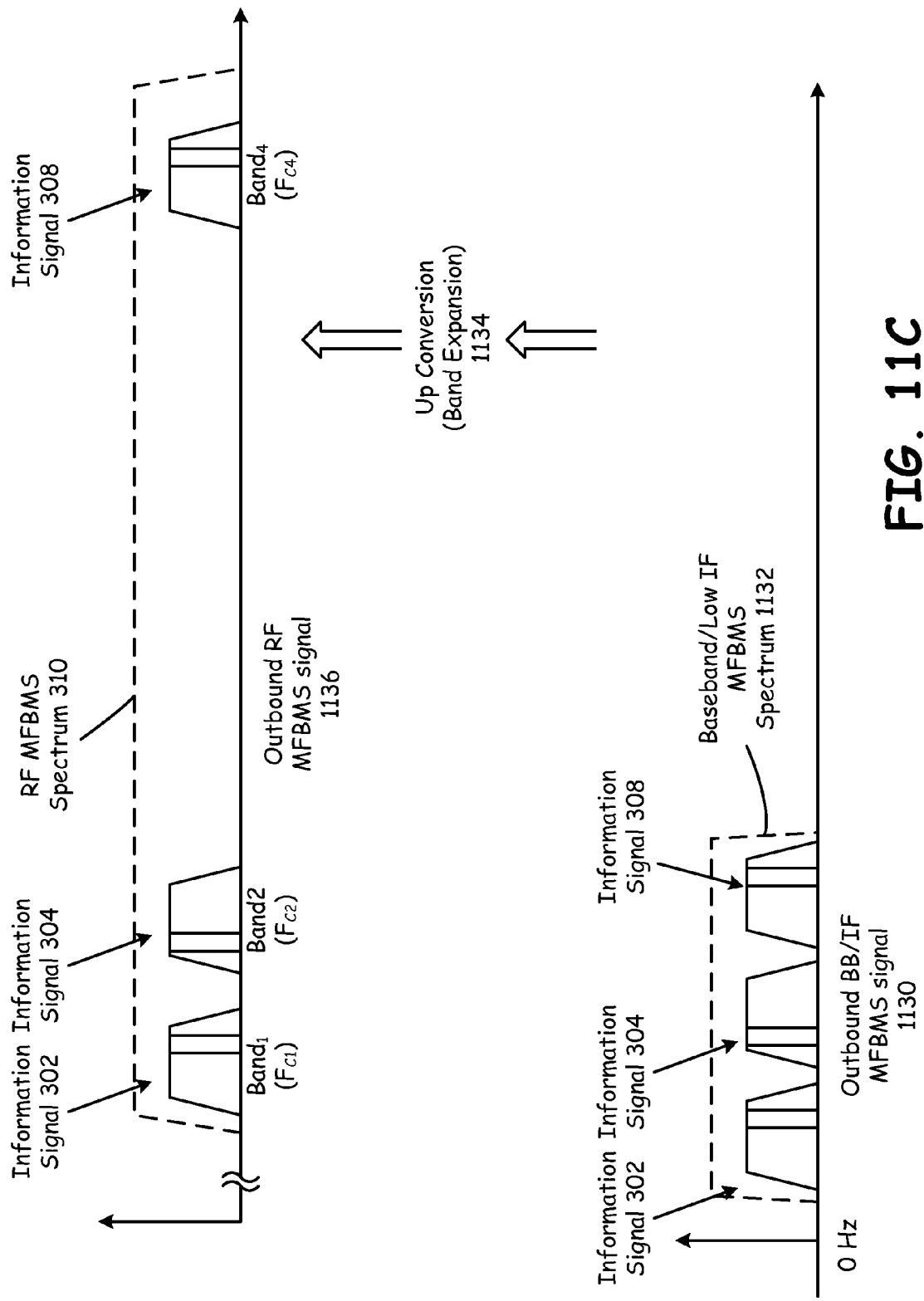
FIG. 11C is a diagram illustrating power spectral densities of a RF MFBMS signal and a BB/IF MFBMS signal constructed and operated on according to one or more embodiments of the present invention.

FIG. 11C is a diagram illustrating power spectral densities of a RF MFBMS signal and a BB/IF MFBMS signal constructed and operated on according to one or more embodiments of the present invention. With the operations of FIG. 11C, outbound BB/IF MFBMS signal 1130 is up converted by up conversion operations 1134 to perform band conversion and band expansion such that all information signals 302, 304, and 308 signals are present in the outbound RF MFBMS signal 1136 but have differing frequency separation as compared to the outbound BB/IF MFBMS signal 1130. With the example of FIG. 11C, information signals 302, 304, and 308 have a first frequency separation in the BB/IF MFBMS spectrum 1132 and a second frequency separation in the RF MFBMS spectrum 310. The first frequency separation differs from the second frequency separation.

Figure 11D:
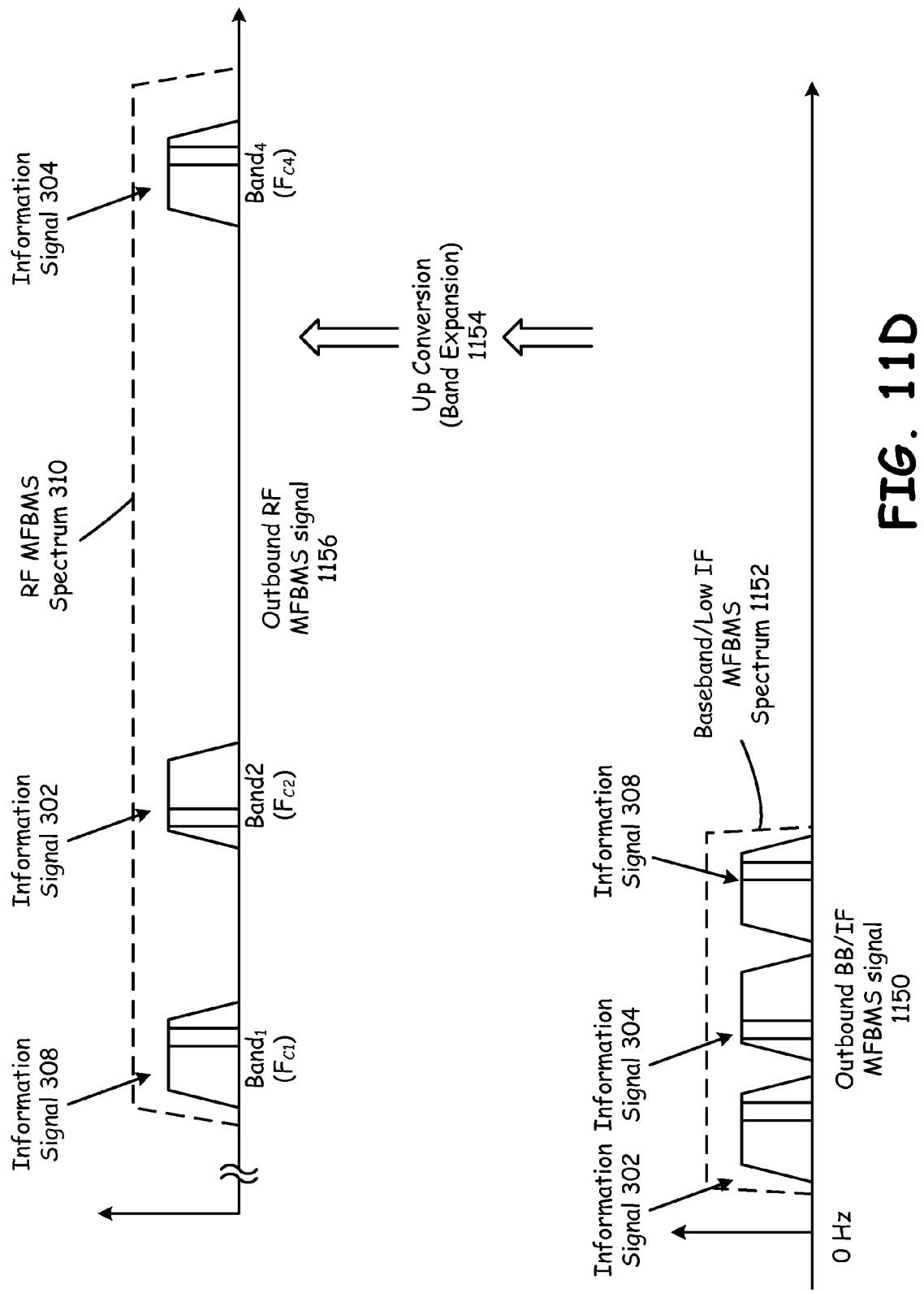
FIG. 11D is a diagram illustrating power spectral densities of a RF MFBMS signal and a BB/IF MFBMS signal constructed and operated on according to one or more embodiments of the present invention.

FIG. 11D is a diagram illustrating power spectral densities of a RF MFBMS signal and a BB/IF MFBMS signal constructed and operated on according to one or more embodiments of the present invention. With the operations of FIG. 11D, outbound BB/IF MFBMS signal 1150 is up converted by up conversion operations 1154 to perform band conversion and band expansion such that all information signals 302, 304, and 308 signals are present in the outbound RF MFBMS signal 1156 but have differing frequency separation therein as compared to the outbound BB/IF MFBMS signal 1150. With the example of FIG. 11D, information signals 302, 304, and 308 have a first frequency separation in the BB/IF MFBMS spectrum 1152 and a second frequency separation in the RF MFBMS spectrum 310. The first frequency separation differs from the second frequency separation.

Figure 12:
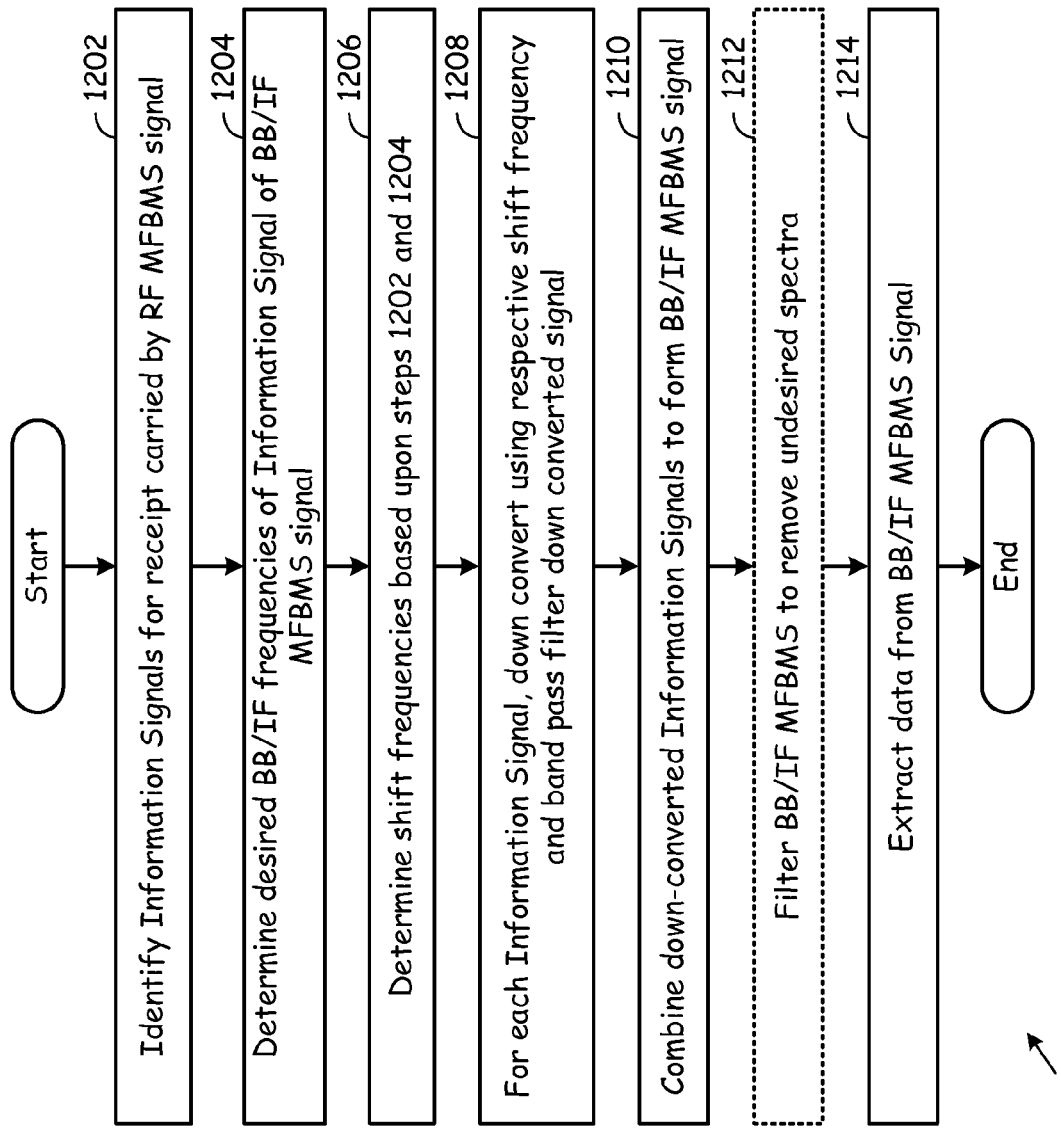
FIG. 12 is a flow chart illustrating receive operations according to one or more embodiments of the present invention.

FIG. 12 is a flow chart illustrating receive operations according to the present invention. Particularly, FIG. 12 considers receive operations 1200 of a wireless device. These operations 1200 are consistent with the power spectral densities of FIGS. 10, 11A, and 11B and with the structure of FIGS. 14A and 14B. These operations 1200 commence with the wireless device identifying information signals for receipt that are carried by the RF MFBMS signal (Step 1202). The wireless device then determines the desired BB/IF frequency/frequencies of information signal(s) that will be produced in the BB/IF MFBMS signal (Step 1204). Operation continues with the wireless device determining one or more shift frequencies based upon the operations of Steps 1202 and 1204 (Step 1206). The reader should understand that the shift frequencies that are applied to the various information signals 302, 304, 306, and 308 of the RF MFBMS signal 300 during subsequent down conversion operations are determined using a number of differing considerations. A first consideration is which of the information signals 302, 304, 306, and/or 308 are desired for receipt by the wireless device. For example, if the wireless device is only currently operating upon a cellular information signal and a WPAN signal, only those two information signals will be used in determining the shift frequencies at Step 1206 even though many other information signals may be available for receipt. Further, the location of the information signals within the BB/IF MFBMS spectrum 1006, 1106 or 1126 are also considered in determining the shift frequency.

For each information signal, an RF receiver section of a wireless device performs down conversion using respective shift frequencies and band pass filters (Step 1208). Operation continues with combining the down converted information signals to form the BB/IF MFBMS signal (Step 1210). The BB/IF MFBMS signal is then optionally filtered at Step 1212 to remove undesired spectra. Then, the wireless device extracts data from the BB/IF MFBMS signal (Step 1214).

The operations 1200 of FIG. 12 differ for each of the illustrated power spectral densities of FIGS. 10, 11A, and 11B. With embodiment of FIG. 10, the inbound BB/IF MFBMS signal 1004 includes information signals 302, 304, 306, and 308. With the embodiment of FIG. 11A, the inbound BB/IF MFBMS signal 1104 includes information signals 302, 304, and 308. With the embodiment of FIG. 11B, the inbound BB/IF MFBMS signal 1124 includes information signals 302 and 308. Thus, the operations 1200 of FIG. 12 will be different for the differing power spectral densities illustrated in FIGS. 10, 11A, and 11B.

Figure 13:
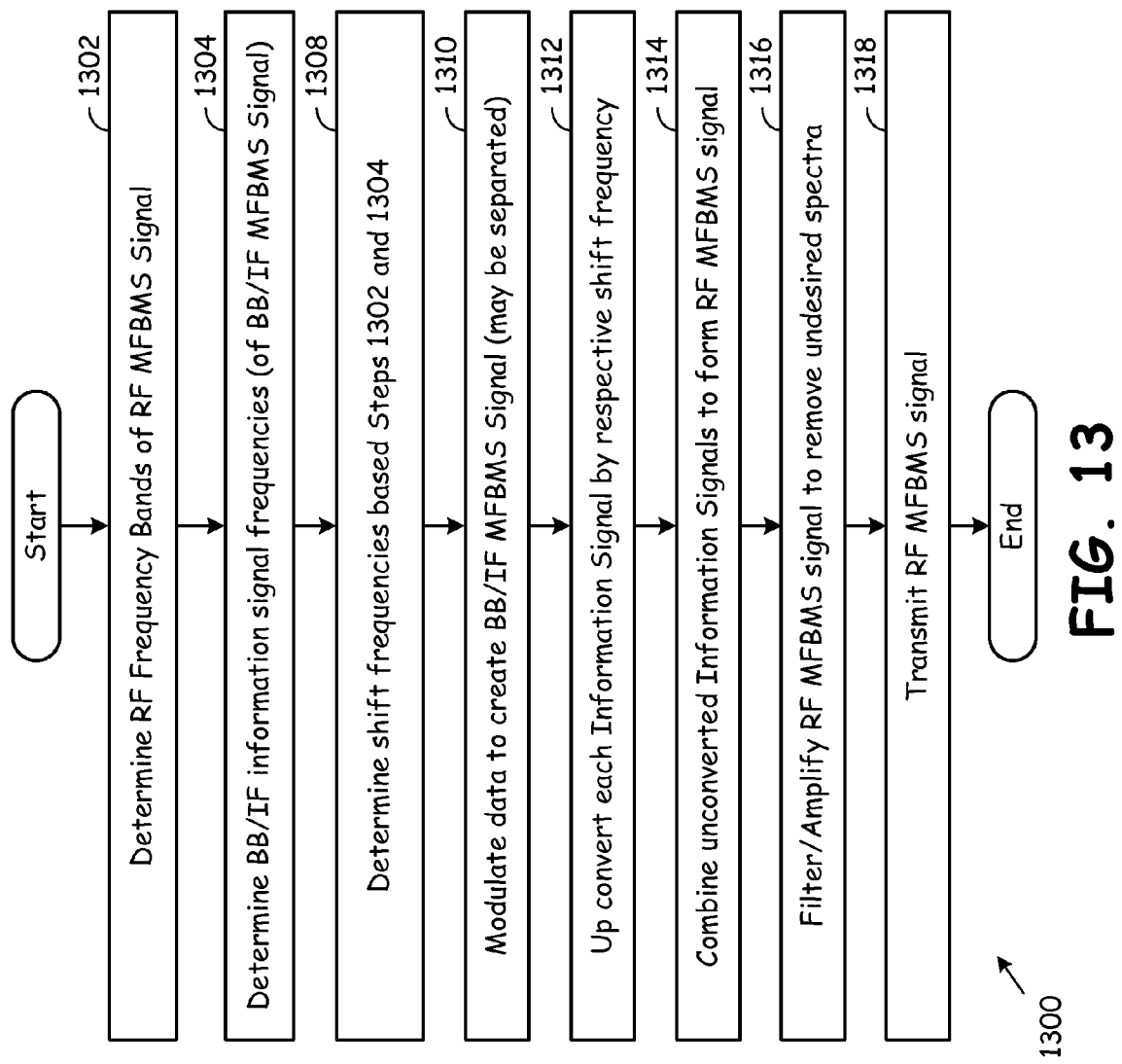
FIG. 13 is a flow chart illustrating transmit operations according to one or more embodiments of the present invention.

FIG. 13 is a flow chart illustrating transmit operations according to the present invention. In particular, FIG. 13 illustrates transmit operations 1300 of a wireless device. With a first operation, the wireless device determines RF frequency bands of an RF MFBMS information signal to be formed for transmission (Step 1302). The wireless device then determines BB/IF information signal frequencies of a BB/IF MFBMS signal that will be constructed (Step 1304). As has been previously described, a baseband processing module forms the BB/IF MFBMS signal. In some operations it may be desirable for all of the information signals present in the BB/IF MFBMS signal to be band expanded, ordered in a particular spectral fashion, have particular spectral separation, or otherwise particularly formed for desired operations. The RF MFBMS signal has requirements for placement of the information signals with a corresponding RF MFBMS spectrum, as determined by one or more operating standards.

Next, the wireless device determines a plurality of shift frequencies based upon the operations of Steps 1302 and 1304 (Step 1306). Operation continues with the baseband processing module of the wireless device modulating data to create the BB/IF MFBMS signal (Step 1310). The transmitter section of the wireless device then up converts each information signal of the BB/IF MFBMS signal by a respective shift frequency (Step 1312). The transmitter section then combines the up converted information signals to form the RF MFBMS signal (Step 1314). The transmitter section then filters/amplifies the RF MFBMS signal to remove undesired spectral (Step 1316). Then, the wireless device transmits the RF MFBMS signal (Step 1318).

The operations 1300 of FIG. 13 differ for the illustrated power spectral densities of FIGS. 10, 11C, and 11D. With particular reference to FIG. 10, the BB/IF MFBMS signal 1004 includes information signals 302, 304, 306, and 308. With the embodiment of FIG. 11C, the outbound BB/IF MFBMS signal 1130 includes only information signals 302, 304, and 308. With the embodiment of FIG. 11D, the outbound BB/IF MFBMS signal 1150 includes only information signals 302, 304, and 308. However, the RF MFBMS signals 1136 and 1156 of FIGS. 11C and 11D, respectively, differ. The RF MFBMS signals 1136 and 1156 of FIGS. 11C and 11D not only have differing spectral positions of information signals 302, 304, and 308 but have differing frequency separations as well. Thus, the operations 1300 of FIG. 13 will be different for the differing power spectral densities illustrated in FIGS. 10, 11C, and 11D. The structures of FIGS. 15A, 15B, 16A, and 16B may be employed to perform operations 1300 of FIG. 13.

Figure 14A:
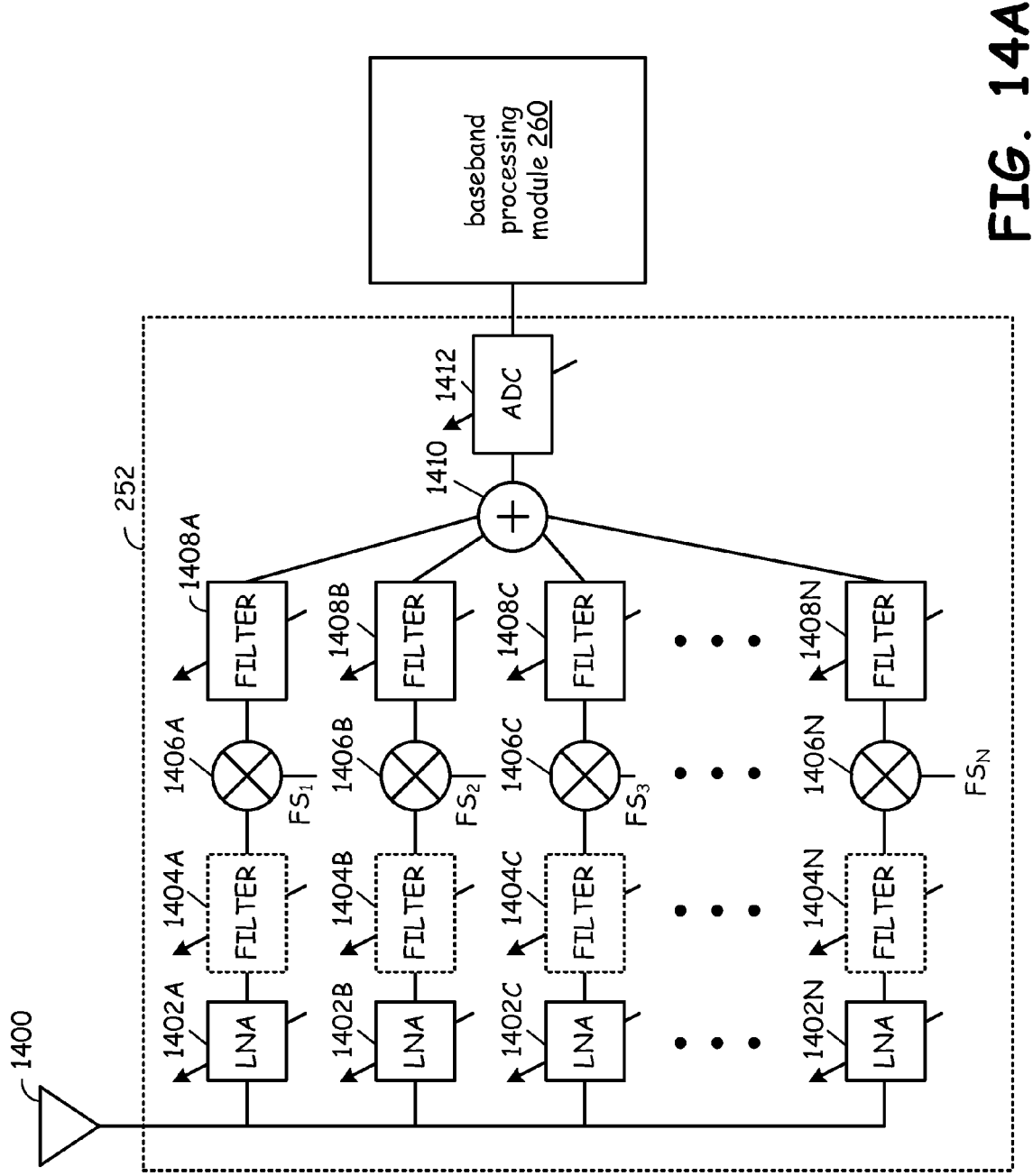
FIG. 14A is a block diagram illustrating a receiver section of a wireless device constructed according to one or more embodiments of the present invention.

FIG. 14A is a block diagram illustrating a receiver section of a wireless device constructed according to one or more embodiments of the present invention. The particular receiver section of FIG. 14A may execute the operations of 1200 of FIG. 12 and the operations corresponding to FIGS. 10, 11A, and 11B. The receiver section 252 includes a plurality of receive paths each of which couples to receive the RF MFBMS signal from antenna 1400. In other embodiments, additional antennas may be employed. A first receive path includes LNA 1402A, filter 1404A, mixer 1406A, and filter 1408A. A second receive path includes LNA 1402B, filter 1404B, mixer 1406B, and filter 1408B. A third receive path includes LNA 1402C, filter 1404C, mixer 1406C, and filter 1408C. An Nth receive path includes LNA 1402N, filter 1404N, mixer 1406N, and filter 1408N.

Each of these receive paths down converts the RF MFBMS signal by a respective shift frequency, e.g., $FS_1$, $FS_2$, $FS_3$, and $FS_N$, to produce a respective BB/IF information signal component and may also filter such BB/IF information signal component. Summer 1410 sums the outputs of each of the receive paths to produce the BB/IF MFBMS signal. The output of summer 1410 is digitized by ADC 1412 and produced to baseband processing module 260 for an extraction of data there from. Each of the components of the receiver section 254 may be frequency adjusted based upon BB/IF and RF frequencies of corresponding information signals upon which the particular path operates.

For example, referring to the spectrum of FIG. 10, each of the receive paths would operate upon a corresponding information signal 302, 304, 306, and/or 308. Referring to the embodiment of FIG. 11A, since only three information signals 302, 304, and 308 are produced within the BB/IF MFBMS signal 1104 produced, only three receive paths of the structure of FIG. 14A would be required. Referring to the embodiment of FIG. 11B, since only two information signals 302 and 308 are produced within the BB/IF MFBMS signal 1124 produced, only two receive paths of the structure of FIG. 14A would be required.

Still referring to FIG. 14A, each of the receive paths may include at least one adjustable analog signal path component operable to adjust at least one of the RF MFBMS signal and the BB/IF information signals. Each of the adjustable analog signal path components may be set to have a respective particular frequency response by the processing circuitry 260 depending upon the particular operation of the receiver section 252. Generally, the adjustable analog signal path components will have settings applied thereto based upon the characteristics of the RF MFBMS signal upon which their respective receive path operates and/or the characteristics of the BB/IF information signal they operate. The adjustable signal path components may be LNAs, e.g. LNA 1402A, RF filters, e.g., RF filter 1404A, a mixer, e.g., mixer 1406A, and/or BB/IF filters, e.g., filter 1408A. Of course, each of the receive paths of the receiver section 252 includes a plurality of differing adjustable analog signal path components.

The adjustable analog signal path component may be a frequency adjustable LNA 1402A with a frequency response adjusted based upon a frequency band of interest of the RF MFBMS signal. The LNA 1402A may also be adjustable based upon the modulation type(s) of the RF MFBMS signal. Particular operations of the LNA 1402A and other components that are adjustable on a frequency or other basis will be described further with reference to FIGS. 17, 18, 19, and 20.

The adjustable analog signal path component of a particular receive path of the receiver section 252 may be an adjustable filter 1404A that operates upon the RF MFBMS signal. The filter 1404A is frequency adjustable based upon a frequency band of interest the RF MFBMS signal 1404A. Generally, the adjustable filter 1404A may be a band pass filter in some embodiments that band pass filters the RF MFBMS signal. The analog signal path component may also be filter 1408A that operates upon a BB/IF information signal. The filter 1408A may be a band pass filter, low pass filter, or a high pass filter that has been previously discussed herein. For example, depending upon the frequency of the BB/IF information signal produced by the respective receive path of the receiver section 252, the analog filter has its settings applied so that it only passes the BB/IF information signal produced by the respective receive path.

Further, the adjustable analog signal path component may be frequency adjustable down conversion circuitry 1406A. With this embodiment, the down conversion circuitry 1406A is band adjustable so that the frequency characteristics of the down conversion circuitry match not only the frequency of the RF MFBMS signal (or a portion thereof) but also the bandwidth of the BB/IF information signal produced by the down conversion circuitry 1406A of the particular receive path. In such case, some receive paths from the receiver section 252 may operate with broader frequency bands while others will operate with narrower frequency bands. Thus, in some cases, the various down conversion circuitry of the differing receive paths may have differing bandwidths and/or gain characteristics based upon settings applied thereto.

The ADC 1412 may also be tunable based upon spectral characteristics of the BB/IF MFBMS signal. With the structure of FIG. 14A, the ADC 1412 is operable to digitize the BB/IF MFBMS signal to produce a digitized representation thereof. As was previously discussed, the BB/IF MFBMS signal may have differing spectral characteristics over time based upon the number of information signals to be extracted there from. Thus, according to the present invention, the processing circuitry 260 may alter the operating characteristics of the ADC 1412 based upon the character of the information signals from which data will be extracted by baseband processing module 260.

As will be further described herein with reference to FIGS. 25-30, the operating parameters of the ADC 1412 that may be varied include the sample rate of the ADC, the bandwidth of the ADC, the dynamic range of the ADC, and/or the signal to noise ratio of the ADC. The sample rate of the ADC 1412 is the rate at which the ADC 1412 samples the incoming analog signal. The bandwidth of the ADC 1412 represents the frequency band of information that may be captured by the ADC 1412 and produced in a digital representation of the signal. The dynamic range of the ADC 1412 represents the signal range that the ADC 1412 may capture, and the signal to noise ratio of the ADC 1412 represents a quality of conversion of the ADC. For example, some information signals carrying the BB/IF MFBMS signal may use relatively simpler modulations, e.g., BPSK modulation, as compared to more complex modulations, e.g., high order QAM modulation. With relatively simpler modulation techniques, a lower signal to noise ratio and/or dynamic range is required in the digitized output samples of the BB/IF MFBMS information signals. Alternatively, higher order modulations of the information signals within the BB/IF MFBMS signal require greater dynamic range, sample rate, and/or signal to noise ratio in the digitized output produced by ADC 1412.

Likewise, the sample rate of the ADC 1412 is determined based upon the highest spectral component of the BB/IF MFBMS signal. Thus, for lower symbol rates of information signals of the BB/IF MFBMS signal, the ADC 1412 may use a relatively lower sampling rate. Likewise, the bandwidth of the ADC 1412 is determined based upon the spectral range of the BB/IF MFBMS signal. If the information signal or signals of the BB/IF MFBMS signal has a relatively narrower frequency band, the bandwidth of the ADC 1412 may be reduced to correspond to such information signals. However, if the information signals of the BB/IF MFBMS signal extend across an extended frequency band, the bandwidth of the ADC 1412 must be wide enough to capture all information contained in such information signals.

Figure 14B:
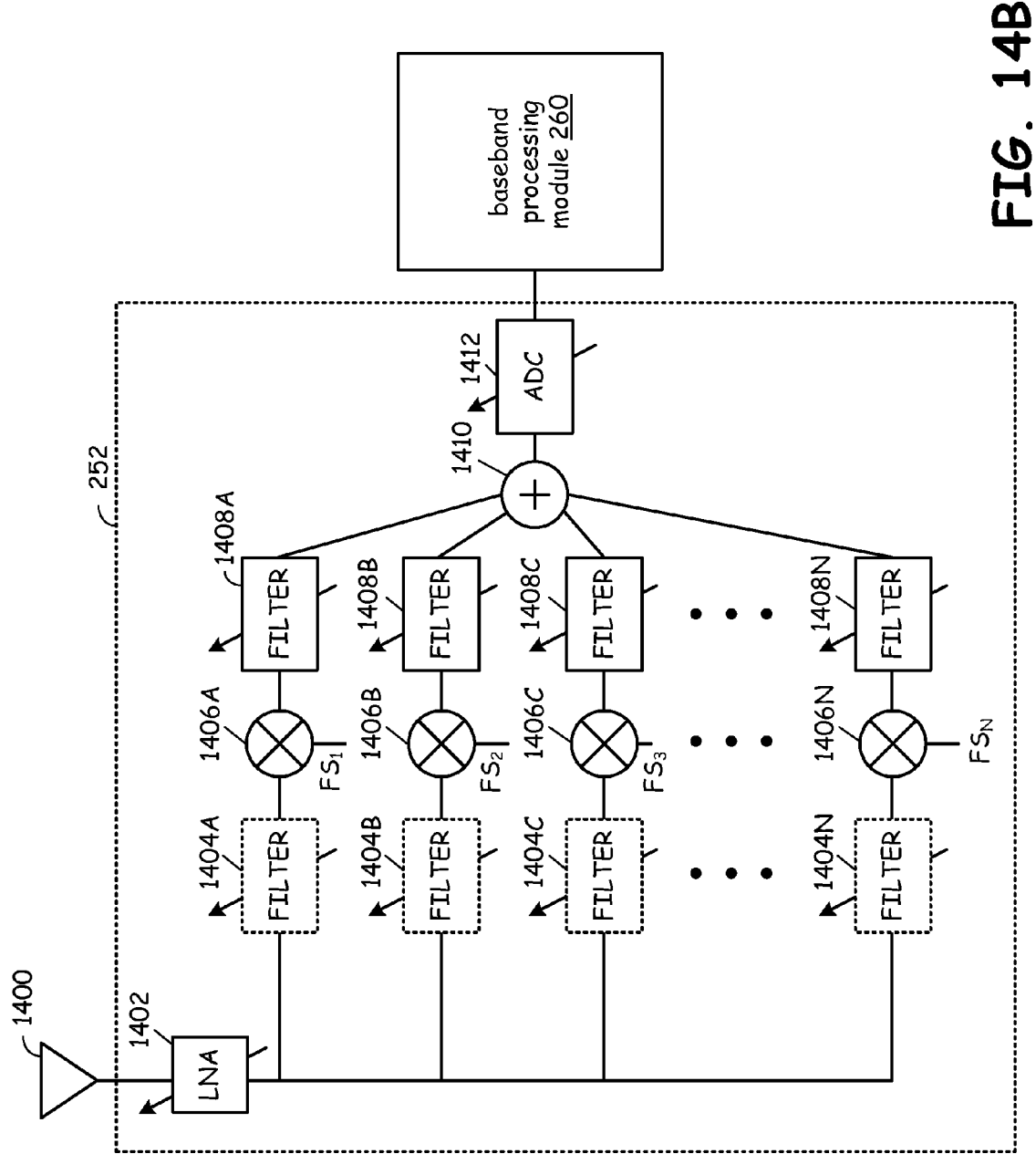
FIG. 14B is a block diagram illustrating a receiver section of a wireless device constructed according to one or more embodiments of the present invention.

FIG. 14B is a block diagram illustrating a receiver section of a wireless device constructed according to one or more embodiments of the present invention. The particular receiver section of FIG. 14B may execute the operations of 1200 of FIG. 12 and the operations corresponding to FIGS. 10, 11A, and 11B. The structure of FIG. 14B is similar to the structure of FIG. 14A. As contrasted to the structure of FIG. 14A, the receiver section 252 includes a single LNA 1402 that receives the RF MFBMS signal from antenna 1400, amplifies the RF MFBMS signal and passes the amplified RF MFBMS signal to each of the plurality of receive paths. Other than this structural difference, the receiver section 252 of the wireless device of FIG. 14B operates same/similar to the receiver section 252 of the wireless device of FIG. 14A.

The wireless device of FIG. 14A or FIG. 14B includes processing circuitry (baseband processing module 260) that is operable to determine a set of RF information signals for receipt, the set of RF information signals of a RF MFBMS signal having a plurality of information signal frequency band. The antenna 1400 is operable to receive the RF MFBMS signal. The receiver section 252 couples to the antenna 1400 and to the processing circuitry 260 and includes a plurality of receive paths, each receive path having down-conversion circuitry 1406A-N, which is operable to down-convert at least a portion of the RF MFBMS signal by a respective shift frequency to produce a corresponding BB/IF information signal. The combiner 1410 is operable to combine the plurality of BB/IF information signals produced by the plurality of receive paths to form a BB/IF MFBMS signal. The ADC 1412 digitizes the BB/IF MFBMS signal and the processing circuitry 260 extracts data from the BB/IF MFBMS signal corresponding to the set of RF information signals. The baseband processing module may pass the extracted data to host processing circuitry for further use.

With one operation of the embodiments of FIGS. 14A and 14B, a first receive path of the plurality of receive paths is operable to down-convert the RF MFBMS signal by a first shift frequency to produce a first BB/IF information signal. Further, a second receive path of the plurality of receive paths is operable to down-convert the RF MFBMS signal by a second shift frequency to produce a second BB/IF information signal. The combiner is then operable to combine the first and second BB/IF information signals to produce the BB/IF MFBMS signal.

With another operation of the embodiments of FIGS. 14A and 14B, the first receive path of the plurality of receive paths is operable to down-convert the RF MFBMS signal by a first shift frequency to produce a first BB/IF information signal. A second receive path of the plurality of receive paths is operable to down-convert the RF MFBMS signal by a second shift frequency to produce a second BB/IF information signal. A third receive path of the plurality of receive paths is operable to down-convert the RF MFBMS signal by a third shift frequency to produce a third BB/IF information signal. The combiner is then operable to combine the first, second, and third BB/IF information signals to produce the BB/IF MFBMS signal.

With either embodiment of FIG. 14A or 14B, the down-conversion circuitry of each of the plurality of receive paths may operable to down-convert the RF MFBMS signal by a common shift frequency. With either embodiment of FIG. 14A or 14B, a first information signal frequency band of the RF MFBMS signal may be a WLAN frequency band and a second information signal frequency band of the RF MFBMS signal may be a cellular telephony frequency band. With either embodiment of FIG. 14A or 14B, a first information signal frequency band of the RF MFBMS signal may be a WPAN frequency band and a second information signal frequency band of the RF MFBMS signal may be a cellular telephony frequency band. With either embodiment of FIG. 14A or 14B, a first information signal frequency band of the RF MFBMS signal may be a bi-directional communication frequency band and a second information signal frequency band of the RF MFBMS signal may be a GPS frequency band. With either embodiment of FIG. 14A or 14B, a first information signal frequency band of the RF MFBMS signal may be a first bi-directional communication frequency band, a second information signal frequency band of the RF MFBMS signal may be a second bi-directional communication frequency band, and a third information signal frequency band of the RF MFBMS signal may be a GPS frequency band.

Referring to FIG. 14B, the various components of the multiple receive paths of receiver section 252 may be adjustable in frequency response and/or gain. The LNA 1402 of the receiver section 252 may be also frequency adjustable as well as gain adjustable. Construction of the LNA 1402 of FIG. 14B and the LNA of 1402A-1402N of FIG. 14A will be further described with reference to FIGS. 17 and 18.

Figure 14C:
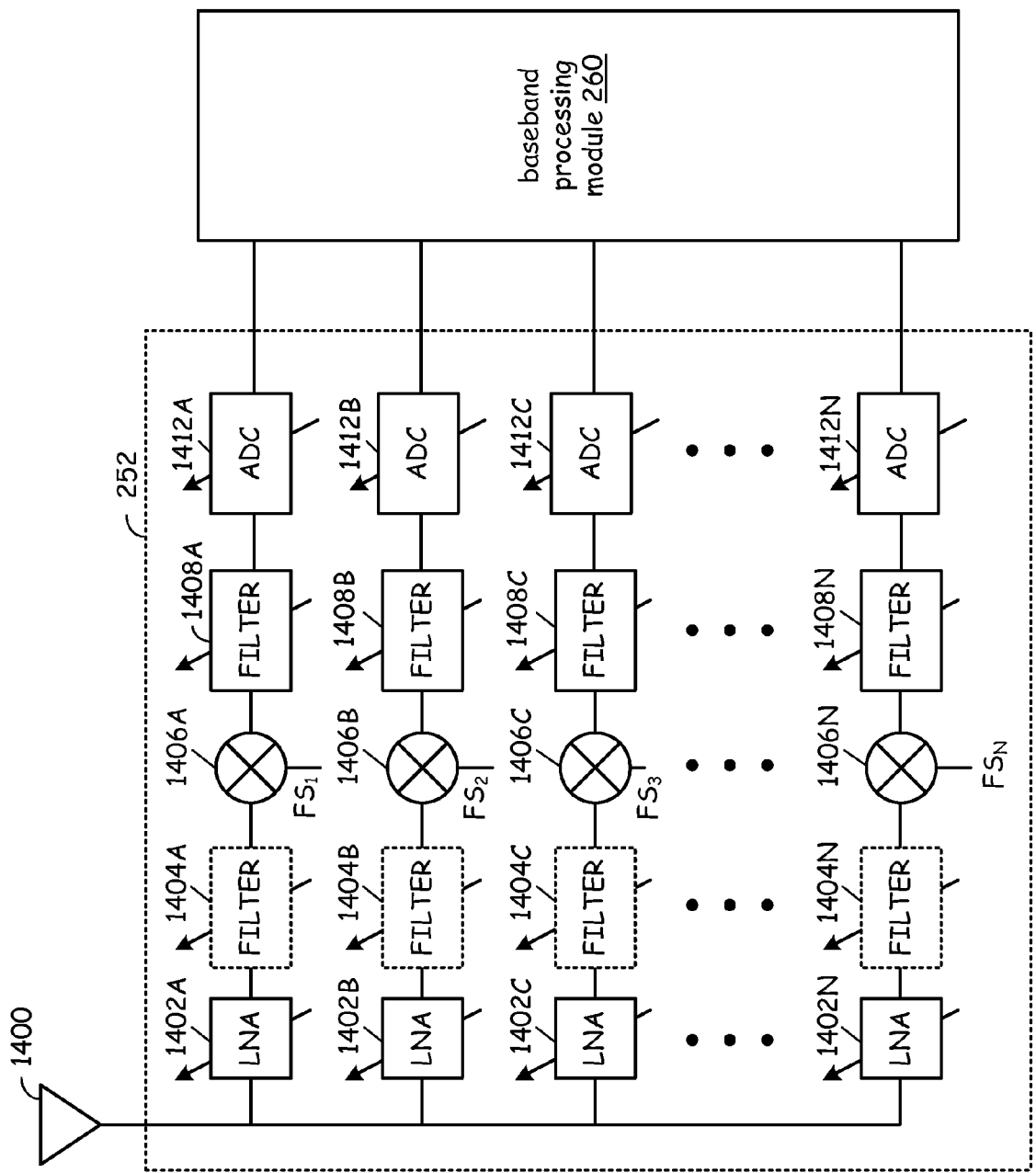
FIG. 14C is a block diagram illustrating a portion of a wireless device constructed according to one or more embodiments to the present invention.

FIG. 14C is a block diagram illustrating a portion of a wireless device constructed according to one or more embodiments to the present invention. As contrasted to the structures of FIGS. 14A and 14B, the structure of FIG. 14C includes an ADC for each of the plurality of receive paths. Thus, the first receive path includes ADC 1412A, the second receive path includes ADC 1412B, the third receive path includes ADC 1412C, and the Nth receive path includes ADC 1412N. One or more of these ADCs 1412A, 1412B, 1412C, and/or 1412N is adjustable by processing circuitry 260. The adjustment of the ADCs 1412A, 1412B, 1412C, and/or 1412N is based upon the spectral characteristics and signal processing requirements of the BB/IF information signal for the particular receive path. For example, some of the BB/IF information signals processed by the plurality of receive paths may have differing spectral characteristics than do the other BB/IF information signals operated upon by the differing receive path. In such case, then each of the ADCs 1412A, 1412B, 1412C, and/or 1412N may have different tuning parameters applied thereto by processing circuitry 260. The reader should appreciate that the ADC tuning parameters of receive paths discussed herein with reference to any of the figures applies also to the other ADC's described herein without limitation.

Figure 15A:
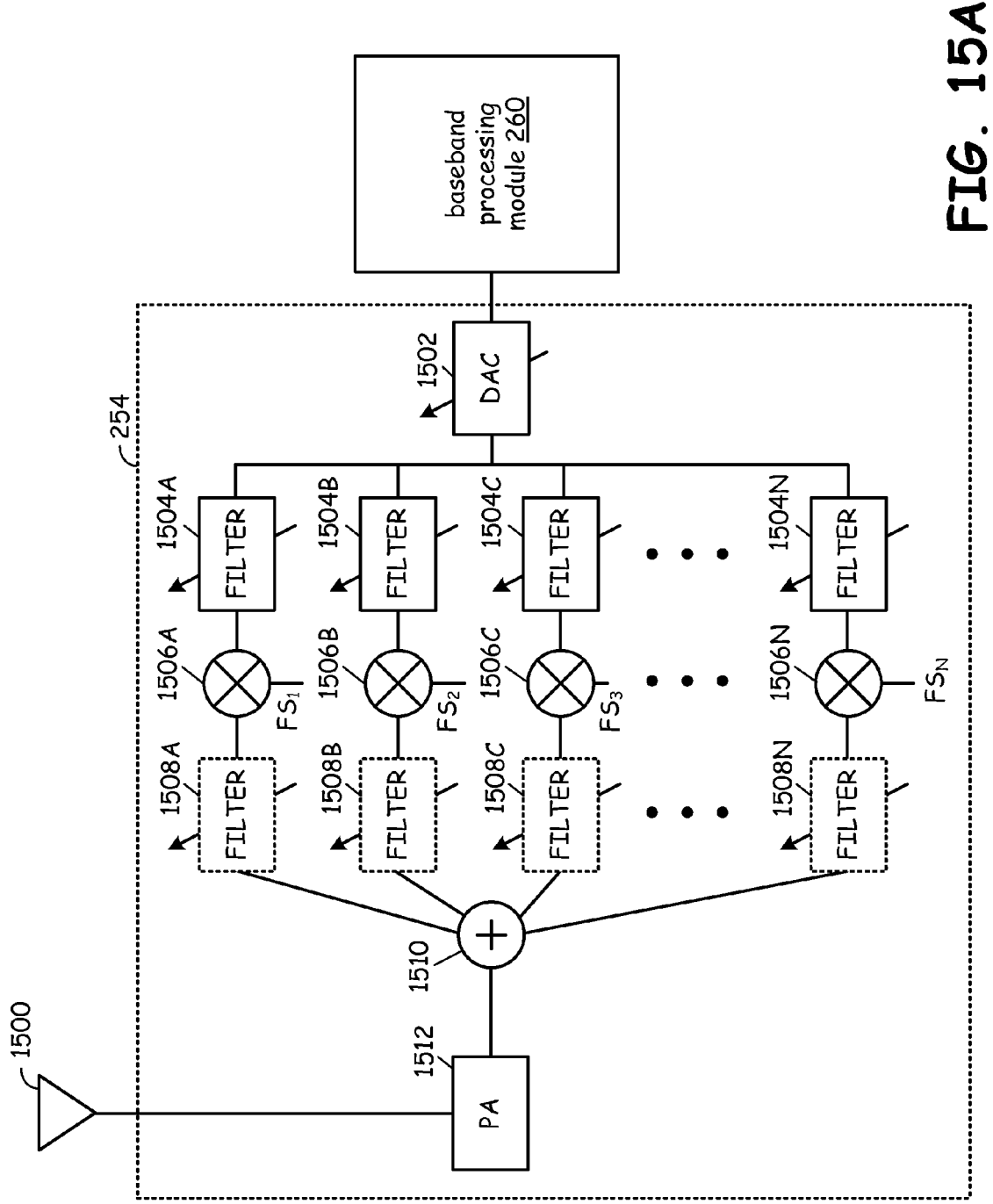
FIG. 15A is a block diagram illustrating a transmitter section of a wireless device constructed according to one or more embodiments of the present invention.

FIG. 15A is a block diagram illustrating a transmitter section of a wireless device constructed according to one or more embodiments of the present invention. The transmitter section 254 produces an RF MFBMS signal 300 according to one or more of FIGS. 10, 11C or 11D, for example. The transmitter section 254 includes a plurality of transmit paths. Each transmit path includes at least a filter, a mixer and an optional filter. For example, a first transmit path includes filter 1504A, mixer 1506A, and optional filter 1508A. Likewise, a second transmit path includes filter 1504B, mixer 1506B, and optional filter 1508B. The third transmit path includes filter 1504C, mixer 1506C, and optional filter 1508C. Further, the Nth transmit path includes filter 1504N, mixer 1506N, and optional filter 1508N.

According to the structure of FIG. 15A, a single digital analog converter (DAC) 1502 produces an analog representation of the BB/IF MFBMS signal that includes a plurality of information signals. The output of the DAC 1502 is received by each of the transmit paths, each of which creates a respective component of an RF MFBMS signal. Sumer 1510 sums each of the components of the RF MFBMS signal to produce the RF MFBMS signal to antenna 1500. Each mixer 1506A, 1506B, 1506C, and 1506N up converts a corresponding portion of the BB/IF MFBMS signal received from the DAC 1502 by a respective shift frequency, $FS_1$, $FS_2$, $FS_3$, and $FS_N$, respectively. After up sampling, each of the transmit paths produces a corresponding information signal in the RF MFBMS spectrum. Combining of these components by the combiner/summer 1510 produces the RF MFBMS signal. Power Amplifier (PA) 1512 amplifies the RF MFBMS signal, which couples the signal to antenna 1500.

According to one aspect of the structure of FIG. 15A, the filters 1504A, 1504B, 1504C, and 1504N are constructed to band pass substantially only an information signal component upon which that particular path operates upon. For example, referring again to FIG. 11C, a first transmit path that includes filter 1504A may perform band pass filtering upon information signal 302 of a corresponding BB/IF MFBMS signal. Likewise, a second transmit path of the transmitter section 254 may include filter 1504B that is set to band pass filter information signal 304 and band pass filter 1504C of a third transmit path is set to band pass filter information signal 308. These principles may be further extended to apply to the other components of the transmitter section 254. Further, filters 1508A, 1508B, 1508C, and 1508N may be tuned to band pass filter the corresponding RF information signals.

Figure 15B:
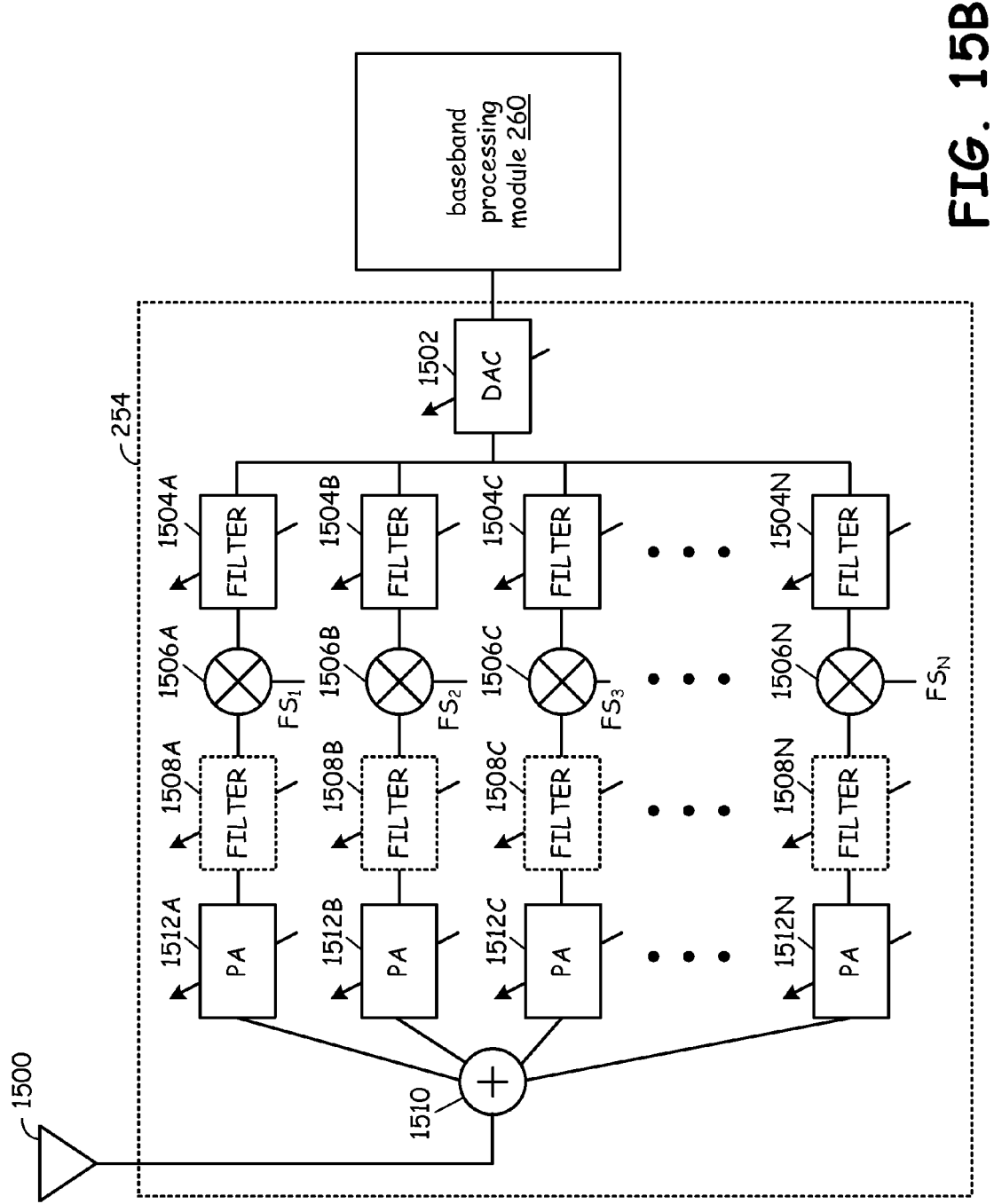
FIG. 15B is a block diagram illustrating a transmitter section of a wireless device constructed according to one or more embodiments of the present invention.

FIG. 15B is a block diagram illustrating a transmitter section of a wireless device constructed according to one or more embodiments of the present invention. The particular receiver section of FIG. 15B may execute the operations of 1300 of FIG. 13 and the operations corresponding to FIGS. 10, 11C, and 11D. The structure of FIG. 15B is similar to the structure of FIG. 15A. As contrasted to the structure of FIG. 15A, the transmitter section 254 includes a PA in each transmit path. In particular a first transmit path includes PA 1512A, a second transmit path includes PA 1512B, a third transmit path includes PA 1512C, and an Nth transmit path includes PA 1512N. The output from each of these PAs 1512A, 1512B, 1512C, and 1512N is received by combiner 1510 that sums the RF information signals to form the RF MFBMS signal and to output the RF MFBMS signal to antenna 1500. Other than this structural difference, the transmitter section 254 of the wireless device of FIG. 15B operates same/similar to the receiver section 254 of the wireless device of FIG. 15A.

Figure 16A:
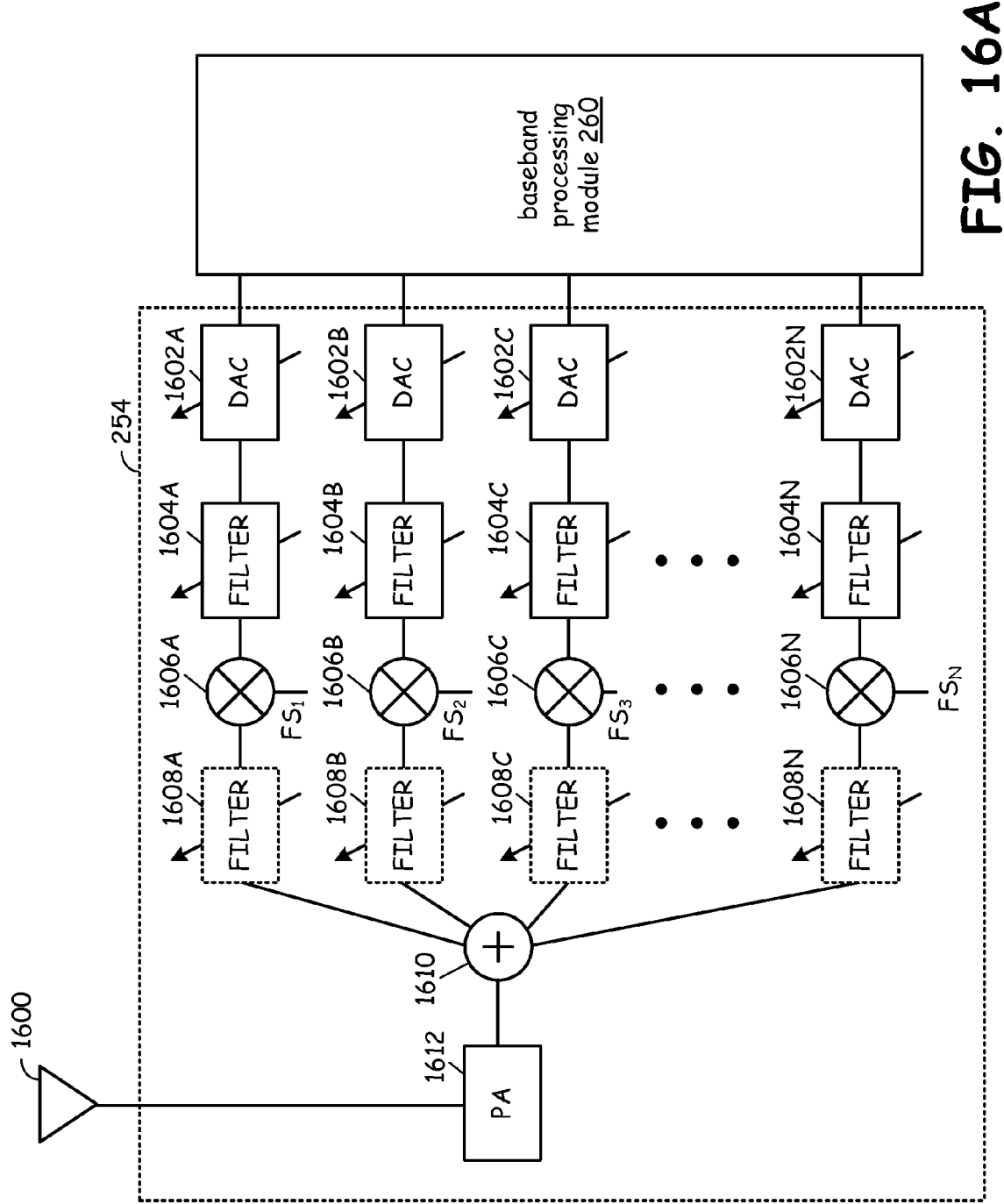
FIG. 16A is a block diagram illustrating a transmitter section of a wireless device constructed according to another embodiment of the present invention.

FIG. 16A is a block diagram illustrating a transmitter section of a wireless device constructed according to another embodiment of the present invention. The transmitter section 254 of FIG. 16A differs from the transmitter section illustrated in FIGS. 15A and 15B but performs similar operations. With the structure of FIG. 16A, the baseband processing module 260 produces respective digitized information signals of a BB/IF MFBMS signal to a plurality of transmit paths. A first transmit path that receives a first information signal of the BB/IF MFBMS signal converts the first information signal component to an analog signal using DAC 1602A. The output of DAC 1602A is filtered by filter 1604A, up converted by mixer 1606A based upon a particular shift frequency, and optionally filtered by filter 1608A. Likewise, the second transmit path includes DAC 1602B, filter 1604B, mixer 1606B, and filter 1608B and operates upon a second information signal. A third transmit path includes DAC 1602C, filter 1604C, mixer 1606C, and filter 1608C and operates upon a third information signal. Finally, the Nth transmit path includes DAC 1602N, filter 1604N, mixer 1606N, and filter 1608N and operates upon an Nth information signal. Each of the transmit paths of the transmitter section 254 produces a respective component of the RF MFBMS signal. Summer 1610 sums the outputs of each of the transmit paths to construct the RF MFBMS signal, which includes the plurality of information signals each residing within respective positions of the RF MFBMS spectrum. Combining of these components by the combiner/summer 1510 produces the RF MFBMS signal. Power Amplifier (PA) 1612 amplifies the RF MFBMS signal, which couples to signal to antenna 1600.

Figure 16B:
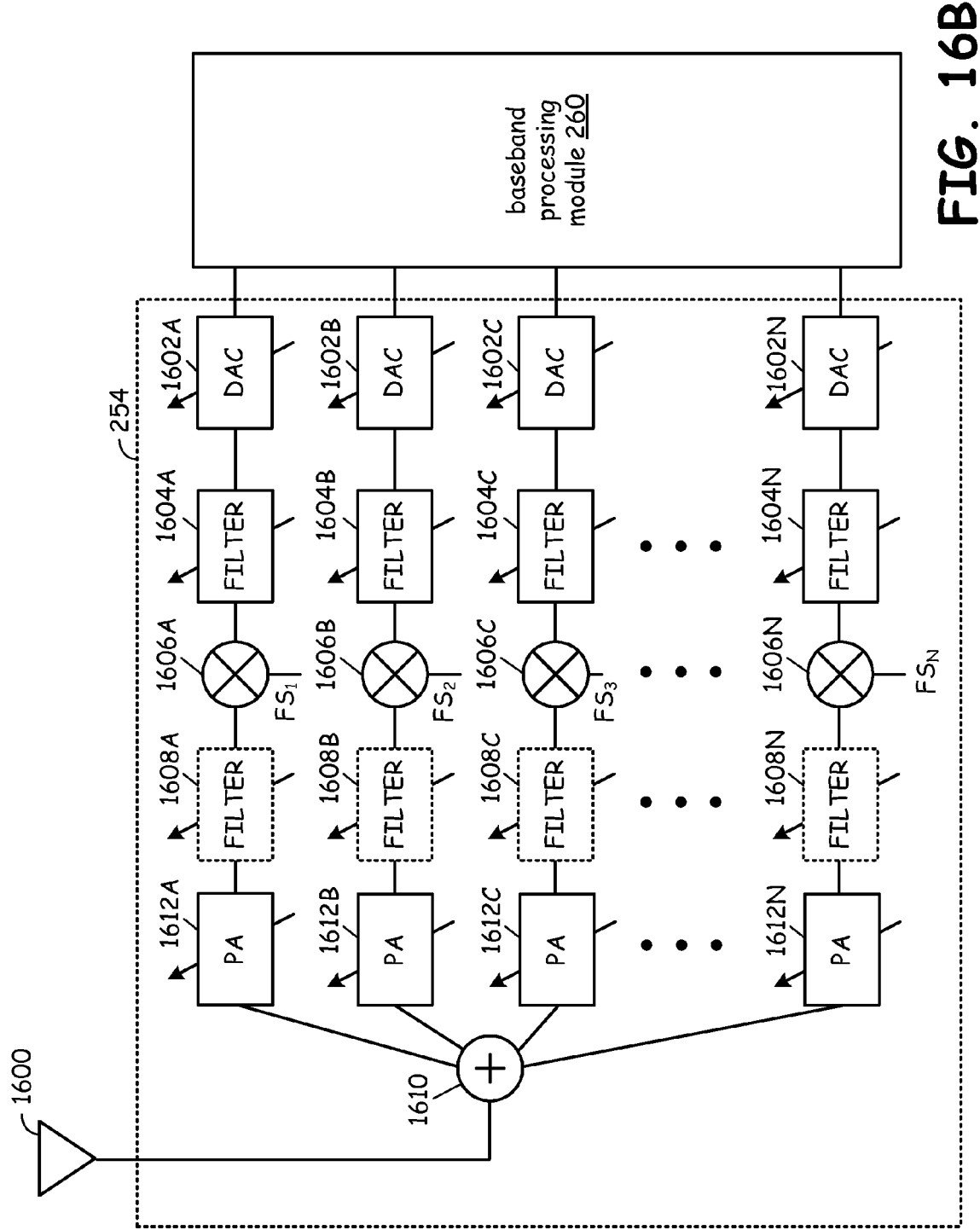
FIG. 16B is a block diagram illustrating a transmitter section of a wireless device constructed according to another embodiment of the present invention.

FIG. 16B is a block diagram illustrating a transmitter section of a wireless device constructed according to one or more embodiments of the present invention. The particular receiver section of FIG. 16B may execute the operations of 1300 of FIG. 13 and the operations corresponding to FIGS. 10, 11C, and 11D. The structure of FIG. 16B is similar to the structure of FIG. 16A. As contrasted to the structure of FIG. 16A, the transmitter section 254 includes a PA in each transmit path. In particular a first transmit path includes PA 1612A, a second transmit path includes PA 1612B, a third transmit path includes PA 1612C, and an Nth transmit path includes PA 1612N. The output from each of these PAs 1612A, 1612B, 1612C, and 1612N is received by combiner 1610 that sums the RF information signals to form the RF MFBMS signal and to output the RF MFBMS signal to antenna 1600. Other than this structural difference, the transmitter section 254 of the wireless device of FIG. 16B operates same/similar to the receiver section 254 of the wireless device of FIG. 16A.

Referring to all of FIGS. 15A, 15B, 16A, and 16B, a wireless device containing such structures includes the baseband processing module 260 (processing circuitry). The processing circuitry 260 is operable to produce a plurality of BB/IF information signals. These BB/IF information signals may be produced separately such as with the embodiments of FIGS. 16A and 16B or combined into a BB/IF MFBMS signal such as with the embodiments of FIGS. 15A and 15B. The transmitter section 254 couple to the processing circuitry 260 and includes the plurality of transmit paths. Each transmit path includes up-conversion circuitry, e.g., 1506A, 1506B, etc. that is operable to up-convert a respective BB/IF information signal by a respective shift frequency to produce a RF information signal. The combiner, e.g., 1510 or 1610 is operable to combine the RF information signals produced by the plurality of transmit paths to form the RF MFBMS signal having a plurality of information signal frequency bands. The antenna 1500/1600 couples to the transmitter section 254 and is operable to transmit the RF MFBMS signal.

Consistent with the embodiments of FIGS. 15A, 15B, 16A, and 16B, each of the plurality of BB/IF information signals resides within a respective BB/IF frequency band. According to one operation of the embodiments of FIGS. 15A, 15B, 16A, and 16B a first transmit path of the plurality of transmit paths is operable to up-convert a respective BB/IF information signal by a first shift frequency to produce a first RF information signal. Further, a second transmit path of the plurality of transmit paths is operable to up-convert a respective BB/IF information signal by a second shift frequency to produce a second RF information signal. The combiner is operable to combine the first and second RF information signals to produce the RF MFBMS signal.

According to another operation of embodiments of FIGS. 15A, 15B, 16A, and 16B, a first transmit path of the plurality of transmit paths is operable to up-convert a respective BB/IF information signal by a first shift frequency to produce a first RF information signal. A second transmit path of the plurality of transmit paths is operable to up-convert a respective BB/IF information signal by a second shift frequency to produce a second RF information signal. A third transmit path of the plurality of transmit paths is operable to up-convert a respective BB/IF information signal by a third shift frequency to produce a third RF information signal. Finally, the combiner is operable to combine the first, second, and third RF information signals to produce the RF MFBMS signal.

According to various operations of embodiments of FIGS. 15A, 15B, 16A, and 16B, he up-conversion circuitry of each of the plurality of transmit paths is operable to up-convert a respective BB/IF information signal by a common shift frequency. Further, with the embodiments of FIGS. 15A and 16A, the transmitter section 254 includes a PA coupled between the antenna and the combiner. With the embodiments of FIGS. 15B and 16B, each of the plurality of transmit paths further includes a PA coupled between the up-conversion circuitry and the combiner.

With any of the embodiments of FIGS. 15A, 15B, 16A, and 16B, a first information signal frequency band of the RF MFBMS signal may be a Wireless WLAN frequency band and a second information signal frequency band of the RF MFBMS signal may be a cellular telephony frequency band. With any of the embodiments of FIGS. 15A, 15B, 16A, and 16B, a first information signal frequency band of the RF MFBMS signal may be a WPAN frequency band and a second information signal frequency band of the RF MFBMS signal may be a cellular telephony frequency band. With any of the embodiments of FIGS. 15A, 15B, 16A, and 16B, a first information signal frequency band of the RF MFBMS signal may be a bi-directional communication frequency band and a second information signal frequency band of the RF MFBMS signal may be a GPS frequency band. With any of the embodiments of FIGS. 15A, 15B, 16A, and 16B, a first information signal frequency band of the RF MFBMS signal may be a first bi-directional communication frequency band, a second information signal frequency band of the RF MFBMS signal may be a second bi-directional communication frequency band, and a third information signal frequency band of the RF MFBMS signal may be a GPS frequency band.

Referring in combination to FIGS. 15A, 15B, 16A, and 16B, each of the plurality of transmit paths may include one or more adjustable analog signal path components. The adjustable analog signal path components are adjustable to variably alter characteristics of one or more of the BB/IF information signals and/or corresponding RF information signals operated on and/or produced by the respective transmit path(s). For example, referring to FIG. 16B, the adjustable analog signal path component may be PA 1612A. In such case, the frequency adjustable PA 1612A is frequency adjustable based upon a frequency of interest of the RF MFBMS signal. With the structure of FIG. 16B, the PA 1612A operates upon a particular RF information signal of the RF MFBMS signal. The PA 1612A in such case is tuned to particular characteristics of the RF signal upon which it operates.

The at least one adjustable analog signal path component may further be an analog filter 1608A that operates upon the RF MFBMS signal of the respective signal path. In such case, the adjustable analog signal path component which is the frequency adjustable analog filter 1608 is tuned to the particular frequency band of interest in the RF frequency upon which the particular transmit path operates. Further, the adjustable analog signal path component may be an analog filter that operates upon a BB/IF information signal. In such case, the filter 1604A is tuned based upon the signal characteristics (frequency band, modulation type, SNR requirements, etc.) of the BB/IF information signal of the respective signal path. Moreover, the up conversion circuitry 1608A of the signal path may be adjusted so that its frequency response is a desired function for the particular BB/IF information signal upon which the transmit path operates and/or the RF MFBMS signal component produced by the particular transmit path.

FIG. 17A is a block diagram illustrating an adjustable LNA constructed according to one or more embodiments of the present invention. The adjustable LNA includes multiple LNA amplifiers 1704A, 1704B, 1704C that are connected to one another via signal paths and switching matrix 1706. Each of the LNAs may be frequency adjustable and/or gain adjustable. However, in other embodiments, each of the LNAs 1704A, 1704B, and 1704C are not frequency adjustable but are fixed in their frequency responses and/or not gain adjustable. The LNA 1704A receives the RF MFBMS signal and amplifies the signal. The output of LNA 1704A is received by LNA 1704B and by switching matrix 1706. The output of LNA 1704B is received by LNA 1704C. Matrix 1706 further receives the output of LNA 1704B. The output of LNA 1704C is received by matrix 1706. The switching matrix 1706 receives at least one control input from the processing circuitry of a respective receiver section. Based upon the control input signal received from receiver section, the matrix selects an output that is a combination of one or more of the outputs of LNAs 1704A, 1704B, and/or 1704C. Thus, overall, the structure of FIG. 17A receives an RF MFBMS signal and produces an amplified representation thereof. The structure of FIG. 17A may be employed with the structures of FIG. 14A or 14B, or with other receiver sections constructed according to the present invention.

FIG. 17B is a block diagram illustrating another adjustable LNA constructed according to one or more embodiments of the present invention. The adjustable LNA includes multiple LNA amplifiers 1754A, 1754B, 1754C that are connected to one another via signal paths and switching matrix 1756. Each of the LNAs may be frequency adjustable and/or gain adjustable. However, in other embodiments, each of the LNAs 1754A, 1754B, and 1754C are not frequency adjustable but are fixed in their frequency responses and/or not gain adjustable. The LNA 1754A receives the RF MFBMS signal and amplifies the signal. The output of LNA 1754A is received switching matrix 1756. The output of LNA 1754B is received by the switching matrix 1756 and the output of LNA 1754C is received by the switching matrix 1756. The switching matrix 1756 receives at least one control input from the processing circuitry of a respective receiver section. Based upon the control input signal received from receiver section, the matrix selects an output that is a combination of one or more of the outputs of LNAs 1754A, 1754B, and/or 1754C. Thus, overall, the structure of FIG. 17B receives an RF MFBMS signal and produces an amplified representation thereof. The structure of FIG. 17B may be employed with the structures of FIG. 14A or 14B, or with other receiver sections constructed according to the present invention.

Figure 18A:
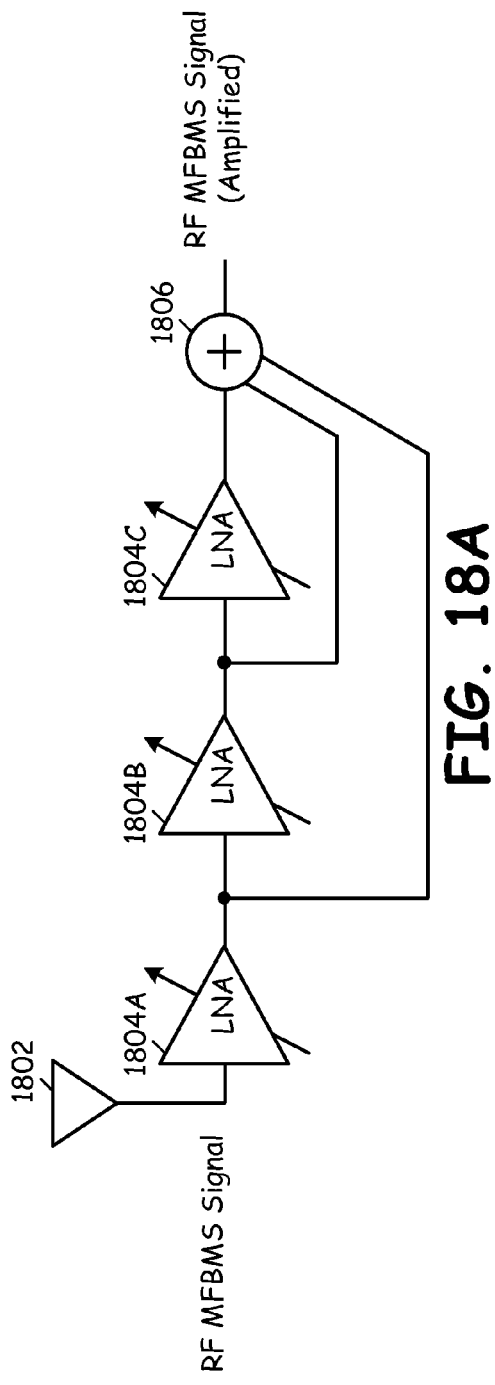
FIG. 18A is a block diagram illustrating the construct of an adjustable LNA according to one or more embodiments of the present invention.

FIG. 18A is a block diagram illustrating the construct of an adjustable LNA according to one or more embodiments of the present invention. The adjustable LNA includes a plurality of individually frequency adjustable LNAs 1804A, 1804B, and 1804C. The outputs of each of these LNAs 1804A, 1804B, and 1804C is received by summing node 1806 that sums the outputs of the LNAs to produce an amplified signal. In operation, the antenna 1802 receives an RF MFBMS signal and produces the RF MFBMS signals to LNA 1804A. The output of summing node 1806 is an amplified representation of the RF MFBMS signal. The structure of FIG. 18A may be employed with the construct of FIGS. 14A, 14B, or with another receiver section constructed according to embodiments of the present invention. In other embodiments, the LNAs 1804A, 1804B, 1804C are not frequency adjustable. Further, still in other embodiments, switches may be present in the various signal paths received by summing node 1806 that are controlled by the processing circuitry of the wireless device. In such case, depending upon the frequency characteristics for the RF MFBMS signal, the outputs of the LNAs 1804A, 1804B, and 1804C may be switched on or off to produce a particular frequency and/or gain response.

Figure 18B:
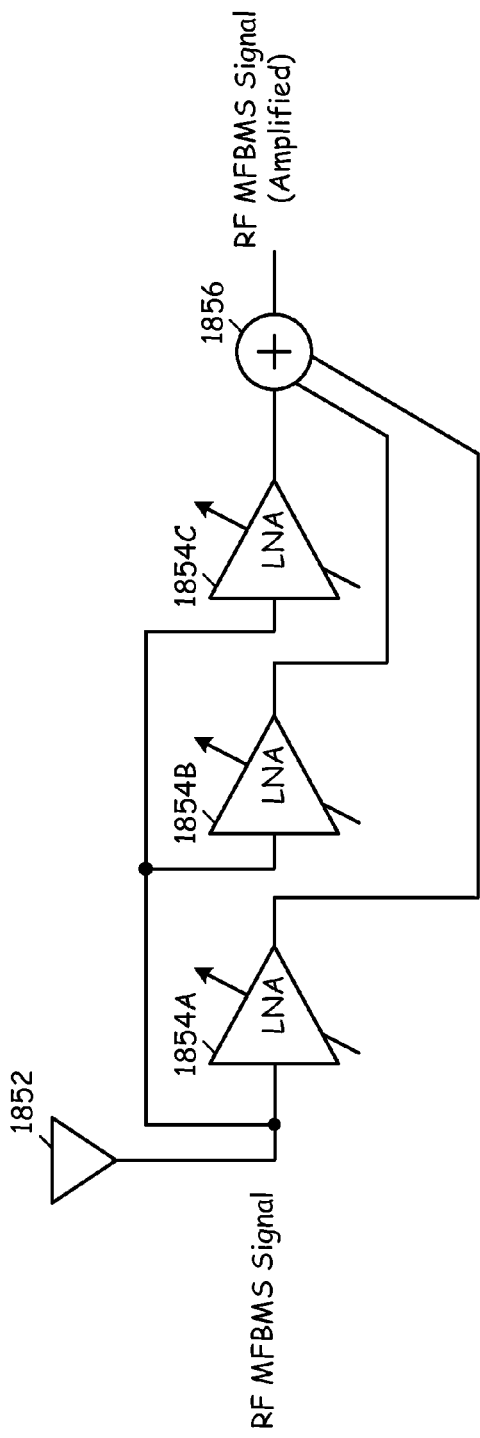
FIG. 18B is a block diagram illustrating the construct of another adjustable LNA according to one or more embodiments of the present invention.

FIG. 18B is a block diagram illustrating the construct of another adjustable LNA according to one or more embodiments of the present invention. The adjustable LNA includes a plurality of individually frequency adjustable LNAs 1854A, 1854B, and 1854C. The outputs of each of these LNAs 1854A, 1854B, and 1854C is received by summing node 1856 that sums the outputs of the LNAs to produce an amplified signal. In operation, the antenna 1852 receives an RF MFBMS signal and produces the RF MFBMS signals to LNA 1854A, LNA 1854B, and LNA 1854C. The output of summing node 1856 is an amplified representation of the RF MFBMS signal. The structure of FIG. 18B may be employed with the construct of FIGS. 14A, 14B, or with another receiver section constructed according to embodiments of the present invention. In other embodiments, the LNAs 1854A, 1854B, 1854C are not frequency adjustable. Further, still in other embodiments, switches may be present in the various signal paths received by summing node 1856 that are controlled by the processing circuitry of the wireless device. In such case, depending upon the frequency characteristics for the RF MFBMS signal, the outputs of the LNAs 1854A, 1854B, and 1854C may be switched on or off to produce a particular frequency and/or gain response.

FIGS. 19A and 19B are frequency response curves showing the various frequency responses of adjustable analog signal path components constructed according to embodiments of the present invention. Referring to FIG. 19A, an RF MFBMS spectrum 1900 is shown. Also shown in FIG. 19A, are various frequency responses that could be applied to an RF signal by adjustable analog signal path components. As is shown, three individual frequency response curves 1902, 1904, and 1906 are shown. These various frequency response curves 1902, 1904, and 1906 may be frequency responses of adjustable analog signal path components with differing control settings applied thereto. Alternatively, these frequency response curves 1902, 1904, and 1906 may be frequency response curves of individual analog signal path components such as those illustrated in FIGS. 17A through 18B. If these individual analog signal path component frequency response curves 1902, 1904, and 1906 are summed together, a composite response is produced. Further, one, two or all three of these frequency response curves 1902, 1904, and 1906 may be summed to produce a composite response from an adjustable analog signal path component according to the present invention.

Referring now to FIG. 19B, frequency responses of one or more analog signal path components are shown with respect to a BB/IF MFBMS spectrum 1950. The frequency response curves include curves 1952, 1954, and 1956. These frequency response curves 1952, 1954, and 1956 may correspond to filters 1408A, 1408B, 1408C, and/or 1408N of FIG. 14B. Further, these frequency response curves may correspond to a single adjustable analog signal path component with different input settings. Moreover, each of these frequency response curves 1952, 1954, and 1956 may correspond to individual analog signal path components and may be switched in or out to form a composite frequency response that is applied to a BB/IF MFBMS or information signal.

Of course, the frequency response curves of these various elements may differ in other embodiments. For example, one element may have broadband gain while other elements may have narrowband gain for differing portions of the MFBMS spectrum 1950. These are only a few examples that fall within the scope of the present invention.

Figure 20A:
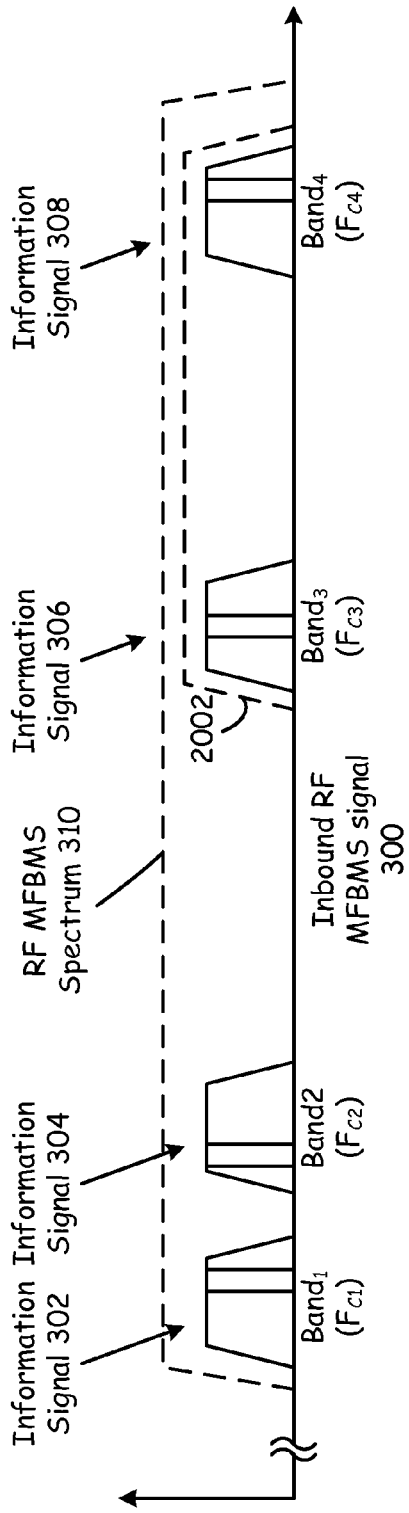
FIGS. 20A and 20B illustrate various frequency response curves of adjustable analog signal path components with respect to an RF MFBMS signal according to one or more aspects of the present invention.
Figure 20B:
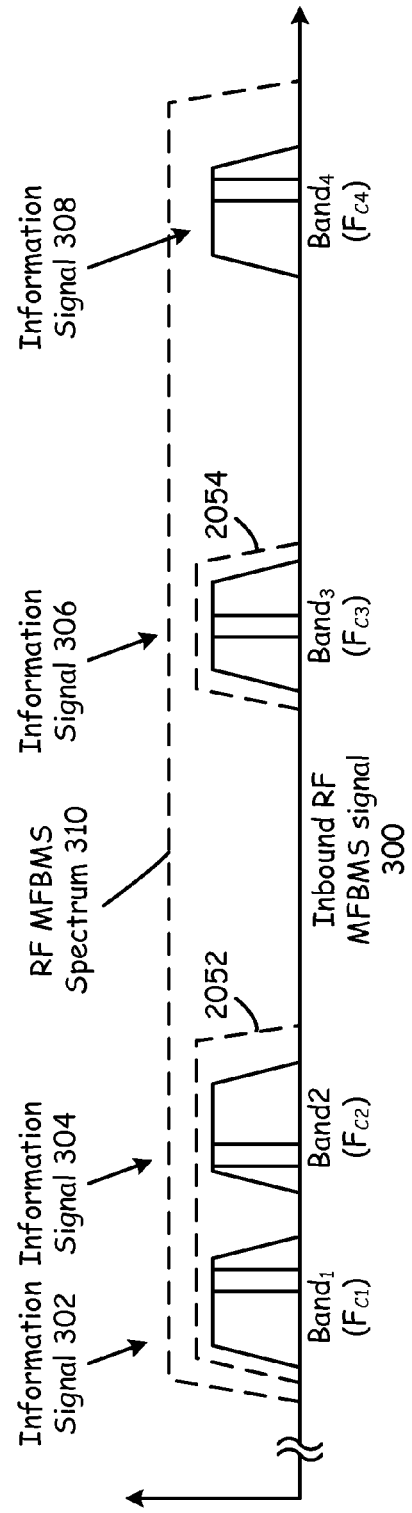

FIGS. 20A and 20B illustrate various frequency response curves of adjustable analog signal path components with respect to an RF MFBMS signal according to one or more aspects of the present invention. Referring particularly to FIG. 20A, an inbound RF MFBMS signal 300 is shown. This inbound RF MFBMS signal 300 includes a plurality of information signals 302, 304, 306, and 308. All of these information signals 302, 304, 306, and 308 reside within the RF MFBMS spectrum 310. As is shown, a frequency mask 2002 is applied by an adjustable analog signal path component such that information signal 306 and 308 are allowed to pass.

Referring to FIG. 20, operation during a different time period as compared to FIG. 20A is illustrated. In such case, the inbound RF MFBMS signal 300 within the RF MFBMS spectrum 310 includes information signals 302, 304, 306, and 308. However, in the operation of FIG. 20B, only information signal 302, 304, and 306 are of interest. In contrast, to the illustration of FIG. 20A, with which information signals 306 and 308 are of interest, with the illustration of FIG. 20B, information signals 302, 304, 306 are of interest. Thus, analog signal path components are controlled to apply frequency response curves 2052 and 2054 to the RF MFBMS signal 300. Each of these frequency response curves 2052 and 2054 represent band pass masks. Such band pass masks allow information signals 302, 304, and 306 to pass but reject information signal 308. For example, using the structure of FIG. 14A, a first receive path of receiver section 252 may enact spectral mask 2052 to receive and down convert information signals 302 and 304. Likewise, a second receive path of the receiver section 252 of FIG. 14A may enact mask 2054 of FIG. 20A to process and down convert information signal 306 of the inbound RF MFBMS signal 300.

Figure 21:
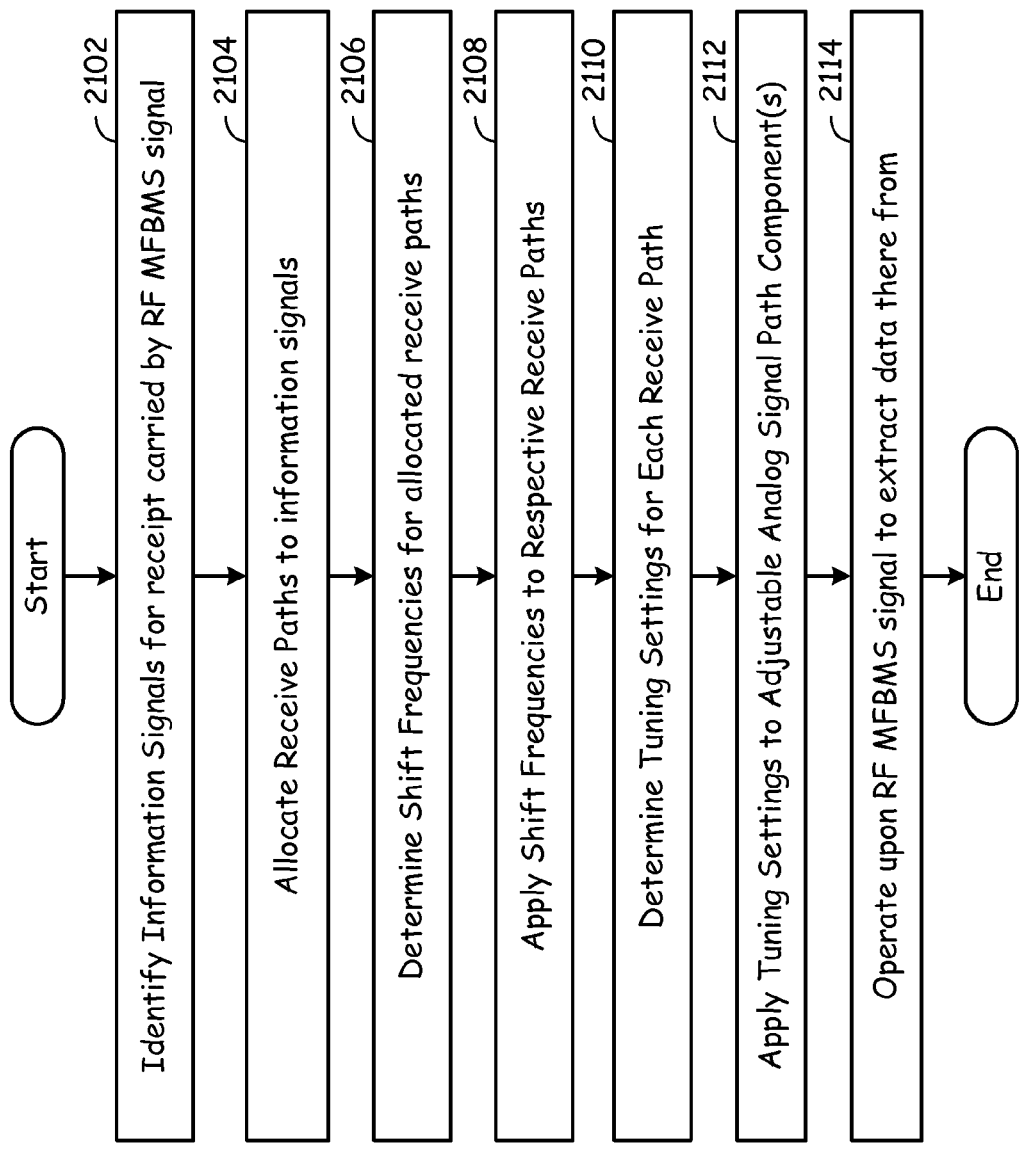
FIG. 21 is a flow chart illustrating receive operations according to one or more embodiments of the present invention.

FIG. 21 is a flow chart illustrating receive operations according to one or more embodiments of the present invention. Operation 2100 commences with the wireless device, e.g., processing circuitry contained therein, identifying information signals receipt that are carried by the RF MFBMS signal (Step 2102). The wireless device then allocates receive path to particular information signal (Step 2104). Then, the wireless device determines the shift frequencies for each receive path (Step 2106). The operations 2100 of FIG. 21 may apply to the structure of FIG. 14A, for example. Operation continues with the receiver section applying shift frequencies to respective receive paths (Step 2108). The wireless device then determines tuning settings for each receive path (Step 2110). The receiver section of processing circuitry then applies the tuning settings to one or more adjustable analog signal path component of the receiver section (Step 2112). The wireless device then operates upon an incoming RF MFBMS signal to extract data there from (Step 2114). Such operation of Step 2114 includes receiving the RF MFBMS signal, operating upon the RF MFBMS signal using analog signal path components, down converting into frequencies the RF MFBMS signals to produce a plurality of BB/IF information signals. The operation at Step 2114 further includes extracting data from one or more of the BB/IF information signals produced by the receiver section.

Figure 22:
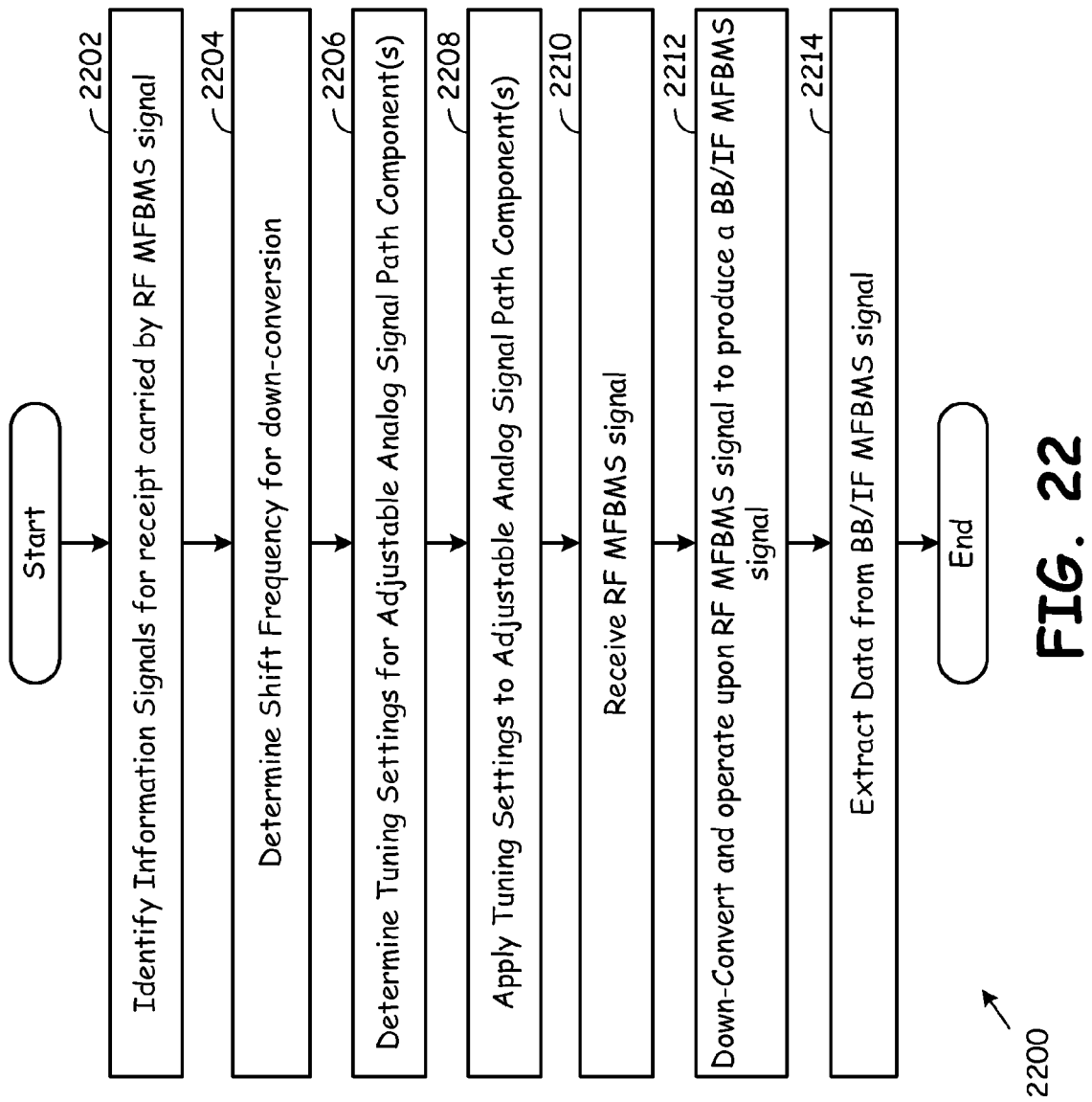
FIG. 22 is a flow chart illustrating operation of a receiver section for receiving processing of an RF MFBMS signal according to one or more embodiments of the present invention.

FIG. 22 is a flow chart illustrating operation of a receiver section for receiving processing of an RF MFBMS signal according to one or more embodiments of the present invention. The operation 2200 of FIG. 22 may be implemented by the structure of FIG. 7 for example. Operation 2200 commences with the processing circuitry of the wireless device identifying information signals for receipt that are carried by an RF MFBMS signal (Step 2202). The processing circuitry then determines a shift frequency for down conversion of the RF MFBMS signal (Step 2204). Determination at Steps 2202 and 2204 were previously described herein and are not described further with reference to FIG. 22. Operation continues with the processing circuitry determining tuning settings for adjustable analog signal path components of the receiver section (Step 2206). Then, the processing circuitry applies the tuning settings to the adjustable analog signal path components of the receiver section (Step 2208). The wireless device then receives the RF MFBMS signal (Step 2210) and down-converts and operates upon the RF MFBMS signal to produce a BB/IF MFBMS signal (Step 2212). Operation continues with the processing circuitry of the wireless device extracting data from the BB/IF MFBMS signal (Step 2214).

Figure 23:
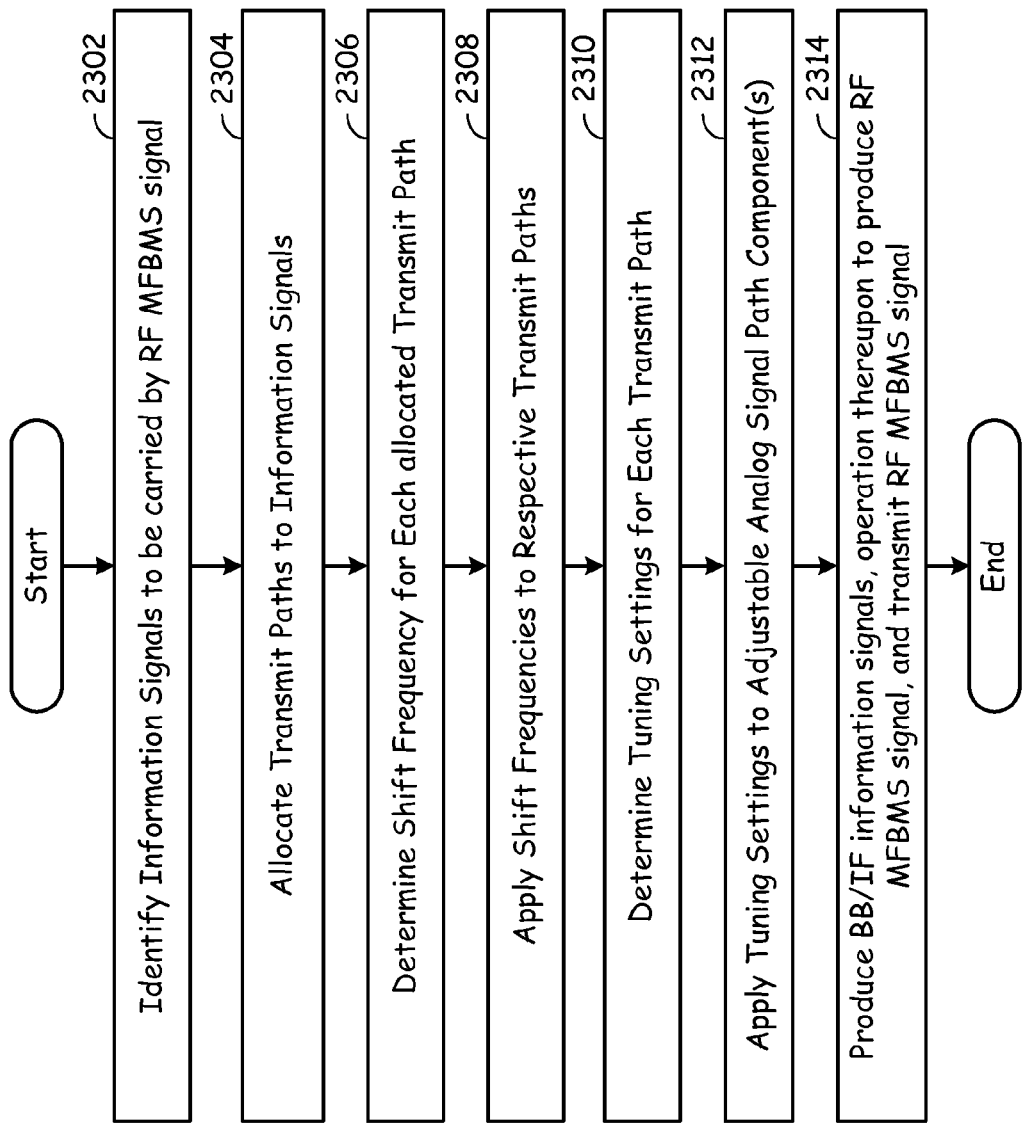
FIG. 23 is a flow chart illustrating operation of a wireless device for transmission according to one or more embodiments of the present invention.

FIG. 23 is a flow chart illustrating operation of a wireless device for transmission according to one or more embodiments of the present invention. The operations of FIG. 23 may be performed by the structure of FIGS. 15A-16B, for example. The operations 2300 of FIG. 23 commence with the processing circuitry of the wireless device identifying information signals to be carried by an RF MFBMS signal (Step 2302). The processing circuitry then allocates the transmission paths to the information signals (Step 2304). The processing circuitry then determines a shift frequency for each allocated transmit path (Step 2306). The processing circuitry then applies the shift frequencies to their respective transmit path (Step 2308). The processing circuitry then determines tuning settings for each transmit path (Step 2310). These tuning settings correspond to at least one adjustable analog signal path component for one or more allocated transmit paths. The processing circuitry then applies the tuning settings to the adjustable analog signal path components of the allocated transmit paths of the transmit section of the wireless device (Step 2312). The processing circuitry then produces the BB/IF information signals to the allocated transmit paths on the transmitter section. The allocated transmit paths of the transmitter section operate upon the BB/IF information signals to produce an RF MFBMS signal and an antenna coupled to the transmitter section and transmits the RF MFBMS signal (Step 2314).

Figure 24:
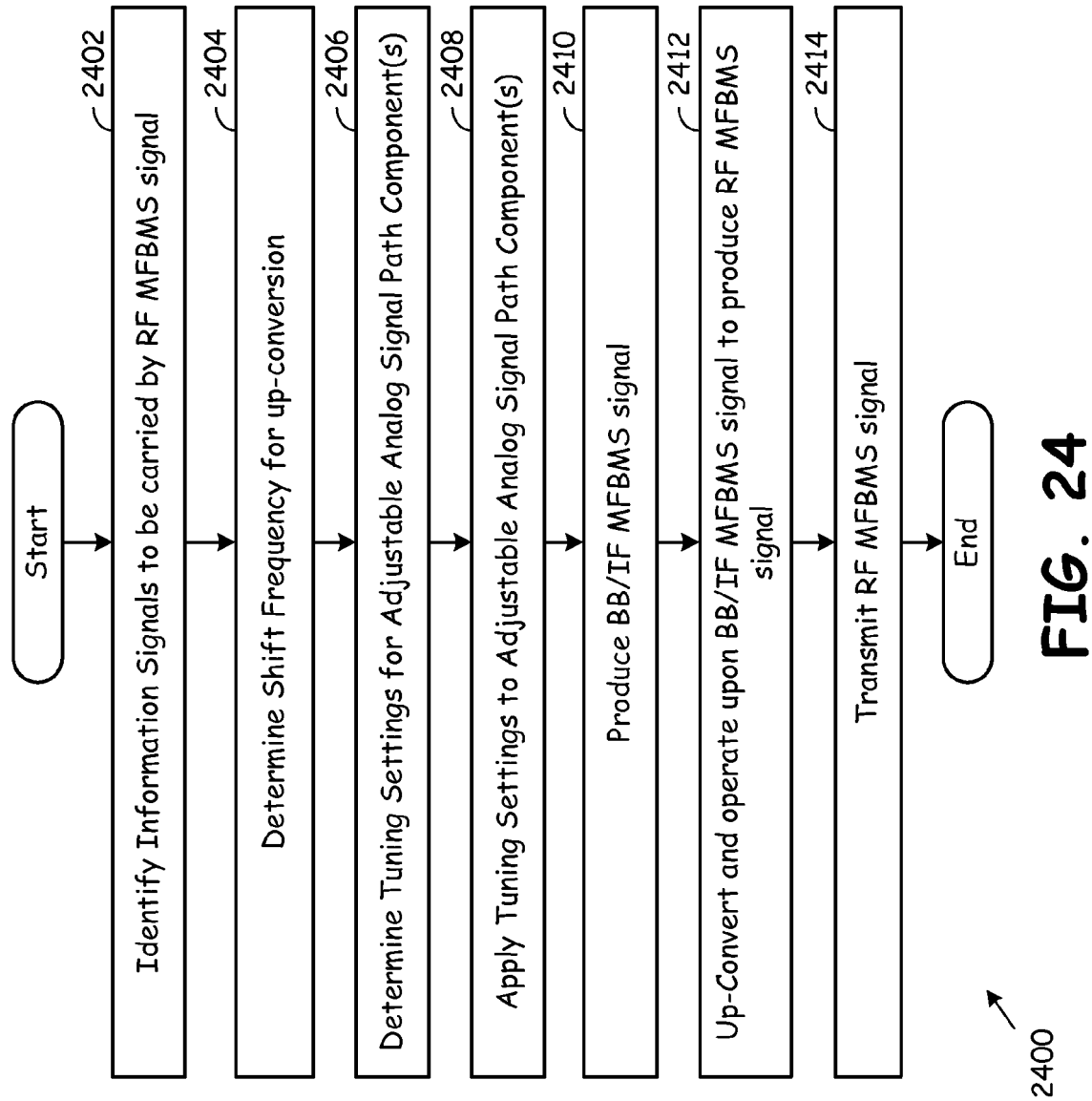
FIG. 24 is a flow chart illustrating operations of a wireless device during transmission according to one or more embodiments of the present invention.

FIG. 24 is a flow chart illustrating operations of a wireless device during transmission according to one or more embodiments of the present invention. The operations 2400 of FIG. 24 may be performed by the structure of FIG. 8. The operations 2400 of FIG. 24 commence with the processing circuitry of the wireless device identifying information signals for transmission within an RF MFBMS signal (Step 2402). The operation 2400 of FIG. 24 continues with the processing circuitry determining a shift frequency for up conversion of a BB/IF MFBMS signal to produce the RF MFBMS signal (Step 2404). The processing circuitry then determines tuning settings for one or more adjustable analog signal path component of the transmitter section of the wireless device (Step 2406). The processing circuitry then applies the tuning settings to the at least one adjustable analog signal path component of the wireless device (Step 2408). The processing circuitry then produces a BB/IF MFBMS signal (Step 2410). The BB/IF MFBMS signal includes at least one information signal that will eventually be transmitted in as the RF MFBMS signal. The transmitter section that up converts and operates upon the BB/IF MFBMS signal to produce the RF MFBMS signal (Step 2412). The wireless device then transmits the RF MFBMS signal (Step 2414).

Figure 25:
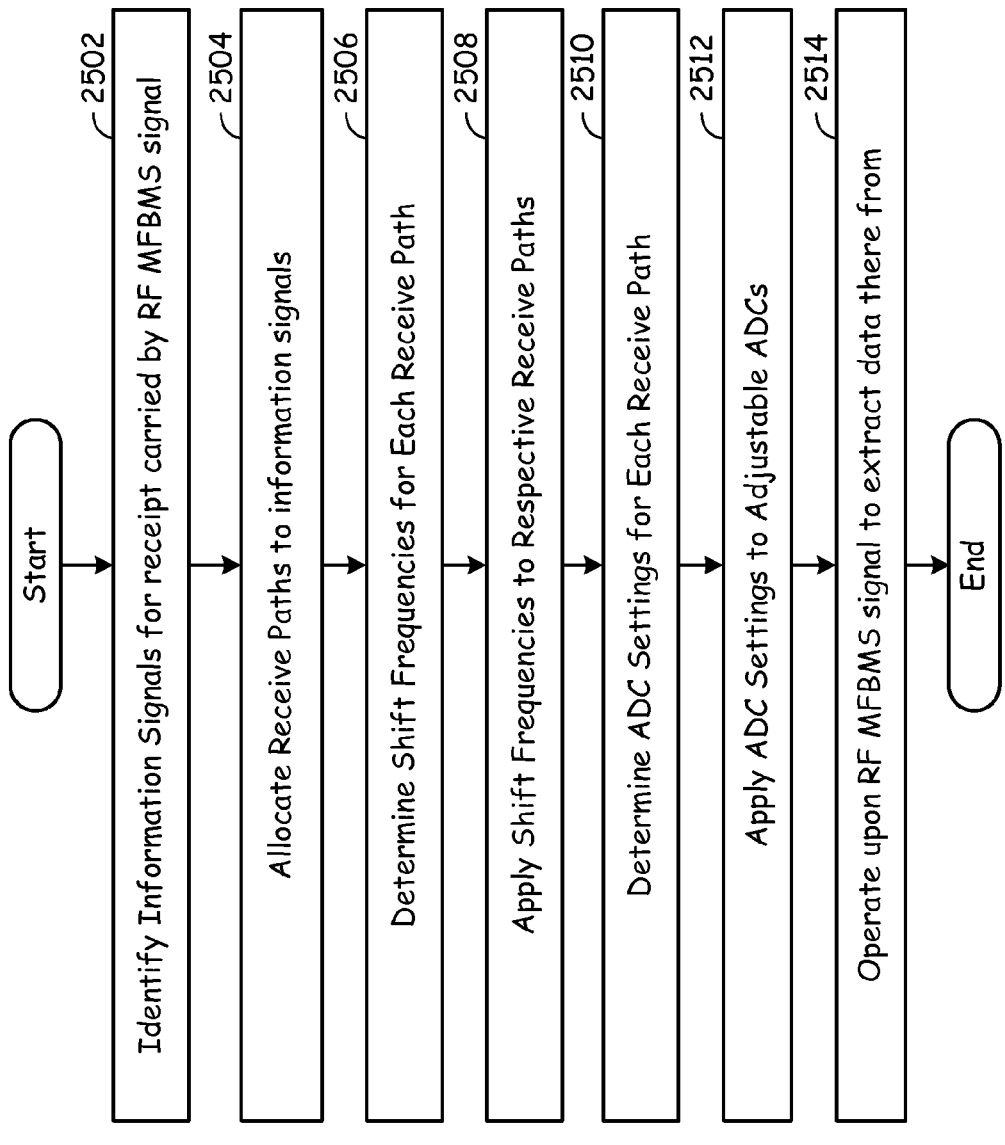
FIG. 25 is a flow chart illustrating operation for adjusting ADC parameters according to one or more embodiments of the present invention.

FIG. 25 is a flow chart illustrating operation for adjusting ADC parameters according to one or more embodiments of the present invention. The operations 2500 of FIG. 25 may be performed using the structure of FIGS. 14A, 14B, and 14C, for example. Operation 2500 commences with the processing circuitry identifying information signals for receipt that are carried by an RF MFBMS signal (Step 2502). The processing circuitry then allocates one or more receive paths of a receiver section to the information signals (Step 2504). In such case, each information signal may be assigned to a particular receive path. However, in other operations, one receive path may operate upon multiple information signals.

The processing circuitry then determines shift frequencies for each receive path (Step 2506). The processing circuitry then applies the shift frequencies to the respective receive path (Step 2508). The processing circuitry next determines ADC settings for ADCs of each receive path (Step 2510). The ADC settings will be based upon the spectral characteristics and signal content of the information signals operated upon by the respective receive paths. The ADC settings may include, for example and without limitation, the sampling frequency of the ADC of each receive path, the bandwidth of the ADC of each receive path, and/or the output resolution of the ADC of each receive path. The processing circuitry then applies the ADC settings to the adjustable ADC's of each receive path (Step 2512). The receiver of the wireless device that operates upon the RF MFBMS signal to extract data there from (Step 2514). In operating upon the RF MFBMS signal, the wireless device will first down sample the RF MFBMS signals to produce the plurality of information signals and will extract data there from. The operations of Step 2514 have been previously described and will not be further described herein with reference to FIG. 25.

Figure 26:
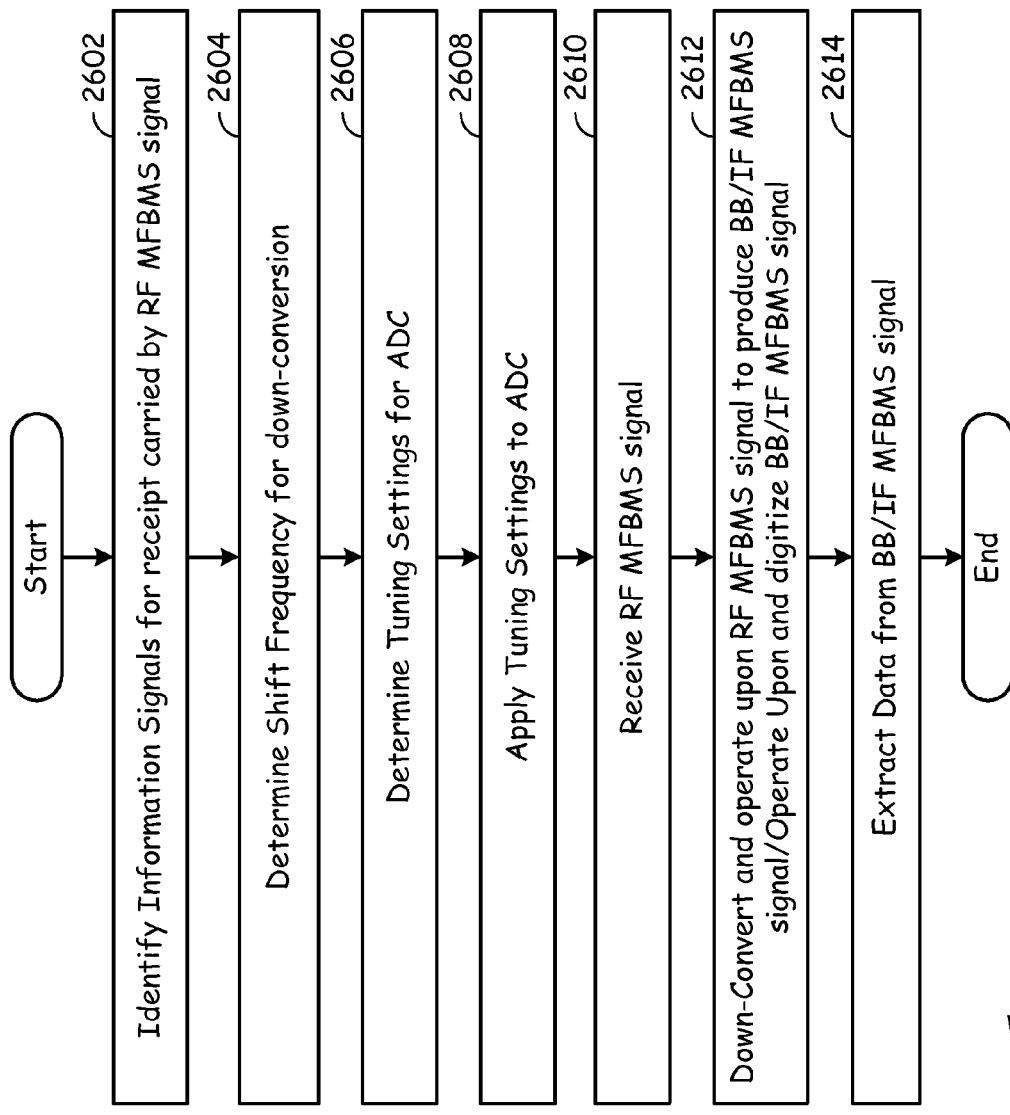
FIG. 26 is a flow chart illustrating operations for receiving an RF MFBMS signal and operating thereupon using adjustable ADC components according to one or more embodiments of the present invention.

FIG. 26 is a flow chart illustrating operations for receiving an RF MFBMS signal and operating thereupon using adjustable ADC components according to one or more embodiments of the present invention. The operations of FIG. 26 may be employed by the structure of FIG. 7, for example. The operations of FIG. 25 may be performed consistently with the structure of FIG. 14C as well, since a single ADC is used to digitize a BB/IF MFBMS signal produced by the combined output of the plurality of receive paths. The operations 2600 of FIG. 26 commence with the processing circuitry identifying information signals for receipt that are carried by an RF MFBMS signal (Step 2602). The processing circuitry then determines a shift frequency for down conversion of the RF MFBMS signal (Step 2604). The processing circuitry then applies the tuning settings to the ADC (Step 2608). The wireless device then receives the RF MFBMS signal via an antenna (Step 2610). The wireless device then down converts and operates upon the RF MFBMS signals to produce a BB/IF MFBMS signal and operates upon and digitizes the BB/IF MFBMS signal (Step 2612). Then, the processing circuitry extracts data from the BB/IF MFBMS signal (Step 2614).

Figure 27:
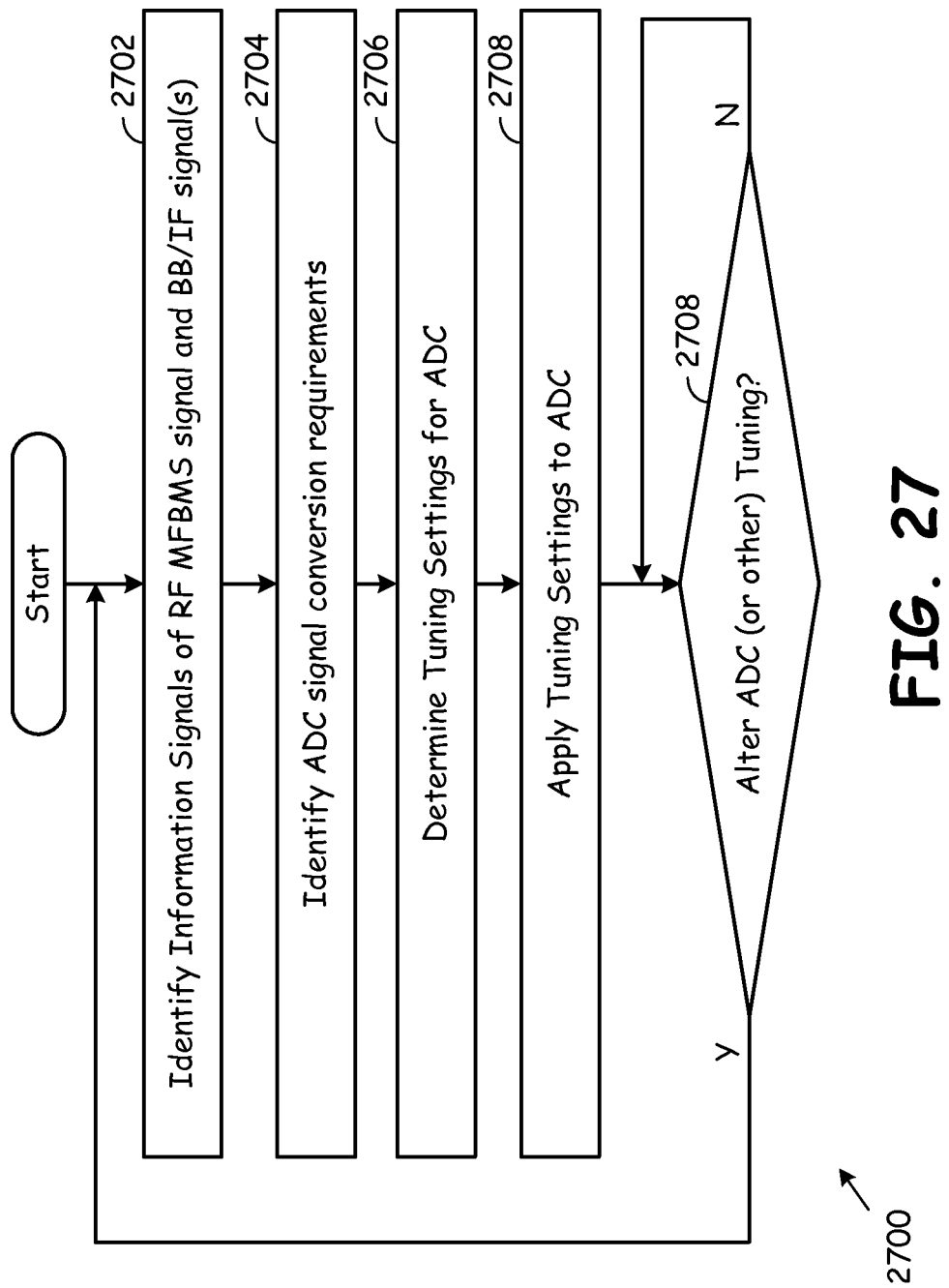
FIG. 27 is a flow chart illustrating operations according to one or more embodiments of the present invention for adjusting ADC tuning parameters.

FIG. 27 is a flow chart illustrating operations according to one or more embodiments of the present invention for adjusting ADC tuning parameters. The operations 2700 of FIG. 27 commence with the processing circuitry identifying information signals of an RF MFBMS signal and BB/IF signals (Step 2702). The information signals of the RF MFBMS signal are within RF information bands and the BB/IF information signals are within the BB/IF bands. Based upon the characteristics of these information signals, the processing circuitry identifies ADC signal conversion requirements (Step 2704). The ADC signal conversion requirements are based upon the spectral characteristics of the signal that is converted by the ADC. For example, the characteristics would be the bandwidth and frequency components of the BB/IF signal that the ADC will convert. The ADC signal conversion requirements would be singular for an embodiment in which only a single ADC is employed. However, if a plurality of receive paths include a plurality of corresponding ADC's, the signal conversion requirements for each of the ADC's may differ.

The processing circuitry then determines the tuning settings for the ADC(s) (Step 2706). Then, the processing circuitry applies the tuning settings to each ADC (Step 2708). As the reader should appreciate, the tuning settings for multiple ADC's may differ based upon the different characteristics of the signals that are being digitized by their respective ADCs. Because the requirements for each ADC may change over time, the processing circuitry will periodically determine whether or not to alter the ADC tuning (Step 2708). When alternation of the tuning of the ADC's is required, operation proceeds again to Step 2702. Alternatively, if the ADC's do not require re-tuning operation remains at Step 2708 where the query continues until alteration of the ADC is required.

The operation 2700 of FIG. 27 may be further applied to set and alter adjustable analog signal path components of the receiver section of the wireless device. As was previously described, the processing circuitry tunes the analog signal path components based upon the characteristics of the signals upon which they operate. Because the characteristics of the signals upon these analog signal path components may change over time, the operation 2700 of FIG. 27 may be employed to alter the tuning characteristics for these analog signal path components over time in a same/similar manner as was illustrated for the ADC tuning settings.

Figure 28:
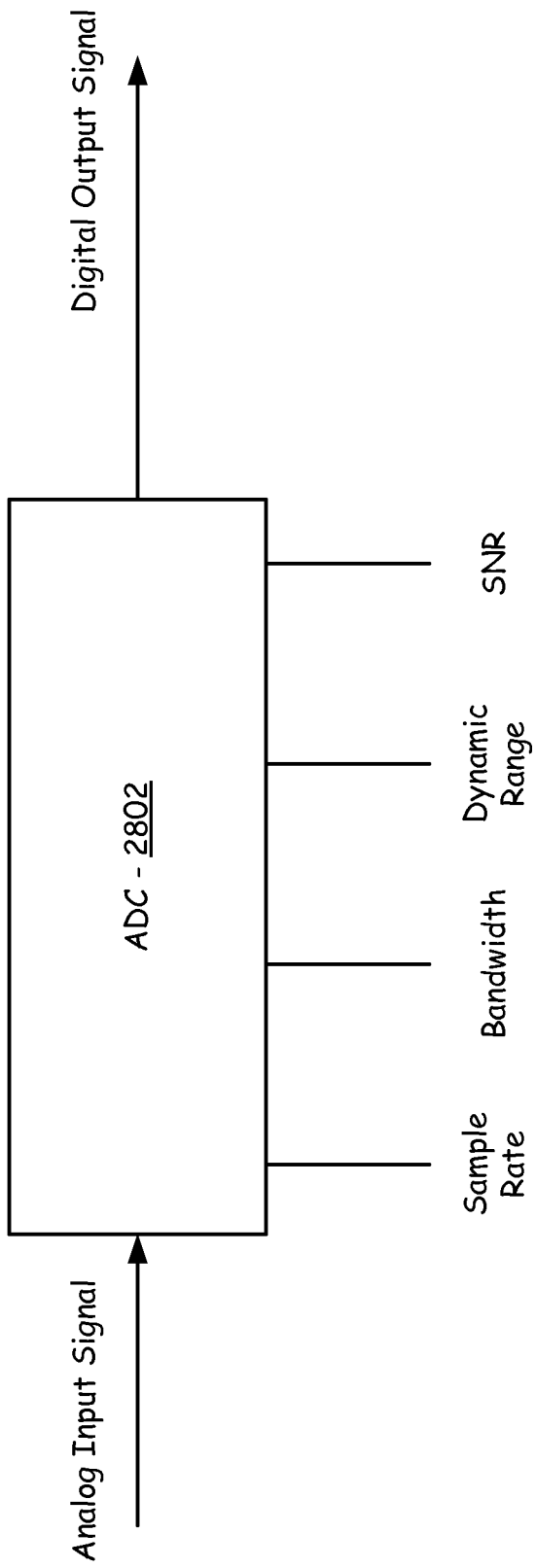
FIG. 28 is a block diagram illustrating an ADC constructed and operating according to one or more embodiments of the present invention.

FIG. 28 is a block diagram illustrating an ADC constructed and operating according to one or more embodiments of the present invention. The ADC 2802 receives an analog input signal and produces a digital output signal. In the embodiments described herein, the analog input signal may be a BB/IF MFBMS signal or an information signal within the BB/IF MFBMS range. When the ADC 2802 operates upon the BB/IF signal the ADC 2802 samples the signal and produces a digitized representation thereof for subsequent operation upon by the baseband processing module. When the ADC 2802 operates upon a single information signal within the BB/IF spectrum, the ADC 2802 will sample singularly the BB/IF information signal to produce a digitized representation thereof.

The ADC 2802 is tunable according to one or more embodiments of the present invention. The tunability of the ADC 2802 may include adjusting the sample rate of the ADC 2802, adjusting the bandwidth of the ADC 2802, adjusting the dynamic range of the ADC 2802, and/or adjusting the signal to noise ratio of the ADC 2802. Each of these variations in the operation ADC 2802 was described previously with reference to FIG. 14A and will not be described further herein with reference to FIGS. 29A and 29B.

FIGS. 29A and 29B are power spectral representations illustrating inbound BB/IF MFBMS signals and frequency responses of ADCs operating thereupon according to one or more embodiments of the present invention. Referring to FIG. 29A, the inbound BB/IF MFBMS signal 2900 includes information signals 302, 304, 306, and 308. The inbound BB/IF MFBMS signal 2900 resides within a BB/IF MFBMS spectrum 2902. With the operation of FIG. 29A, the wireless device is interested in information carried by information signals 302 and 304. Thus, the wireless device is not interested in information signals 306 and 308. In such case, the wireless device, and in particular the processing circuitry of a receiver of the wireless device, adjusts a bandwidth of an ADC to correspond to bandwidth 2902 illustrated in FIG. 29A.

Referring now to FIG. 29B, the inbound BB/IF MFBMS signal 2910 residing in BB/IF MFBMS spectrum 2902 includes information signals 302, 304, 306, and 308. However, with the operation of FIG. 29B, the wireless device is interested in all of the information signals 302, 304, 306, and 308 present within the BB/IF MFBMS spectrum 2902. In such case, the processing circuitry of the receiver of the wireless device therefore sets a bandwidth of the ADC to correspond to BB/IF MFBMS spectrum 2912 such that all information signals 302, 304, 306, and 308 may be captured.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output (s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A wireless device comprising:
processing circuitry operable to determine a set of information signals for receipt, the set of information signals of a Radio Frequency (RF) Multiple Frequency Bands Multiple Standards (MFBMS) signal having a plurality of information signal frequency bands;
an antenna operable to receive the RF MFBMS signal;
a receiver section coupled to the antenna and to the processing circuitry and comprising:
   a plurality of receive paths, each receive path comprising down-conversion circuitry operable to down-convert at least a portion of the RF MFBMS signal by a respective shift frequency to produce a corresponding baseband/low Intermediate Frequency (BB/IF) information signal;
   a combiner operable to combine the plurality of BB/IF information signals produced by the plurality of receive paths to form a BB/IF MFBMS signal; and
   a tunable analog to digital converter (ADC) operable to digitize the BB/IF MFBMS signal, the ADC tunable by the processing circuitry based upon spectral characteristics of the BB/IF MFBMS signal wherein the tunable ADC is coupled to receive inputs to adjust at least one of:
      a sample rate of the ADC;
      a bandwidth of the ADC;
      a dynamic range of the ADC; and
      a signal to noise ration of the ADC; and
the processing circuitry operable to extract data from the BB/IF MFBMS signal corresponding to the set of information signals.

2. The wireless device of claim 1, wherein the ADC is tunable by the processing circuitry adjusting a sampling frequency of the ADC.

3. The wireless device of claim 1, wherein the ADC is tunable by the processing circuitry adjusting a bandwidth of the ADC.

4. The wireless device of claim 1, wherein the ADC is tunable by the processing circuitry adjusting an output resolution of the ADC.

5. The wireless device of claim 1, wherein each receive path further comprises at least one adjustable analog signal path component operable to adjust at least one of the RF MFBMS signal and the BB/IF information signals.

6. The wireless device of claim 4, wherein the at least one adjustable analog element is selected from the group consisting of:
a frequency adjustable Low Noise Amplifier (LNA);
an analog filter that operates upon the RF MFBMS signal;
an analog filter that operates upon the BB/IF information signal; and
bandwidth adjustable down-conversion circuitry is bandwidth adjustable.

7. The wireless device of claim 1, wherein the plurality of information signal frequency bands are selected from the group consisting of:
at least one Wireless Local Area Network (WLAN) frequency band;
at least one Wireless Personal Area Network (WPAN) frequency band;
at least one cellular frequency band;
at least one millimeter wave frequency band; and
at least one Global Positioning System (GPS) frequency band.

8. A wireless device comprising:
processing circuitry operable to:
   determine a set of information signals for receipt, the set of information signals carried by a Radio Frequency (RF) Multiple Frequency Bands Multiple Standards (MFBMS) signal having a plurality of information signal frequency bands;
   determine a shift frequency based upon the determination;
an antenna operable to receive the RF MFBMS signal;
a receiver section coupled to the antenna and to the processing circuitry and comprising:
   down-conversion circuitry operable to down-convert the RF MFBMS signal by the shift frequency to produce a baseband/low Intermediate Frequency (BB/IF) MFBMS signal; and
   a tunable analog to digital converter (ADC) operable to digitize the BB/IF MFBMS signal, the tunable ADC tunable by the processing circuitry based upon spectral characteristics of the BB/IF MFBMS signal wherein the tunable ADC is coupled to receive inputs to adjust at least one of:
      a sample rate of the ADC;
      a bandwidth of the ADC;
      a dynamic range of the ADC; and
      a signal to noise ration of the ADC; and
the processing circuitry operable to extract data from the BB/IF MFBMS signal corresponding to the set of information signals.

9. The wireless device of claim 8, wherein the ADC is tunable by the processing circuitry adjusting a sampling frequency of the ADC.

10. The wireless device of claim 8, wherein the ADC is tunable by the processing circuitry adjusting a bandwidth of the ADC.

11. The wireless device of claim 8, wherein the ADC is tunable by the processing circuitry adjusting an output resolution of the ADC.

12. The wireless device of claim 8, wherein the receiver section further comprises at least one adjustable analog signal path component operable to adjust at least one of the RF MFBMS signal and the BB/IF information signals.

13. The wireless device of claim 12, wherein the at least one adjustable analog element is selected from the group consisting of:
a frequency adjustable Low Noise Amplifier (LNA);
an analog filter that operates upon the RF MFBMS signal;
an analog filter that operates upon the BB/IF information signal; and
bandwidth adjustable down-conversion circuitry is bandwidth adjustable.

14. The wireless device of claim 8, wherein the plurality of information signal frequency bands are selected from the group consisting of:
at least one Wireless Local Area Network (WLAN) frequency band;
at least one Wireless Personal Area Network (WPAN) frequency band;
at least one cellular frequency band;
at least one millimeter wave frequency band; and
at least one Global Positioning System (GPS) frequency band.

15. A wireless device comprising:
processing circuitry operable to determine a set of information signals for receipt, the set of information signals of a Radio Frequency (RF) Multiple Frequency Bands Multiple Standards (MFBMS) signal having a plurality of information signal frequency bands;

an antenna operable to receive the RF MFBMS signal;

a receiver section coupled to the antenna and to the processing circuitry and comprising:
- a plurality of receive paths, each receive path comprising:
  - down-conversion circuitry operable to down-convert at least a portion of the RF MFBMS signal by a respective shift frequency to produce a corresponding baseband/low Intermediate Frequency (BB/IF) information signal; and
  - a tunable analog to digital converter (ADC) operable to digitize the BB/IF information signal, the ADC tunable by the processing circuitry based upon spectral characteristics of the BB/IF information signal wherein the tunable ADC is coupled to receive inputs to adjust at least one of:
    - a sample rate of the ADC;
    - a bandwidth of the ADC;
    - a dynamic range of the ADC; and
    - a signal to noise ration of the ADC; and
- the processing circuitry operable to extract data from the BB/IF MFBMS signal corresponding to the set of information signals.

16. The wireless device of claim 15, wherein the ADC is tunable by the processing circuitry adjusting a sampling frequency of the ADC.

17. The wireless device of claim 15, wherein the ADC is tunable by the processing circuitry adjusting a bandwidth of the ADC.

18. The wireless device of claim 15, wherein the ADC is tunable by the processing circuitry adjusting an output resolution of the ADC.

19. The wireless device of claim 15, wherein each receive path further comprises at least one adjustable analog signal path component operable to adjust at least one of the RF MFBMS signal and the BB/IF information signals.

20. The wireless device of claim 19, wherein the at least one adjustable analog element is selected from the group consisting of:
- a frequency adjustable Low Noise Amplifier (LNA);
- an analog filter that operates upon the RF MFBMS signal;
- an analog filter that operates upon the BB/IF information signal; and
- bandwidth adjustable down-conversion circuitry is bandwidth adjustable.

21. The wireless device of claim 15, wherein the plurality of information signal frequency bands are selected from the group consisting of:
- at least one Wireless Local Area Network (WLAN) frequency band;
- at least one Wireless Personal Area Network (WPAN) frequency band;
- at least one cellular frequency band;
- at least one millimeter wave frequency band; and
- at least one Global Positioning System (GPS) frequency band.

* * * * *

UNITED STATES PATENT AND TRADEMARK OFFICE
CERTIFICATE OF CORRECTION

PATENT NO.        : 8,412,142 B2
APPLICATION NO.   : 12/550555
DATED             : April 2, 2013
INVENTOR(S)       : John Walley et al.

Page 1 of 1

It is certified that error appears in the above-identified patent and that said Letters Patent is hereby corrected as shown below:

In the Claims

Col. 33, line 33, in claim 1: replace "ration" with --ratio--
Col. 34, line 28, in claim 8: replace "ration" with --ratio--
Col. 35, line 22, in claim 15: replace "ration" with --ratio--

Signed and Sealed this
Eighteenth Day of February, 2014

Michelle K. Lee
*Deputy Director of the United States Patent and Trademark Office*